United States Patent
Nielsen et al.

(10) Patent No.: US 9,177,280 B2
(45) Date of Patent: Nov. 3, 2015

(54) METHODS, APPARATUS, AND SYSTEMS FOR ACQUIRING AN ENHANCED POSITIVE RESPONSE FOR UNDERGROUND FACILITY LOCATE AND MARKING OPERATIONS BASED ON AN ELECTRONIC MANIFEST DOCUMENTING PHYSICAL LOCATE MARKS ON GROUND, PAVEMENT, OR OTHER SURFACE

(71) Applicant: CertusView Technologies, LLC, North Palm Beach, FL (US)

(72) Inventors: Steven E. Nielsen, North Palm Beach, FL (US); Curtis Chambers, Palm Beach Gardens, FL (US); Jeffrey Farr, Royal Palm Beach, FL (US)

(73) Assignee: CertusView Technologies, LLC, Palm Beach Gardens, FL (US)

( * ) Notice: Subject to any disclaimer, the term of this patent is extended or adjusted under 35 U.S.C. 154(b) by 0 days.

(21) Appl. No.: 14/612,603

(22) Filed: Feb. 3, 2015

(65) Prior Publication Data

US 2015/0149242 A1 May 28, 2015

Related U.S. Application Data

(63) Continuation of application No. 14/063,417, filed on Oct. 25, 2013, which is a continuation of application (Continued)

(30) Foreign Application Priority Data

Feb. 9, 2010 (CA) ..................... 2690239

(51) Int. Cl.
*G06Q 10/06* (2012.01)
*G01V 3/15* (2006.01)
(Continued)

(52) U.S. Cl.
CPC .............. *G06Q 10/0635* (2013.01); *G01V 3/15* (2013.01); *G06Q 10/00* (2013.01); *G06Q 10/06398* (2013.01); *G06Q 10/063114* (2013.01); *G06Q 50/08* (2013.01)

(58) Field of Classification Search
CPC ............ G06Q 10/00; G06Q 10/06368; G06Q 10/063114; G06Q 10/0635; G06Q 50/08
See application file for complete search history.

(56) References Cited

U.S. PATENT DOCUMENTS

| 3,916,298 A | 10/1975 | Ulrich |
| 3,986,777 A | 10/1976 | Roll |

(Continued)

FOREIGN PATENT DOCUMENTS

| AU | 2009213151 | 8/2009 |
| CA | 2386200 | 4/2000 |

(Continued)

OTHER PUBLICATIONS

S&N Locating Services, LLC's and S&N Communications, Inc.'s Second Amended answer, Affirmative Defenses, and Counterclaims to Plaintiff's First Amended Complaint filed Jun. 12, 2015; Case No. 2:13-cv-346 (MSD) (TEM); *CertusView Technologies, LLC v. S&N Locating Services, LLC et al.*, (Eastern District of Virginia).

(Continued)

*Primary Examiner* — Ramy M Osman

(57) ABSTRACT

A positive response notification to provide information regarding locate and/or marking operations for underground facilities may include time-stamp information to provide proof of a time at which the locate and/or marking operation was completed by a locate technician, and/or place-stamp information to provide proof of a presence of the locate technician at or near a work site. An electronic manifest image and/or a virtual white line image similarly may be included in a positive response notification. In one example, such images may be bundled together based on respective descriptor files (or descriptor metadata) that associates the corresponding images with a locate request ticket for the operation. In another example, a positive response notification may include environmental information regarding one or more environmental conditions present at or near the work site during the locate and/or marking operation.

20 Claims, 14 Drawing Sheets

Related U.S. Application Data

No. 12/915,516, filed on Oct. 29, 2010, now Pat. No. 8,572,193, which is a continuation-in-part of application No. 12/703,313, filed on Feb. 10, 2010, now Pat. No. 8,549,084.

(60) Provisional application No. 61/256,007, filed on Oct. 29, 2009, provisional application No. 61/151,419, filed on Feb. 10, 2009, provisional application No. 61/151,425, filed on Feb. 10, 2009.

(51) Int. Cl.
  *G06Q 10/00* (2012.01)
  *G06Q 50/08* (2012.01)

(56) References Cited

U.S. PATENT DOCUMENTS

| | | |
|---|---|---|
| 4,600,356 A | 7/1986 | Bridges |
| 4,623,282 A | 11/1986 | Allen |
| 4,688,921 A | 8/1987 | Wakabayashi |
| 5,414,462 A | 5/1995 | Veatch |
| 5,448,263 A | 9/1995 | Martin |
| 5,576,973 A | 11/1996 | Haddy |
| 5,644,237 A | 7/1997 | Eslambolchi et al. |
| 5,689,415 A | 11/1997 | Calotychos et al. |
| 5,699,244 A | 12/1997 | Clark, Jr. |
| 5,815,411 A | 9/1998 | Ellenby |
| 5,825,660 A | 10/1998 | Cagan et al. |
| 5,920,194 A | 7/1999 | Lewis et al. |
| 5,987,380 A | 11/1999 | Backman |
| 5,991,694 A | 11/1999 | Gudat et al. |
| 6,101,087 A | 8/2000 | Sutton |
| 6,127,827 A | 10/2000 | Lewis |
| 6,141,000 A | 10/2000 | Martin |
| 6,169,517 B1 | 1/2001 | Eslambolchi |
| 6,195,922 B1 | 3/2001 | Stump |
| 6,201,883 B1 | 3/2001 | Mizui |
| 6,299,934 B1 | 10/2001 | Manning |
| 6,337,681 B1 | 1/2002 | Martin |
| 6,345,281 B1 | 2/2002 | Kardos et al. |
| 6,351,707 B1 | 2/2002 | Ichikawa |
| 6,371,692 B1 | 4/2002 | Fatigati |
| 6,421,725 B1 | 7/2002 | Vermilyea et al. |
| 6,426,872 B1 | 7/2002 | Sutton |
| 6,430,499 B1 | 8/2002 | Nakano |
| 6,430,562 B1 | 8/2002 | Kardos et al. |
| 6,430,604 B1 | 8/2002 | Ogle |
| 6,437,708 B1 | 8/2002 | Brouwer |
| 6,470,976 B2 | 10/2002 | Alft |
| 6,477,475 B1 | 11/2002 | Takaoka et al. |
| 6,493,650 B1 | 12/2002 | Rodgers |
| 6,532,409 B1 | 3/2003 | Fujishima |
| 6,567,116 B1 | 5/2003 | Aman et al. |
| 6,597,992 B2 | 7/2003 | Rooney et al. |
| 6,650,293 B1 | 11/2003 | Eslambolchi |
| 6,650,834 B2 | 11/2003 | Ume |
| 6,701,647 B2 | 3/2004 | Stump |
| 6,710,741 B2 | 3/2004 | Tucker |
| 6,723,375 B2 | 4/2004 | Zeck et al. |
| 6,747,636 B2 | 6/2004 | Martin |
| 6,751,552 B1 | 6/2004 | Minelli |
| 6,751,554 B1 | 6/2004 | Asher et al. |
| 6,772,142 B1 | 8/2004 | Kelling et al. |
| 6,778,128 B2 | 8/2004 | Tucker et al. |
| 6,798,379 B2 | 9/2004 | Tucker et al. |
| 6,803,906 B1 | 10/2004 | Morrison et al. |
| 6,825,793 B2 | 11/2004 | Taylor, Jr. et al. |
| 6,850,161 B1 | 2/2005 | Elliott et al. |
| 6,853,905 B2 | 2/2005 | Barton |
| 6,873,998 B1 | 3/2005 | Dorum |
| 6,895,356 B2 | 5/2005 | Brimhall |
| 6,898,525 B1 | 5/2005 | Minelli |
| 6,904,361 B1 | 6/2005 | Tallman et al. |
| 6,941,890 B1 | 9/2005 | Cristo et al. |
| 6,950,535 B2 | 9/2005 | Sibayama |
| 6,956,524 B2 | 10/2005 | Tucker et al. |
| 6,957,250 B1 | 10/2005 | Nakano |
| 6,958,690 B1 | 10/2005 | Asher et al. |
| 6,972,698 B2 | 12/2005 | Deguchi |
| 6,975,942 B2 | 12/2005 | Young et al. |
| 6,981,001 B1 | 12/2005 | Reddick et al. |
| 6,999,021 B2 | 2/2006 | Taylor, Jr. |
| 7,003,138 B2 | 2/2006 | Wilson |
| 7,009,399 B2 | 3/2006 | Olsson et al. |
| 7,027,653 B2 | 4/2006 | Hino |
| 7,113,124 B2 | 9/2006 | Waite |
| 7,117,445 B2 | 10/2006 | Berger |
| 7,120,564 B2 | 10/2006 | Pacey |
| 7,136,765 B2 | 11/2006 | Maier et al. |
| 7,142,196 B1 | 11/2006 | Connor |
| 7,185,021 B2 | 2/2007 | Kishigami |
| 7,216,034 B2 | 5/2007 | Vitikainen |
| 7,222,986 B2 | 5/2007 | Mah |
| 7,236,162 B2 | 6/2007 | Morrison et al. |
| 7,262,797 B2 | 8/2007 | Weldum |
| 7,274,756 B2 | 9/2007 | Kuijk |
| 7,281,263 B1 | 10/2007 | LaMastres et al. |
| 7,295,119 B2 | 11/2007 | Rappaport et al. |
| 7,363,345 B2 | 4/2008 | Austin-Lane et al. |
| 7,372,247 B1 | 5/2008 | Giusti et al. |
| 7,400,976 B2 | 7/2008 | Young et al. |
| 7,417,641 B1 | 8/2008 | Barber |
| 7,437,830 B1 | 10/2008 | Kulavic |
| 7,469,247 B2 | 12/2008 | Cossins et al. |
| 7,482,973 B2 | 1/2009 | Tucker et al. |
| 7,579,960 B2 | 8/2009 | Cheng et al. |
| 7,584,123 B1 | 9/2009 | Karonis et al. |
| 7,605,590 B2 | 10/2009 | Mulcahey |
| 7,613,331 B2 | 11/2009 | Maeda |
| 7,626,496 B1 | 12/2009 | Asher et al. |
| 7,636,901 B2 | 12/2009 | Munson |
| 7,640,105 B2 | 12/2009 | Nielsen et al. |
| 7,664,530 B2 | 2/2010 | Skelton |
| 7,773,095 B1 | 8/2010 | Badrak et al. |
| 7,777,648 B2 | 8/2010 | Smith et al. |
| 7,783,507 B2 | 8/2010 | Schick |
| 7,834,806 B2 | 11/2010 | Tucker et al. |
| 7,886,616 B1 | 2/2011 | Hayman |
| 7,889,888 B2 | 2/2011 | Deardorff et al. |
| 7,917,292 B1 | 3/2011 | Du |
| 7,978,129 B2 | 7/2011 | Sawyer et al. |
| 7,990,151 B2 | 8/2011 | Olsson |
| 8,045,995 B2 | 10/2011 | King |
| 8,054,343 B2 | 11/2011 | Cheatle et al. |
| 8,060,304 B2 | 11/2011 | Nielsen et al. |
| 8,081,112 B2 | 12/2011 | Tucker et al. |
| 8,144,058 B2 | 3/2012 | Sawyer, Jr. et al. |
| 8,150,826 B2 | 4/2012 | Arrouye et al. |
| 8,155,390 B2 | 4/2012 | Nielsen et al. |
| 8,194,932 B2 | 6/2012 | Nielsen et al. |
| 8,204,642 B2 | 6/2012 | Tanaka et al. |
| 8,218,827 B2 | 7/2012 | Nielsen et al. |
| 8,248,056 B1 | 8/2012 | Olsson et al. |
| 8,249,306 B2 | 8/2012 | Nielsen et al. |
| 8,260,489 B2 | 9/2012 | Nielsen et al. |
| 8,265,344 B2 | 9/2012 | Nielsen et al. |
| 8,270,666 B2 | 9/2012 | Nielsen et al. |
| 8,280,117 B2 | 10/2012 | Nielsen et al. |
| 8,280,631 B2 | 10/2012 | Nielsen et al. |
| 8,280,969 B2 | 10/2012 | Nielsen et al. |
| 8,290,204 B2 | 10/2012 | Nielsen et al. |
| 8,290,215 B2 | 10/2012 | Nielsen et al. |
| 8,296,308 B2 | 10/2012 | Nielsen et al. |
| 8,300,895 B2 | 10/2012 | Nielsen et al. |
| 8,300,925 B2 | 10/2012 | Kunieda |
| 8,301,380 B2 | 10/2012 | Nielsen et al. |
| 8,311,765 B2 | 11/2012 | Nielsen et al. |
| 8,340,359 B2 | 12/2012 | Nielsen et al. |
| 8,355,542 B2 | 1/2013 | Nielsen et al. |
| 8,356,255 B2 | 1/2013 | Nielsen et al. |
| 8,361,543 B2 | 1/2013 | Nielsen et al. |
| 8,374,789 B2 | 2/2013 | Nielsen et al. |
| 8,384,742 B2 | 2/2013 | Nielsen et al. |

(56) References Cited

U.S. PATENT DOCUMENTS

| | | |
|---|---|---|
| 8,386,178 B2 | 2/2013 | Nielsen et al. |
| 8,401,791 B2 | 3/2013 | Nielsen et al. |
| 8,407,001 B2 | 3/2013 | Nielsen et al. |
| 8,416,995 B2 | 4/2013 | Nielsen et al. |
| 8,457,893 B2 | 6/2013 | Nielsen et al. |
| 8,463,487 B2 | 6/2013 | Nielsen et al. |
| 8,467,932 B2 | 6/2013 | Nielsen et al. |
| 8,467,969 B2 | 6/2013 | Nielsen et al. |
| 8,468,206 B2 | 6/2013 | Nielsen et al. |
| 8,473,148 B2 | 6/2013 | Nielsen et al. |
| 8,473,209 B2 | 6/2013 | Nielsen et al. |
| 8,476,906 B2 | 7/2013 | Nielsen et al. |
| 8,478,523 B2 | 7/2013 | Nielsen et al. |
| 8,478,524 B2 | 7/2013 | Nielsen et al. |
| 8,478,525 B2 | 7/2013 | Nielsen et al. |
| 8,478,617 B2 | 7/2013 | Nielsen et al. |
| 8,478,635 B2 | 7/2013 | Nielsen et al. |
| 8,480,332 B2 | 7/2013 | Miller |
| 8,484,300 B2 | 7/2013 | Nielsen et al. |
| 8,532,341 B2 | 9/2013 | Nielsen et al. |
| 8,532,342 B2 | 9/2013 | Nielsen et al. |
| 8,540,141 B2 | 9/2013 | Nielsen et al. |
| 8,543,651 B2 | 9/2013 | Nielsen et al. |
| 8,543,937 B2 | 9/2013 | Nielsen et al. |
| 8,549,084 B2 | 10/2013 | Nielsen et al. |
| 8,560,164 B2 | 10/2013 | Nielsen et al. |
| 8,566,737 B2 | 10/2013 | Nielsen et al. |
| 8,572,193 B2 | 10/2013 | Nielsen et al. |
| 8,577,707 B2 | 11/2013 | Nielsen et al. |
| 8,583,264 B2 | 11/2013 | Nielsen et al. |
| 8,583,372 B2 | 11/2013 | Nielsen et al. |
| 8,589,201 B2 | 11/2013 | Nielsen et al. |
| 8,589,202 B2 | 11/2013 | Nielsen et al. |
| 8,600,526 B2 | 12/2013 | Nielsen et al. |
| 8,600,848 B2 | 12/2013 | Nielsen et al. |
| 8,612,090 B2 | 12/2013 | Nielsen et al. |
| 8,612,148 B2 | 12/2013 | Nielsen et al. |
| 8,612,271 B2 | 12/2013 | Nielsen et al. |
| 8,612,276 B1 | 12/2013 | Nielsen et al. |
| 8,620,572 B2 | 12/2013 | Nielsen et al. |
| 8,620,587 B2 | 12/2013 | Nielsen et al. |
| 8,620,616 B2 | 12/2013 | Nielsen et al. |
| 8,620,726 B2 | 12/2013 | Nielsen et al. |
| 8,626,571 B2 | 1/2014 | Nielsen et al. |
| 8,630,463 B2 | 1/2014 | Nielsen et al. |
| 8,644,965 B2 | 2/2014 | Nielsen et al. |
| 8,700,325 B2 | 4/2014 | Nielsen et al. |
| 8,731,830 B2 | 5/2014 | Nielsen et al. |
| 8,805,640 B2 | 8/2014 | Nielsen et al. |
| 8,830,265 B2 | 9/2014 | Nielsen et al. |
| 8,861,794 B2 | 10/2014 | Nielsen et al. |
| 8,861,795 B2 | 10/2014 | Nielsen et al. |
| 8,902,251 B2 | 12/2014 | Nielsen et al. |
| 8,907,978 B2 | 12/2014 | Nielsen et al. |
| 8,907,980 B2 | 12/2014 | Nielsen et al. |
| 8,917,288 B2 | 12/2014 | Nielsen et al. |
| 8,918,898 B2 | 12/2014 | Nielsen et al. |
| 8,928,693 B2 | 1/2015 | Nielsen et al. |
| 8,934,678 B2 | 1/2015 | Nielsen et al. |
| 8,938,366 B2 | 1/2015 | Nielsen et al. |
| 2001/0036295 A1 | 11/2001 | Hendrickson |
| 2001/0049470 A1 | 12/2001 | Mault et al. |
| 2002/0013704 A1 | 1/2002 | Finney |
| 2002/0044690 A1 | 4/2002 | Burgess |
| 2002/0046259 A1 | 4/2002 | Glorikian |
| 2002/0052755 A1 | 5/2002 | Whatley |
| 2002/0059296 A1 | 5/2002 | Hayashi et al. |
| 2002/0122119 A1 | 9/2002 | Takakura |
| 2002/0145617 A1 | 10/2002 | Kennard |
| 2002/0184235 A1 | 12/2002 | Young |
| 2003/0012411 A1 | 1/2003 | Sjostrom |
| 2003/0055666 A1 | 3/2003 | Roddy |
| 2003/0095708 A1 | 5/2003 | Pittel |
| 2003/0110184 A1 | 6/2003 | Gibson et al. |
| 2003/0164053 A1 | 9/2003 | Ignagni |
| 2003/0222815 A1 | 12/2003 | Tucker |
| 2004/0006425 A1 | 1/2004 | Wood |
| 2004/0008883 A1 | 1/2004 | Shi et al. |
| 2004/0073578 A1 | 4/2004 | Nam |
| 2004/0146185 A1 | 7/2004 | Blair |
| 2004/0148191 A1 | 7/2004 | Hoke |
| 2004/0150556 A1 | 8/2004 | Tucker et al. |
| 2004/0151388 A1 | 8/2004 | Maeda |
| 2004/0168358 A1 | 9/2004 | Stump |
| 2004/0199410 A1 | 10/2004 | Feyen et al. |
| 2004/0203909 A1 | 10/2004 | Koster |
| 2004/0210370 A1 | 10/2004 | Gudat |
| 2004/0210386 A1 | 10/2004 | Wood |
| 2004/0220731 A1 | 11/2004 | Tucker |
| 2004/0225444 A1 | 11/2004 | Young et al. |
| 2004/0252303 A1 | 12/2004 | Giorgianni et al. |
| 2005/0033513 A1 | 2/2005 | Gasbarro |
| 2005/0034074 A1 | 2/2005 | Munson |
| 2005/0046584 A1 | 3/2005 | Breed |
| 2005/0057745 A1 | 3/2005 | Bontje |
| 2005/0104775 A1 | 5/2005 | Tucker et al. |
| 2005/0122518 A1 | 6/2005 | Overbeck et al. |
| 2005/0125389 A1 | 6/2005 | Hazzard et al. |
| 2005/0183028 A1 | 8/2005 | Clough et al. |
| 2005/0192752 A1 | 9/2005 | Rooney |
| 2005/0203768 A1 | 9/2005 | Florance |
| 2005/0219268 A1 | 10/2005 | Kyle |
| 2005/0254704 A1 | 11/2005 | Komiya et al. |
| 2006/0020417 A1 | 1/2006 | Koch et al. |
| 2006/0026020 A1 | 2/2006 | Waite et al. |
| 2006/0058945 A1 | 3/2006 | Watanabe |
| 2006/0077095 A1 | 4/2006 | Tucker et al. |
| 2006/0085396 A1 | 4/2006 | Evans |
| 2006/0091888 A1 | 5/2006 | Holman et al. |
| 2006/0161349 A1 | 7/2006 | Cross |
| 2006/0229809 A1 | 10/2006 | Chen |
| 2006/0235741 A1 | 10/2006 | Deaton et al. |
| 2006/0239560 A1 | 10/2006 | Sternby |
| 2006/0282191 A1 | 12/2006 | Gotfried |
| 2006/0282280 A1 | 12/2006 | Stotz et al. |
| 2007/0010925 A1 | 1/2007 | Yokoyama |
| 2007/0011271 A1 | 1/2007 | Baker et al. |
| 2007/0027591 A1 | 2/2007 | Goldenberg |
| 2007/0031029 A1 | 2/2007 | Sasaki |
| 2007/0076920 A1 | 4/2007 | Ofek |
| 2007/0100768 A1 | 5/2007 | Boccon-Gibod et al. |
| 2007/0106784 A1 | 5/2007 | Dickman |
| 2007/0110316 A1 | 5/2007 | Ohashi |
| 2007/0118278 A1 | 5/2007 | Finn et al. |
| 2007/0143676 A1 | 6/2007 | Chen |
| 2007/0182721 A1 | 8/2007 | Watanabe et al. |
| 2007/0187574 A1 | 8/2007 | Lia |
| 2007/0219722 A1 | 9/2007 | Sawyer, Jr. |
| 2007/0258642 A1 | 11/2007 | Thota |
| 2007/0286021 A1 | 12/2007 | Hoenmans et al. |
| 2008/0021863 A1 | 1/2008 | Evans |
| 2008/0025614 A1 | 1/2008 | Hintz et al. |
| 2008/0059889 A1 | 3/2008 | Parker et al. |
| 2008/0075368 A1 | 3/2008 | Kuzmin |
| 2008/0109751 A1 | 5/2008 | Fitzmaurice et al. |
| 2008/0125942 A1 | 5/2008 | Tucker et al. |
| 2008/0133128 A1 | 6/2008 | Koch |
| 2008/0180322 A1 | 7/2008 | Islam |
| 2008/0192235 A1 | 8/2008 | Komiya et al. |
| 2008/0208415 A1 | 8/2008 | Vik |
| 2008/0284902 A1 | 11/2008 | Konno et al. |
| 2008/0285805 A1 | 11/2008 | Luinge et al. |
| 2008/0288267 A1 | 11/2008 | Asher |
| 2008/0292295 A1 | 11/2008 | Konno et al. |
| 2009/0004410 A1 | 1/2009 | Thomson et al. |
| 2009/0012418 A1 | 1/2009 | Gerlach et al. |
| 2009/0013806 A1 | 1/2009 | Miller et al. |
| 2009/0067695 A1 | 3/2009 | Komiya et al. |
| 2009/0070071 A1 | 3/2009 | Wood |
| 2009/0092297 A1 | 4/2009 | Kitoh et al. |
| 2009/0100185 A1 | 4/2009 | Shehan et al. |
| 2009/0121937 A1 | 5/2009 | Kaegebein |
| 2009/0185712 A1 | 7/2009 | Wong et al. |
| 2009/0201311 A1 | 8/2009 | Nielsen et al. |

(56) References Cited

U.S. PATENT DOCUMENTS

| | | |
|---|---|---|
| 2009/0204238 A1 | 8/2009 | Nielsen et al. |
| 2009/0204466 A1 | 8/2009 | Nielsen et al. |
| 2009/0207019 A1 | 8/2009 | Nielsen et al. |
| 2009/0210285 A1 | 8/2009 | Nielsen et al. |
| 2009/0210298 A1 | 8/2009 | Nielsen et al. |
| 2009/0237263 A1 | 9/2009 | Sawyer, Jr. et al. |
| 2009/0237297 A1 | 9/2009 | Davis et al. |
| 2009/0257620 A1 | 10/2009 | Hicks |
| 2009/0322868 A1 | 12/2009 | Ikeda |
| 2009/0327024 A1 | 12/2009 | Nielsen et al. |
| 2010/0006667 A1 | 1/2010 | Nielsen et al. |
| 2010/0010862 A1 | 1/2010 | Nielsen et al. |
| 2010/0010863 A1 | 1/2010 | Nielsen et al. |
| 2010/0010882 A1 | 1/2010 | Nielsen et al. |
| 2010/0010883 A1 | 1/2010 | Nielsen et al. |
| 2010/0045517 A1 | 2/2010 | Tucker et al. |
| 2010/0088031 A1 | 4/2010 | Nielsen et al. |
| 2010/0088134 A1 | 4/2010 | Nielsen et al. |
| 2010/0088164 A1 | 4/2010 | Nielsen et al. |
| 2010/0090700 A1 | 4/2010 | Nielsen et al. |
| 2010/0109670 A1 | 5/2010 | Arnaud |
| 2010/0188088 A1 | 7/2010 | Nielsen et al. |
| 2010/0188407 A1 | 7/2010 | Nielsen et al. |
| 2010/0189312 A1 | 7/2010 | Nielsen et al. |
| 2010/0189887 A1 | 7/2010 | Nielsen et al. |
| 2010/0198663 A1 | 8/2010 | Nielsen et al. |
| 2010/0201690 A1 | 8/2010 | Nielsen et al. |
| 2010/0205031 A1 | 8/2010 | Nielsen et al. |
| 2010/0205032 A1 | 8/2010 | Nielsen et al. |
| 2010/0245086 A1 | 9/2010 | Nielsen et al. |
| 2010/0253511 A1 | 10/2010 | Nielsen et al. |
| 2010/0253513 A1 | 10/2010 | Nielsen et al. |
| 2010/0253514 A1 | 10/2010 | Nielsen et al. |
| 2010/0256981 A1 | 10/2010 | Nielsen et al. |
| 2010/0257029 A1 | 10/2010 | Nielsen et al. |
| 2010/0257477 A1 | 10/2010 | Nielsen et al. |
| 2010/0272885 A1 | 10/2010 | Olsson |
| 2010/0285211 A1 | 11/2010 | Nielsen et al. |
| 2010/0318401 A1 | 12/2010 | Nielsen et al. |
| 2010/0318402 A1 | 12/2010 | Nielsen et al. |
| 2010/0318465 A1 | 12/2010 | Nielsen et al. |
| 2011/0020776 A1 | 1/2011 | Nielsen et al. |
| 2011/0022433 A1 | 1/2011 | Nielsen et al. |
| 2011/0035245 A1 | 2/2011 | Nielsen et al. |
| 2011/0035251 A1 | 2/2011 | Nielsen et al. |
| 2011/0035252 A1 | 2/2011 | Nielsen et al. |
| 2011/0035260 A1 | 2/2011 | Nielsen et al. |
| 2011/0035324 A1 | 2/2011 | Nielsen et al. |
| 2011/0035328 A1 | 2/2011 | Nielsen et al. |
| 2011/0040589 A1 | 2/2011 | Nielsen et al. |
| 2011/0040590 A1 | 2/2011 | Nielsen et al. |
| 2011/0045175 A1 | 2/2011 | Nielsen et al. |
| 2011/0046993 A1 | 2/2011 | Nielsen et al. |
| 2011/0046994 A1 | 2/2011 | Nielsen et al. |
| 2011/0093306 A1 | 4/2011 | Nielsen et al. |
| 2011/0131081 A1 | 6/2011 | Nielsen et al. |
| 2011/0241936 A1 | 10/2011 | Sawyer, Jr. et al. |
| 2011/0279229 A1 | 11/2011 | Nielsen et al. |
| 2011/0279230 A1 | 11/2011 | Nielsen et al. |
| 2011/0283217 A1 | 11/2011 | Nielsen et al. |
| 2011/0285749 A1 | 11/2011 | Nielsen et al. |
| 2012/0036140 A1 | 2/2012 | Nielsen et al. |
| 2012/0065924 A1 | 3/2012 | Nielsen et al. |
| 2012/0065944 A1 | 3/2012 | Nielsen et al. |
| 2012/0066137 A1 | 3/2012 | Nielsen et al. |
| 2012/0066273 A1 | 3/2012 | Nielsen et al. |
| 2012/0069178 A1 | 3/2012 | Nielsen et al. |
| 2012/0072035 A1 | 3/2012 | Nielsen et al. |
| 2012/0083968 A1 | 4/2012 | Greiner |
| 2012/0110019 A1 | 5/2012 | Nielsen et al. |
| 2012/0113244 A1 | 5/2012 | Nielsen et al. |
| 2012/0257785 A1 | 10/2012 | Narayan et al. |
| 2012/0259550 A1 | 10/2012 | Du |
| 2012/0290901 A1 | 11/2012 | Kim |
| 2012/0328162 A1 | 12/2012 | Nielsen et al. |
| 2013/0174072 A9 | 7/2013 | Nielsen et al. |
| 2013/0265138 A1 | 10/2013 | Nielsen et al. |
| 2013/0287500 A1 | 10/2013 | Miller |
| 2013/0315449 A1 | 11/2013 | Nielsen et al. |
| 2013/0325542 A1 | 12/2013 | Tucker et al. |
| 2014/0022272 A1 | 1/2014 | Nielsen et al. |
| 2014/0035587 A1 | 2/2014 | Nielsen et al. |
| 2014/0074970 A1 | 3/2014 | Nielsen et al. |
| 2014/0122149 A1 | 5/2014 | Nielsen et al. |
| 2014/0278661 A1 | 9/2014 | Nielsen et al. |
| 2014/0304041 A1 | 10/2014 | Nielsen et al. |
| 2014/0321717 A1 | 10/2014 | Nielsen et al. |
| 2014/0334878 A1 | 11/2014 | Miller |
| 2014/0347396 A1 | 11/2014 | Nielsen et al. |
| 2015/0009608 A1 | 1/2015 | Nielsen et al. |

FOREIGN PATENT DOCUMENTS

| | | |
|---|---|---|
| CA | 2418157 | 7/2004 |
| CA | 2423148 | 9/2004 |
| CA | 2574595 | 2/2006 |
| CA | 2811172 | 2/2006 |
| CA | 2528795 | 6/2007 |
| CA | 2632267 | 6/2007 |
| CA | 2643844 | 9/2007 |
| CA | 2631574 | 9/2008 |
| CA | 2739110 | 4/2010 |
| CA | 2713282 | 3/2013 |
| EP | 1726722 | 11/2006 |
| EP | 1769270 | 4/2007 |
| WO | WO02067083 | 8/2002 |
| WO | WO2005052627 | 6/2005 |
| WO | WO2006014724 | 2/2006 |
| WO | WO2007067898 | 6/2007 |
| WO | WO2007106871 | 9/2007 |
| WO | WO2008005837 | 1/2008 |

OTHER PUBLICATIONS

Notice of Filing of Defendants' Second Amended Answer and Counterclaims filed Jun. 12, 2015; Case No. 2:13-cv-346 (MSD) (TEM); *CertusView Technologies, LLC v. S&N Locating Services, LLC et al.*, (Eastern District of Virginia).
Office Action dated Jun. 18, 2015 from U.S. Appl. No. 12/703,322.
Office Action dated May 21, 2015 from U.S. Appl. No. 13/950,655.
Notice of Allowance dated Jun. 5, 2015 from U.S. Appl. No. 13/191,048.
Office Action dated May 15, 2015 from U.S. Appl. No. 14/194,718.
Notice of Allowance dated Jun. 4, 2015 from U.S. Appl. No. 13/190,185.
Notice of Allowance dated Jun. 19, 2015 from U.S. Appl. No. 13/194,121.
US 8,583,461, 04/2010, Nielsen et al. (withdrawn).
U.S. Appl. No. 14/194,718, filed Mar. 1, 2014, Nielsen et al.
U.S. Appl. No. 14/577,353, filed Dec. 19, 2014, Nielsen et al.
Common Ground Alliance, Mar. 2008, "Best Practices Version 5.0", archived online: CGA | Best Practices 2008 <http://web.archive.org/web/20101009040317/http://www.commongroundalliance.com/Content/NavigationMenu/Best_Practices_2008/BP_5.0_March2008Final.pdf[Best Practices 5.0].
"Online Service, Software Enable Faster Data Collection," Mapping underground in real-time, Mar. 2007, pp. 18-19.
2001-2004 News, Jul. 5, 2004 City of Madison Implements TelDig Utility & TelDig Mobile, 12 pages.
ArcFM UT, "A GIS is for Utilities Based on Standards," White Paper, AED SICAD, Sep. 2008, 1-28.
ArcFM, White Paper, 2006, 1-28.
ArcGIS 9, Geocoding in ArcGIS, Manual, 2004, 1-192.
ArcPad, Mobile GIS Software for Field Mapping Applications, brochure, 2006, http:/www.esri.com/library/brochures/pdfs/arcpadbro.pdf.
ArcPad: Mobile GIS, ESRI White Paper, Sep. 2004, 1-17, http://www.esri.com/library/whitepapers/pdfs/arcpad.pdf.
Avoiding Utility Relocations, U.S. Department of Transportation Federal Highway Administration, Publication No. FHWA-IF-02-049, Jul. 2002, 128 pages.

(56) References Cited

OTHER PUBLICATIONS

Ayers, S., Technology Update, 21 pages.
Bernold, L.E. et al., "A Multi-Sensory Approach to 3-D Mapping of Underground Utilities," article by Bernold, Venkatesan, and Suvarna, pp. 1-6.
Borsan, T. et al., "Setting Up a Database to Record Preventive and Salvage Archeological Excavations," article by Borsan, Ludsan, Dimen, Ienciu, and Oprea, Dec. 1, 1918, pp. 237-242.
CGA, Common Ground Alliance, Best Practices, Version 1.0, Apr. 2003, 93 pages.
CGA, Common Ground, Study of One-Call Systems and Damage Prevention Best Practices, Aug. 1999, 262 pages.
Chhabra, K. "Integrated GIS Work Environment with ESRI Products," A paper for the ESRI Users Conference 2004, 7 pages.
Chmura, A. "Project to Create GPS Excavation Monitoring System," Development of Encroachment Notification, Jul./Aug. 2008, 1 page.
Clark et al., "Using ArcPad," ArcPad 6, 398 pages.
Collection and Depiction of Existing Subsurface Utility Data, pp. 7-9.
Complaint for Patent Infringement dated Apr. 10, 2013, *CertusView Technologies LLC v. United States Infrastructure Corporation et al.*, Case No. 2:13CV182, USDC Eastern District of Virginia.
Complaint for Patent Infringement dated May 28, 2013, *CertusView Technologies LLC v. S&N Locating Services, LLC et al.*, Case No. 1:13CV346, USDC Eastern District of Virginia.
Corrected Notice of Allowability dated Apr. 25, 2014 from U.S. Appl. No. 13/191,048.
Corrected Notice of Allowability dated May 22, 2014 from U.S. Appl. No. 13/191,048.
Corrected Notice of Allowability dated May 22, 2014 from U.S. Appl. No. 13/191,058.
Corrected Notice of Allowability dated Nov. 10, 2014 from U.S. Appl. No. 13/741,080.
Corrected Notice of Allowability dated Aug. 21, 2014 from U.S. Appl. No. 12/369,565.
Corrected Notice of Allowabilty dated Feb. 27, 2014 from U.S. Appl. No. 13/191,058.
Cut Field-Mapping Time in Half Using Mobile GIS, Edgecomb County, 4 pages.
DigiTerra Explorer, brochure, v. 6, 2009, 1-2.
DigiTerra Explorer, User Manual, v. 5, 2007, 1-64.
Doyle, K., UGI Utilities: Delivering enhanced service, Energy Digital, http://www.energydigital.com/company-report/ugi-utilities-delivering-enhanced-service (original publication date unknown), retrieved Aug. 1, 2011, 3 pages.
Edgecomb County, North Carolina, Maps and Inventories Water/Wastewater Infrastructure with GIS and GPS, Field Mapping Time Cut in Half, 4 pages.
Eide, S.E. et al., "3D Utility Mapping Using Electronically Scanned Antenna Array," 9th International Conference on Ground Penetrating Radar, Apr. 29-May 2, 2002, 5 pages.
Examination Report dated Oct. 9, 2014 from Australian Application No. 2013204039.
Examination Report dated Oct. 23, 2013 from Australian Application No. 2010214044.
Expert CV and Testimony of Ivan Zatkovich (10 pages); Case 2:13-cv-00346-MSD-LRLVAED *CertusView Technologies, LLC v. S&N Locating Services*; Apr. 29, 2014 (Eastern District of Virginia).
Expert Report of Ivan Zatkovich Regarding the Invalidity of U.S. Pat. No. 8,265,344, U.S. Pat. No. 8,290,204, U.S. Pat. No. 8,340,359, U.S. Pat. No. 8,407,001, and U.S. Pat. No. 8,532,341, dated Sep. 3, 2014; Case 2:13-cv-00346-MSD-LRLVAED *CertusView Technologies, LLC v. S&N Locating Services*; Apr. 29, 2014 (Eastern District of Virginia).
Farag, A., R&D for Damage Prevention, Damage Prevention Conference paper, Apr. 2008, 24 pages.
Georgia Underground Marking Standards, PSC Rule 515-9-4.14, published online May 2, 2008, http://www.gaupc.com/userfiles/file/Marking_Standards_Presentation_05_02_08.pdf.

Georgia UPC EDEN, Web Entry Instruction Manual, www.gaupc.org, Jan. 22, 2009, 60 pages.
GIS Best Practices, GIS for Public Works, Aug. 2006, 26 pages.
GIS Landbase Solutions, 2 pages.
GPS Technology Enhancing Underground Utility Locating, Underground Construction Magazine, Apr. 7, 2010, 4 pages, http://www.undergroundconstructionmagazine.com/print/1034?pages=show.
Ground Penetrating Radar Systems webpage, Feb. 28, 2008, 3 pages.
H.L. Smith, Letter dated Jan. 14, 2011, with two attachments each dated Jan. 5, 2011.
H.L. Smith, Letter dated Oct. 27, 2010.
Haas, J. et al., "Feed the FLAME—Utility Integrates Field Applications," GeoWorld, Mar. 2007, 5 pages, online: Systems Integration Articles/Enspiria Solutions.
Heath, M. et al., "Comparison of Edge Detectors: A Methodology and Initial Study," 1996, IEEE Computer Society Press; http://citeseerx.ist.psu.edu/viewdoc/summary?doi=10.1.45.5214.
InMaps Develops Critical Database Link to Keep UGI Automation on Track, Holderness, NH, Sep. 2006, http://www.inmaps.com/InMaps-develops-critical-database-link-to-keep-ugi-automation-on-track, 1 page.
International Search Report and Written Opinion, Application No. PCT/2010/00378, Apr. 20, 2010.
International Search Report and Written Opinion, Application No. PCT/US2009/000859, Apr. 14, 2009.
International Search Report and Written Opinion, Application No. PCT/US2011/45203, Dec. 22, 2011.
International Search Report, Application No. PCT/US10/041160, Oct. 6, 2010.
Invalidity Claim Chart—Application of TelDig Systems and ESRI to Claims 1, 2, 17, 19, 20, 21, 22, 40 and 42 of U.S. Pat. No. 8,290,204 (Exhibit 9-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1, 2, 5, 10, 12, 18, 20, 21 and 23 of U.S. Pat. No. 8,340,359 (Exhibit 9-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1, 3-7, 9-10, 12, 14, 16-20, 22-23, 25 and 28 of U.S. Pat. No. 8,532,341 (Exhibit 9-D); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems and ESRI to Claims 1-2, 4-7, 10-15, 17-20, and 23-26 of U.S.P.N. 8,265,344 (Exhibit 9-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 17, 19, 20, 21, 22, 40 and 42 of U.S. Pat. No. 8,290,204 (Exhibit 5-A); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 4, 5, 6, 7, 10, 11, 12, 13, 14, 15, 17, 18 19, 20, 23, 24, 25 and 26 of U.S. Pat. No. 8,265,344 (Exhibit 5-C); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 2, 5, 10, 12, 18, 20, 21 and 23 of U.S. Pat. No. 8,340,359 (Exhibit 5-B); Case 2:13-cv-00346-MSD-LRLVAED *CertusView Technologies, LLC v. S&N Locating Services*; Apr. 29, 2014 (Eastern District of Virginia).
Invalidity Claim Chart—Application of TelDig Systems to Claims 1, 3, 13, 14, 16, 18, 22, 27, 28, 29, and 30 of U.S. Pat. No. 8,407,001 (Exhibit 5-E); Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

Invalidity Claim Chart—Application of TelDig Systems to Claims 1, 3, 4, 5, 6, 7, 9, 10, 12, 14, 16, 17, 18, 19, 20, 22, 23, 25 and 28 of U.S. Pat. No. 8,532,341 (Exhibit 5-D); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and Avoiding Utility Regulations to Claims 1, 3, 13-14, 16, 18, 22, and 27-30 of U.S. Pat. No. 8,407,001 (Exhibit 8-E); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and Avoiding Utility Regulations to Claims 1, 3-7, 9-10, 12, 14, 16-20, 22-23, 25 and 28 of U.S. Pat. No. 8,532,341 (Exhibit 8-D); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and Avoiding Utility Regulations to Claims 1-2, 17, 19-22, 40 and 42 of U.S. Pat. No. 8,290,204 (Exhibit 8-A); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and Avoiding Utility Regulations to Claims 1-2, 4-7, 10-15, 17-20, and 23-26 of U.S. Pat. No. 8,265,344 (Exhibit 8-C); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and Avoiding Utility Regulations to Claims 1-2, 5, 10, 12, 18, 20-21 and 23 of U.S. Pat. No. 8,340,359 (Exhibit 8-B); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and WO 2008/005837 (Tucker '837) to Claims 1, 2, 17, 19, 20-22, 40 and 42 of U.S. Pat. No. 8,290,204 (Exhibit 10-A); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and WO 2008/005837 (Tucker '837) to Claims 1, 3-7, 9-10, 12, 14, 16-20, 22-23, 25 and 28 of U.S. Pat. No. 8,532,341 (Exhibit 10-D); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and WO 2008/005837 (Tucker '837) to Claims 1-2, 4-7, 10-15, 17-20, and 23-26 of U.S. Pat. No. 8,265,344 (Exhibit 10-C); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II and WO 2008/005837 (Tucker '837) to Claims 1-2, 5, 10, 12, 18, 20-21 and 23 of U.S. Pat. No. 8,340,359 (Exhibit 10-B); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II to Claims 1, 2, 17, 19, 20, 21, 22, 40 and 42 of U.S. Pat. No. 8,290,204 (Exhibit 4-A); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II to Claims 1, 2, 5, 10, 12, 18, 20, 21 and 23 of U.S. Pat. No. 8,340,359 (Exhibit 4-B); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II to Claims 1, 3, 13, 14, 16, 18, 22, 27, 28, 29, and 30 of U.S. Pat. No. 8,407,001 (Exhibit 4-E); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II to Claims 1, 3-7, 9-10, 12, 14, 16-20, 22-23, 25, and 28 of U.S. Pat. No. 8,532,341 (Exhibit 4-D); Case 2:13-cv-00346-MSD-LRLVAED *CertusView Technologies, LLC v. S&N Locating Services*; Apr. 29, 2014 (Eastern District of Virginia).

Invalidity Claim Chart—Application of Virginia Pilot Program—Phases I and II to Claims 1-2, 4-7, 1015, 17-20, and 23-26 of U.S. Pat. No. 8,265,344 (Exhibit 4-C); Case 2:13-cv-00346-MSD-LRLVAED *CertusView Technologies, LLC v. S&N Locating Services*; Apr. 29, 2014 (Eastern District of Virginia).

Invalidity Claim Chart—Application of WO 2007/106871 ("Tucker '871") to Claims 1, 2, 17, 19, 20, 21, 22, 40 and 42 of U.S. Pat. No. 8,290,204 (Exhibit 2-A); Case 2:13-cv-00346-MSD-LRLVAED *CertusView Technologies, LLC v. S&N Locating Services*; Apr. 29, 2014 (Eastern District of Virginia).

Invalidity Claim Chart—Application of WO 2007/106871 ("Tucker '871") to Claims 1, 2, 5, 10, 12, 18, 20, 21, and 23 of U.S. Pat. No. 8,340,359 (Exhibit 2-B); Case 2:13-cv-00346-MSD-LRLVAED *CertusView Technologies, LLC v. S&N Locating Services*; Apr. 29, 2014 (Eastern District of Virginia).

Invalidity Claim Chart—Application of WO 2007/106871 ("Tucker '871") to Claims 1, 3, 13, 14, 16, 18, 22, 27, 28, 29, and 30 of U.S. Pat. No. 8,407,001 (Exhibit 2-E); Case 2:13-cv-00346-MSD-LRLVAED *CertusView Technologies, LLC v. S&N Locating Services*; Apr. 29, 2014 (Eastern District of Virginia).

Invalidity Claim Chart—Application of WO 2007/106871 ("Tucker '871") to Claims 1, 3-7, 9-10, 12, 14, 16-20, 22-23, 25 and 28 of U.S. Pat. No. 8,532,341 (Exhibit 2-D); Case 2:13-cv-00346-MSD-LRLVAED *CertusView Technologies, LLC v. S&N Locating Services*; Apr. 29, 2014 (Eastern District of Virginia).

Invalidity Claim Chart—Application of WO 2007/106871 ("Tucker '871") to Claims 1-2, 4-7, 10-15, 17-20, and 23-26 of U.S. Pat. No. 8,265,344 (Exhibit 2-C); Case 2:13-cv-00346-MSD-LRLVAED *CertusView Technologies, LLC v. S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of "3D Utility Mapping Electronically Scanned Antenna Array" by Egil Side and Jens F. Hjelmstad (the "Eide" Reference) (Exhibit 51-A); S&N Invalidity Contentions; Case 2:13-cv-00346-MSD-LRLVAED *CertusView Technologies, LLC v. S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of "A Multi-Sensory Approach to 3-D Mapping of Underground Utilities" by Leonard E. Bernold and Lashminarayan Venkatesan (hereinafter referred to as the "Bernold" reference) (Exhibit 49-A); S&N Invalidity Contentions; Case 2:13-cv-00346-MSD-LRLVAED *CertusView Technologies, LLC v. S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of "New Approaches for Preventing Damage to Gas and Oil Pipelines," article by Joe Zhou for Canberra Joint Technical Meeting (Exhibit 16-A); S&N Invalidity Contentions; Case 2:13-cv-00346-MSD-LRLVAED *CertusView Technologies, LLC v. S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of "New Approaches for Preventing Damage to Gas and Oil Pipelines," presentation by Joe Zhou at Canberra Joint Technical Meeting (Exhibit 15-A); S&N Invalidity Contentions; Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

Invalidity Claim Chart for claims 1, 2, 17, 19, 20, 21, 22, 40 and 42 of U.S. Pat. No. 8,290,204 in view of "Online Service, Software Enable Faster Data Collection" article in Underground Focus (Mar. 2007) (Exhibit 8-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Project to Create GPS Excavation Monitoring System," Underground Focus (Exhibit 24-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Merging Two GIS Platforms for Utility Data into One: FRAMME to ESRI Conversion and all of the other pieces and parts" (2005) (Exhibit 53-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Using I.T. To Improve the Efficiency and Accuracy of Network Data Collection," IEEE AFRICON, Rex van Olst and Barry Dwolatzky (Exhibit 37-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of An Investigation of Geobase Mission Data Set Design, Implementation, & Usage Within Air Force Civil Engineer Electrical and Utilities Work Centers (Exhibit 36-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of ArcGIS Software (2000) (Exhibit 59-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of ArcIMS Software (2000) (Exhibit 56-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of ArcPad 6 Software (2000) (Exhibit 58-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Edgecombe County, Cut Field-Mapping Time in Half Using Mobile GIS (Exhibit 25-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Geographic Location Tags on Digital Images (Exhibit 50-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of GIS for Public Works Presentation (Aug. 2006) (Exhibit 54-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of GO! Sync™ Software (2005) (Exhibit 57-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Guardian ProStar/ProStar Data Collection Software (PointMan and/or Predator Products (Oct. 15, 2006) (Exhibit 3-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Guardian ProStar/ProStar Mapping Components (Oct. 15, 2006) (Exhibit 7-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Guardian ProStar/ProStar Web Portal (Oct. 15, 2006) (Exhibit 5-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Guardian ProStar/ProStar Web Services (Oct. 15, 2006) (Exhibit 4-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of OnPoint Software (2005) (Exhibit 55-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Phase I—Electronic White Lining Project Report (Nov. 2007) (Exhibit 17-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Technologies to Accurately and Cost-Effectively Detect and Identify Unauthorized Acitivity Near Pipelines (Exhibit 18-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Triangulation, http://searchnetworking.techtarget.com/definition/triangulation (Exhibit 14-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Tucker References (Exhibit 2-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Department of Transportation Federal Highway Administration, Publication No. FHWA-IF-02-049 (Exhibit 12-A); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 7,372,276 (Exhibit 43-A); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 2, 17, 19, 20, 21, 22, 40 and 42 of U.S. Pat. No. 8,290,204 in view of U.S. Patent Publication No. 2002/0059296 (Exhibit 45-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pub. No. 2005/0183028A1 (Aug. 18, 2005) (Exhibit 41-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of US 2002/0044690 (Exhibit 47-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of US 2007/0118278 (Exhibit 33-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of US 2012/0259550 (Exhibit 29-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 8150826 (Exhibit 30-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Virginia Pilot Program—Phases I and II (Exhibit 1-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Finding Buried Utilities Before They Find You," article by Daniel P. Duffy (Exhibit 13-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "GRISLEE: Gasmain Repair & Inspection System for Live Entry Environments," article by Schempf, Mutschler, Goltsberg, and Crowley (Exhibit 39-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Introduction to ArcPad Mobile GIS," Gregory Vandeberg, Ph.D., presentation at ND GIS Users Conference (Exhibit 26-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of "Using ArcPad," ArcPad 6, Clarke, Greenwald, and Spalding (Exhibit 27-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of A Data Platform for Managing Utilities Along Highway Corridors (Exhibit 35-A); S&N Invalidity Contentions; Case 2:13-cv-00346-MSD-LRLVAED *CertusView Technologies, LLC v. S&N Locating Services*; Apr. 29, 2014 (Eastern District of Virginia).

Invalidity Claim Chart for claims 1, 2, 17, 19, 20, 21, 22, 40 and 42 of U.S. Pat. No. 8,290,204 in view of Common Ground—Study of One-Call Systems and Damage Prevention Best Practices ("Common Ground") (Exhibit 52-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Empowering Electric and Gas Utilities with GIS (Exhibit 40-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Integrated GIS Work Environment With ESRI Products, Paper for ESRI Users Conference 2004 (Exhibit 28-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of Intelligent Utility Locating Tool for Excavators, Kolera and Bernold (Exhibit 38-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 6,701,647 (Mar. 9, 2004) (Exhibit 42-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 5,991,694 (Gudat) (Exhibit 34-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 6,957,250 (hereinafter referred to as "Nakano") (Exhibit 44-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of US 2004/0168358 (Exhibit 31-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view of U.S. Pat. No. 6,597,992 (Exhibit 32-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 in view US 2007/0258642 (Exhibit 46-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and 42 of U.S. Pat. No. 8,290,204 of Guardian ProStar/ProStar Data Services (Oct. 15, 2006) (Exhibit 6-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 17, 19, 20, 21, 22, 40 and of U.S. Pat. No. 8,290,204 in view of American Society of Civil Engineers Standard Guideline for the Collection and Depiction of Existing Subsurface Utility Data ("ASCE") (Exhibit 11-A); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6 7, 10, 11, 12, 13, 14, 15, 17, 18, 19, 20, 23, 24, 25 and 26 of U.S. Pat. No. 8,265,344 in view of Guardian ProStar/ProStar Web Portal (Oct. 15, 2006) (Exhibit 5-C); S&N Invalidity Contentions; Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "3D Utility Mapping Electronically Scanned Antenna Array" by Egil Side and Jens F. Hjelmstad (the "Eide" Reference) (Exhibit 51-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "A Multi-Sensory Approach to 3-D Mapping of Underground Utilities" by Leonard E. Bernold and Lashminarayan Venkatesan (hereinafter referred to as the "Bernold" reference) (Exhibit 49-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Finding Buried Utilities Before They Find You," article by Daniel P. Duffy (Exhibit 13-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "GRISLEE: Gasmain Repair & Inspection System for Live Entry Environments," article by Schempf, Mutschler, Goltsberg, and Crowley (Exhibit 39-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Introduction to ArcPad Mobile GIS," Gregory Vandeberg, Ph.D., presentation at ND GIS Users Conference (Exhibit 26-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Merging Two GIS Platforms for Utility Data into One: FRAMME to ESRI Conversion and all of the other pieces and parts" (2005) (Exhibit 53-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Project to Create GPS Excavation Monitoring System," Underground Focus (Exhibit 24-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Using ArcPad," ArcPad 6, Clarke, Greenwald, and Spalding (Exhibit 27-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of "Using I.T. to Improve the Efficiency and Accuracy of Network Data Collection," IEEE AFRICON, Rex van Olst and Barry Dwolatzky (Exhibit 37-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of A Data Platform for Managing Utilities Along Highway Corridors (Exhibit 35-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of an Investigation of Geobase Mission Data Set Design, Implementation, & Usage Within Air Force Civil Engineer Electrical and Utilities Work Centers (Exhibit 36-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of ArcGIS Software (2000) (Exhibit 59-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of ArcIMS Software (2000) (Exhibit 56-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of ArcPad 6 Software (2000) (Exhibit 58-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Common Ground—Study of One-Call Systems and Damage Prevention Best Practices ("Common Ground") (Exhibit 52-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Edgecombe County, Cut Field-Mapping Time in Half Using Mobile GIS (Exhibit 25-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Empowering Electric and Gas Utilities with GIS (Exhibit 40-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Geographic Location Tags on Digital Images (Exhibit 50-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of GIS for Public Works Presentation (Aug. 2006) (Exhibit 54-C); S&N Invalidity Contentions; Case 2:13-cv-00346-MSD-LRLVAED CertusView Technologies, LLC v. S&N Locating Services; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of GO! Sync™ Software (2005) (Exhibit 57-C); S&N Invalidity Contentions; Case 2:13-cv-00346-MSD-LRLVAED CertusView Technologies, LLC v. S&N Locating Services; Apr. 29, 2014 (Eastern District of Virginia).

(56) References Cited

OTHER PUBLICATIONS

Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Integrated GIS Work Environment With ESRI Products, Paper for ESRI Users Conference 2004 (Exhibit 28-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of Intelligent Utility Locating Tool for Excavators, Kolera and Bernold (Exhibit 38-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of OnPoint Software (2005) (Exhibit 55-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 6,701,647 (Mar. 9, 2004) (Exhibit 42-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 5,991,694 (Gudat) (Exhibit 34-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 6,957,250 (hereinafter referred to as "Nakano") (Exhibit 44-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 7,372,276 (Exhibit 43-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Patent Publication No. 2002/0059296 (Exhibit 45-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pub. No. 2005/0183028A1 (Aug. 18, 2005) (Exhibit 41-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of US 2002/0044690 (Exhibit 47-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of US 2004/0168358 (Exhibit 31-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of US 2007/0118278 (Exhibit 33-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of US 2007/0258642 (Exhibit 46-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of US 2012/0259550 (Exhibit 29-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 6,597,992 (Exhibit 32-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18 19, 20, 23, 24, 25 and 26 of U.S. Pat. No. 8,265,344 in view of U.S. Pat. No. 8150826 (Exhibit 30-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of "New Approaches for Preventing Damage to Gas and Oil Pipelines," article by Joe Zhou for Canberra Joint Technical Meeting (Exhibit 16-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of "Online Service, Software Enable Faster Data Collection" article in Underground Focus (Mar. 2007) (Exhibit 8-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of American Society of Civil Engineers Standard Guideline for the Collection and Depiction of Existing Subsurface Utility Data ("ASCE") (Exhibit 11-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Guardian ProStar/ProStar Data Collection Software (PointMan and/or Predator Products) (Oct. 15, 2006) (Exhibit 3-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Guardian ProStar/ProStar Data Services (Oct. 15, 2006) (Exhibit 6-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Guardian ProStar/ProStar Mapping Components (Oct. 15, 2006) (Exhibit 7-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Guardian ProStar/ProStar Web Services (Oct. 15, 2006) (Exhibit 4-C); S&N Invalidity Contentions; Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of New Approaches for Preventing Damage to Gas and Oil Pipelines presentation by Joe Zhou at Canberra Joint Technical Meeting (Exhibit 15-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Phase I—Electronic White Lining Project Report (Nov. 2007) (Exhibit 17-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Technologies to Accurately and Cost-Effectively Detect and Identify Unauthorized Activity Near Pipelines (Exhibit 18-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Triangulation, ttp://searchnetworking.techtarget.com/definition/triangulation (Exhibit 14-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Tucker References (Exhibit 2-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of U.S. Department of Transportation Federal Highway Administration, Publication No. FHWA-IF-02-049 (Exhibit 12-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 4, 5, 6, 7, 10, 11, 12, 13, 14, 15, 17, 18, 19, 20, 23, 24, 25 and 26 of U.S. Pat. No. 8,265,344 in view of Virginia Pilot Program—Phases I and II (Exhibit 1-C); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "3D Utility Mapping Electronically Scanned Antenna Array" by Egil Side and Jens F. Hjelmstad (the "Eide" Reference) (Exhibit 51-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "A Multi-Sensory Approach to 3-D Mapping of Underground Utilities" by Leonard E. Bernold and Lashminarayan Venkatesan (hereinafter referred to as the "Bernold" reference) (Exhibit 49-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "New Approaches for Preventing Damage to Gas and Oil Pipelines," article by Joe Zhou for Canberra Joint Technical Meeting (Exhibit 16-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "New Approaches for Preventing Damage to Gas and Oil Pipelines," presentation by Joe Zhou at Canberra Joint Technical Meeting (Exhibit 15-B); S&N Invalidity Contentions; Case 2:13-cv-00346-MSD-LRLVAED *CertusView Technologies, LLC v. S&N Locating Services*; Apr. 29, 2014 (Eastern District of Virginia).nia).
Invalidity Claim Chart for claims 1, 2, 5, 10, 12, 18, 20, 21 and 23 of U.S. Pat. No. 8,340,359 in view of "Online Service, Software Enable Faster Data Collection" article in Underground Focus (Mar. 2007) (Exhibit 8-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "Finding Buried Utilities Before They Find You," article by Daniel P. Duffy (Exhibit 13-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "GRISLEE: Gasmain Repair & Inspection System for Live Entry Environments," article by Schempf, Mutschler, Goltsberg, and Crowley (Exhibit 39-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "Merging Two GIS Platforms for Utility Data into One: FRAMME to ESRI Conversion and all of the other pieces and parts" (2005) (Exhibit 53-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "Project to Create GPS Excavation Monitoring System," Underground Focus (Exhibit 24-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of "Using I.T. To Improve the Efficiency and Accuracy of Network Data Collection," IEEE AFRICON, Rex van Olst and Barry Dwolatzky (Exhibit 37-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of American Society of Civil Engineers Standard Guideline for the Collection and Depiction of Existing Subsurface Utility Data ("ASCE") (Exhibit 11-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of an Investigation of Geobase Mission Data Set Design, Implementation, & Usage Within Air Force Civil Engineer Electrical and Utilities Work Centers (Exhibit 36-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of ArcGIS Software (2000) (Exhibit 59-B); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 2, 5, 10, 12, 18, 20, 21 and 23 of U.S. Pat. No. 8,340,359 in view of ArcIMS Software (2000) (Exhibit 56-B); S&N Invalidity Contentions; Case 2:13-cv-00346-MSD-LRLVAED *CertusView Technologies, LLC v. S&N Locating Services*; Apr. 29, 2014 (Eastern District of Virginia).

(56) References Cited

OTHER PUBLICATIONS

Invalidity Claim Chart for claims 1, 2, 5, 10, 12, 18, 20, 21 and 23 of U.S. Pat. No. 8,340,359 in view of ArcPad 6 Software (2000) (Exhibit 58-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Article titled "Setting Up a Database to Record Preventative and Salvage Archeological Excavations," by Borsan, Ludusan, Dimen, lenciu, and Oprea (hereinafter referred to as "Borsan") (Exhibit 48-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of COMMON GROUND—Study of One-Call Systems and Damage Prevention Best Practices ("Common Ground") (Exhibit 52-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Edgecombe County, Cut Field-Mapping Time in Half Using Mobile GIS (Exhibit 25-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Geographic Location Tags on Digital Images (Exhibit 50-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of GIS for Public Works Presentation (Aug. 2006) (Exhibit 54-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Go! Sync™ Software (2005) (Exhibit 57-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Guardian ProStar/ProStar Data Collection Software (PointMan and/or Predator Products) (Oct. 15, 2006); (Exhibit 3-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Guardian ProStar/ProStar Data Services (Oct. 15, 2006) (Exhibit 6-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Guardian ProStar/ProStar Mapping Components (Oct. 15, 2006) (Exhibit 7-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Guardian ProStar/ProStar Web Portal (Oct. 15, 2006) (Exhibit 5-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Guardian ProStar/ProStar Web Services (Oct. 15, 2006) (Exhibit 4-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Intelligent Utility Locating Tool for Excavators, Kolera and Bernold (Exhibit 38-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of OnPoint Software (2005) (Exhibit 55-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Phase I—Electronic White Lining Project Report (Nov. 2007) (Exhibit 17-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Technologies to Accurately and Cost-Effectively Detect and Identify Unauthorized Activity Near Pipelines (Exhibit 18-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Triangulation, http://searchnetworking.techtarget.com/definition/triangulation (Exhibit 14-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Department of Transportation Federal Highway Administration, Publication No. FHWA-IF-02-049 (Exhibit 12-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 6,701,647 (Mar. 9, 2004) (Exhibit 42-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 6,957,250 (hereinafter referred to as "Nakano") (Exhibit 44-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 7,372,276 (Exhibit 43-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Patent Publication No. 2002/0059296 (Exhibit 45-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pub. No. 2005/0183028A1 (Aug. 18, 2005) (Exhibit 41-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of US 2002/0044690 (Exhibit 47-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 2, 5, 10, 12, 18, 20, 21 and 23 of U.S. Pat. No. 8,340,359 in view of US 2007/0118278 (Exhibit 33-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of US 2007/0258642 (Exhibit 46-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of US 2012/0259550 (Exhibit 29-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 6,597,992 (Exhibit 32-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 8,150,826 (Exhibit 30-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Virginia Pilot Program—Phases I and II (Exhibit 1-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of "Introduction to ArcPad Mobile GIS," Gregory Vandeberg, Ph.D., presentation at ND GIS Users Conference (Exhibit 26-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of "Using ArcPad," ArcPad 6, Clarke, Greenwald, and Spalding (Exhibit 27-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of A Data Platform for Managing Utilities Along Highway Corridors (Exhibit 35-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Empowering Electric and Gas Utilities with GIS (Exhibit 40-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of Integrated GIS Work Environment With ESRI Products, Paper for ESRI Users Conference 2004 (Exhibit 28-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of U.S. Pat. No. 5,991,694 (Gudat) (Exhibit 34-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 20, 21 and 23 of U.S. Pat. No. 8,340,359 in view of US 2004/0168358 (Exhibit 31-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 2, 5, 10, 12, 18, 21 and 23 of U.S. Pat. No. 8,340,359 in view of Tucker References (Exhibit 2-B); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of "Finding Buried Utilities Before They Find You," article by Daniel P. Duffy (Exhibit 13-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of "New Approaches for Preventing Damage to Gas and Oil Pipelines," presentation by Joe Zhou at Canberra Joint Technical Meeting (Exhibit 15-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of "Online Service, Software Enable Faster Data Collection" article in Underground Focus (Mar. 2007) (Exhibit 8-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of American Society of Civil Engineers Standard Guideline for the Collection and Depicition of Exisiting Subsurface Utility Data ("ASCE") (Exhibit 11-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Guardian ProStar/ProStar Data Collection Software (PointMan and/or Predator Products) (Oct. 15, 2006) (Exhibit 3-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Guardian ProStar/ProStar Data Services (Oct. 15, 2006) (Exhibit 6-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Guardian ProStar/ProStar Mapping Components (Oct. 15, 2006) (Exhibit 7-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Guardian ProStar/ProStar Web Portal (Oct. 15, 2006) (Exhibit 5-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Guardian ProStar/ProStar Web Services (Oct. 15, 2006) (Exhibit 4-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Phase I—Electronic White Lining Project Report (Nov. 2007) (Exhibit 17-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 13, 14, 16, 18, 22, 27, 28, 29 and 30 of U.S. Pat. No. 8,407,001 in view of Technologies to Accurately and Cost-Effectively Detect and Identify Unauthorized Activity Near Pipelines (Exhibit 18-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Triangulation, http://searchnetworking.techtarget.com/definition/triangulation (Exhibit 14-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29 and 30 of U.S. Pat. No. 8,407,001 in view of Tucker References (Exhibit 2-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "New Approaches for Preventing Damage to Gas and Oil Pipelines," article by Joe Zhou for Canberra Joint Technical Meeting (Exhibit 16-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "Project to Create GPS Excavation Monitoring System," Underground Focus (Exhibit 24-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of OnPoint Software (2005) (Exhibit 55-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "3D Utility Mapping Electronically Scanned Antenna Array" by Egil Side and Jens F. Hjelmstad (the "Eide" Reference) (Exhibit 51-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "A Multi-Sensory Approach to 3-D Mapping of Underground Utilities" by Leonard E. Bernold and Lashminarayan Venkatesan (hereinafter referred to as the "Bernold" reference) (Exhibit 49-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "GRISLEE: Gasmain Repair & Inspection System for Live Entry Environments," article by Schempf, Mutschler, Goltsberg, and Crowley (Exhibit 39-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "Introduction to ArcPad Mobile GIS," Gregory Vandeberg, Ph.D., presentation at ND GIS Users Conference (Exhibit 26-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "Merging Two GIS Platforms for Utility Data into One: FRAMME to ESRI Conversion and all of the other pieces and parts" (2005) (Exhibit 53-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "Using ArcPad," ArcPad 6, Clarke, Greenwald, and Spalding (Exhibit 27-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of "Using I.T. To Improve the Efficiency and Accuracy of Network Data Collection," IEEE AFRICON, Rex van Olst and Barry Dwolatzky (Exhibit 37-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of a Data Platform for Managing Utilities Along Highway Corridors (Exhibit 35-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of an Investigation of Geobase Mission Data Set Design, Implementation, & Usage Within Air Force Civil Engineer Electrical and Utilities Work Centers (Exhibit 36-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of ArcGIS Software (2000) (Exhibit 59-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of ArcIMS Software (2000) (Exhibit 56-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of ArcPad 6 Software (2000) (Exhibit 58-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of COMMON GROUND—Study of One-Call Systems and Damage Prevention Best Practices ("Common Ground") (Exhibit 52-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of Edgecombe County, Cut Field-Mapping Time in Half Using Mobile GIS (Exhibit 25-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 13, 14, 16, 18, 22, 27, 28, 29, and 30 of U.S. Pat. No. 8,407,001 in view of Empowering Electric and Gas Utilities with GIS (Exhibit 40-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of Geographic Location Tags on Digital Images (Exhibit 50-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of GIS for Public Works Presentation (Aug. 2006) (Exhibit 54-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of Go! Sync™ Software (2005) (Exhibit 57-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of Integrated GIS Work Environment With ESRI Products, Paper for ESRI Users Conference 2004 (Exhibit 28-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of Intelligent Utility Locating Tool for Excavators, Kolera and Bernold (Exhibit 38-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Department of Transportation Federal Highway Administration, Publication No. FHWA-IF-02-049 (Exhibit 12-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 6,701,647 (Mar. 9, 2004) (Exhibit 42-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 5,991,694 (Gudat) (Exhibit 34-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 6,957,250 (hereinafter referred to as "Nakano") (Exhibit 44-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 7,372,276 (Exhibit 43-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Patent Publication No. 2002/0059296 (Exhibit 45-E); S&N Invalidity Contentions; Case 2:13-cv-00346-MSD-LRLVAED *CertusView Technologies, LLC* v. *S&N Locating Services*; Apr. 29, 2014 (Eastern District of Virginia).

Invalidity Claim Chart for claims 1, 3, 13, 14, 16, 18, 22, 27, 28, 29, and 30 of U.S. Pat. No. 8,407,001 in view of U.S. Pub. No. 2005/0183028A1 (Aug. 18, 2005) (Exhibit 41-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of US 2002/0044690 (Exhibit 47-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of US 2004/0168358 (Exhibit 31-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of US 2007/0118278 (Exhibit 33-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of US 2007/0258642 (Exhibit 46-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of US 2012/0259550 (Exhibit 29-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 6,597,992 (Exhibit 32-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 28, 29, and 30 of U.S. Pat. No. 8,407,001 in view of U.S. Pat. No. 8150826 (Exhibit 30-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 13, 14, 16, 18, 22, 27, 29 and 30 of U.S. Pat. No. 8,407,001 in view of Virginia Pilot Program—Phases I and II (Exhibit 1-E); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7 9, 10, 12, 14, 16, 17, 18, 19, 20, 22, 23, 25 and 28 of U.S. Pat. No. 8,532,341 in view of "New Approaches for Preventing Damage to Gas and Oil Pipelines," presentation by Joe Zhou at Canberra Joint Technical Meeting (Exhibit 15-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "3D Utility Mapping Electronically Scanned Antenna Array" by Egil Side and Jens F. Hjelmstad (the "Eide" Reference) (Exhibit 51-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "A Multi-Sensory Approach to 3-D Mapping of Underground Utilities" by Leonard E. Bernold and Lashminarayan Venkatesan (hereinafter referred to as the "Bernold" reference) (Exhibit 49-D); S&N Invalidity Contentions; Case 2:13-cv-00346-MSD-LRLVAED *CertusView Technologies, LLC* v. *S&N Locating Services*; Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Finding Buried Utilities Before They Find You," article by Daniel P. Duffy (Exhibit 13-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "New Approaches for Preventing Damage to Gas and Oil Pipelines," article by Joe Zhou for Canberra Joint Technical Meeting (Exhibit 16-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Online Service, Software Enable Faster Data Collection" article in Underground Focus (Mar. 2007) (Exhibit 8-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Project to Create GPS Excavation Monitoring System," Underground Focus (Exhibit 24-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "GRISLEE: Gasmain Repair & Inspection System for Live Entry Environments," article by Schempf, Mutschler, Goltsberg, and Crowley (Exhibit 39-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Introduction to ArcPad Mobile GIS," Gregory Vandeberg, Ph.D., presentation at ND GIS Users Conference (Exhibit 26-E); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Merging Two GIS Platforms for Utility Data into One: FRAMME to ESRI Conversion and all of the other pieces and parts" (2005) (Exhibit 53-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Using ArcPad," ArcPad 6, Clarke, Greenwald, and Spalding (Exhibit 27-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of "Using I.T. To Improve the Efficiency and Accuracy of Network Data Collection," IEEE AFRICON, Rex van Olst and Barry Dwolatzky (Exhibit 37-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of A Data Platform for Managing Utilities Along Highway Corridors (Exhibit 35-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of American Society of Civil Engineers Standard Guideline for the Collection and Depiction of Existing Subsurface Utility Data ("ASCE") (Exhibit 11-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of an Investigation of Geobase Mission Data Set Design, Implementation, & Usage Within Air Force Civil Engineer Electrical and Utilities Work Centers (Exhibit 36-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of ArcGIS Software (2000) (Exhibit 59-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of ArcIMS Software (2000) (Exhibit 56-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of ArcPad 6 Software (2000) (Exhibit 58-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Article titled "Setting Up a Database to Record Preventative and Salvage Archeological Excavations," by Borsan, Ludusan, Dimen, Ienciu, and Oprea (hereinafter referred to as "Borsan") (Exhibit 48-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Common Ground—Study of One-Call Systems and Damage Prevention Best Practices ("Common Ground") (Exhibit 52-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Edgecombe County, Cut Field-Mapping Time in Half Using Mobile GIS (Exhibit 25-D); S&N Invalidity Contentions; Case 2:13-cv-00346-MSD-LRLVAED *CertusView Technologies, LLC v. S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Empowering Electric and Gas Utilities with GIS (Exhibit 40-D); S&N Invalidity Contentions; Case 2:13-cv-00346-MSD-LRLVAED *CertusView Technologies, LLC v. S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Geographic Location Tags on Digital Images (Exhibit 50-D); S&N Invalidity Contentions; Case 2:13-cv-00346-MSD-LRLVAED *CertusView Technologies, LLC v. S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of GIS for Public Works Presentation (Aug. 2006) (Exhibit 54-D); S&N Invalidity Contentions; Case 2:13-cv-00346-MSD-LRLVAED *CertusView Technologies, LLC v. S&N Locating Services;* Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of GO! SyncTM Software (2005) (Exhibit 57-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Guardian ProStar/ProStar Data Collection Software (PointMan and/or Predator Products) (Oct. 15, 2006) (Exhibit 3-D); S&N Invalidity Contentions; Case 2:13-cv00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Guardian ProStar/ProStar Data Services (Oct. 15, 2006) (Exhibit 6-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Guardian ProStar/ProStar Mapping Components (Oct. 15, 2006) (Exhibit 7-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Guardian ProStar/ProStar Web Portal (Oct. 15, 2006) (Exhibit 5-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Guardian ProStar/ProStar Web Services (Oct. 15, 2006) (Exhibit 4-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Integrated GIS Work Environment With ESRI Products, Paper for ESRI Users Conference 2004 (Exhibit 28-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Intelligent Utility Locating Tool for Excavators, Kolera and Bernold (Exhibit 38-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of OnPoint Software (2005) (Exhibit 55-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Phase I—Electronic White Lining Project Report (Nov. 2007) (Exhibit 17-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Technologies to Accurately and Cost-Effectively Detect and Identify Unauthorized Activity Near Pipelines (Exhibit 18-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Triangulation, http://searchnetworking.techtarget.com/definition/triangulation (Exhibit 14-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Tucker References (Exhibit 2-D); S&N Invalidity Contentions; Case 2:13-cv-00346-MSD-LRLVAED *CertusView Technologies, LLC* v. *S&N Locating Services*(Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Department of Transportation Federal Highway Administration, Publication No. FHWA-IF-02-049 (Exhibit 12-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 6,701,647 (Mar. 9, 2004) (Exhibit 42-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 5,991,694 (Gudat) (Exhibit 34-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 6,957,250 (hereinafter referred to as "Nakano") (Exhibit 44-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 7,372,276 (Exhibit 43-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Patent Publication No. 2002/0059296 (Exhibit 45-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pub. No. 2005/0183028A1 (Aug. 18, 2005) (Exhibit 41-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of US 2002/0044690 (Exhibit 47-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of US 2004/0168358 (Exhibit 31-D); S&N Invalidity Contentions; Case 2:13-cv-00346-MSD-LRLVAED *CertusView Technologies, LLC* v. *S&N Locating Services;* Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of US 2007/0118278 (Exhibit 33-D); S&N Invalidity Contentions; Case 2:13-cv-00346-MSD-LRLVAED *CertusView Technologies, LLC* v. *S&N Locating Services;* Apr. 29, 2014 (Eastern District of Virginia).

(56) References Cited

OTHER PUBLICATIONS

Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of US 2007/0258642 (Exhibit 46-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of US 2012/0259550 (Exhibit 29-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 6,597,992 (Exhibit 32-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of U.S. Pat. No. 8150826 (Exhibit 30-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
Invalidity Claim Chart for claims 1, 3, 4, 5, 6, 7, 9, 10, 12, 14, 16, 17, 18, 19, 20, 22, 23, 25 and 28 of U.S. Pat. No. 8,532,341 in view of Virginia Pilot Program—Phases I and II (Exhibit 1-D); S&N Invalidity Contentions; Case 2:13-cv-00346-MSD-LRLVAED *CertusView Technologies, LLC* v. *S&N Locating Services*; Apr. 29, 2014 (Eastern District of Virginia).
IRTH Internet Manual, Arizona Bluestake, Call Before you Dig, http://www.azbluestake.com/main/download/IRTHNetFeatures.pdf, (original publication date unknown), 47 pages.
IRTH Internet Manual, Georgia Utilities Protection Center, Feb. 16, 2006, 20 pages.
IRTH One Call Centers, Underground Utility Damage Prevention, Ticket Management, http://www.irth.com/SOLUTIONS/IRTH_ONE_CALL/index.aspx, printed Jun. 5, 2010 (original publication date unknown), 2 pages.
Kolera, B.T. et al., "Intelligent Utility Locating Tool for Excavators," *Journal of Construction Engineering and Management*, Sep. 2006, pp. 919-927.
Letter from Norfield Data Products to Wolf Greenfield & Sacks, P.C., May 5, 2010, 2 pages.
Loeber, P.C., "An Investigation of Geobase Mission Data Set Design, Implementation, and Usage Within Air Force Civil Engineer Electrical and Utilities Work Centers," Msgt, USAF, Mar. 2005, 139 pages.
Maps joining tickets on ARKUPS' computers in trucks, ARKUPS, Jan., Feb., Mar. 2003, 2 pages.
Meehan, B., "Empowering Electric and Gas Utilities with GIS," 264 pages.
Miss Utility webpage, Dec. 30, 2007, 2 pages.
Mobile Computing Makes its Move on Utility Field Automotion, Mar. 1, 1996, 6 pages.
MobileMapper 6 vs. Juno SC in Real World Conditions, White Paper, 2009 1-16, http://www.sidwellco.com/php/gps_solutions/docs/MM6_vs_Juno_WP_en.pdf.
MobileMapper 6, brochure, 2008, 1-4.
New Breakthroughs in GIS/GPS Technology Focus on Underground Utility Damage Prevention, Press Release, Jan. 27, 2003, 2 pages.
New Technologies Virginia Pilot Project Phases I, II and III, 38 pages.
Notice of Alllowance dated Feb. 28, 2014 from U.S. Appl. No. 12/703,322.
Notice of Allowability dated Jul. 26, 2013 from U.S. Appl. No. 13/796,487.
Notice of Allowance dated Jan. 14, 2015 from U.S. Appl. No. 13/194,121.
Notice of Allowance dated Jan. 13, 2013 from U.S. Appl. No. 12/363,046.
Notice of Allowance dated Feb. 10, 2014 from U.S. Appl. No. 13/758,336.
Notice of Allowance dated Feb. 14, 2014 from U.S. Appl. No. 13/741,080.
Notice of Allowance dated Feb. 18, 2014 from U.S. Appl. No. 13/193,337.
Notice of Allowance dated Feb. 21, 2013 from U.S. Appl. No. 12/824,612.
Notice of Allowance dated Apr. 3, 2014 from U.S. Appl. No. 12/831,330.
Notice of Allowance dated Apr. 30, 2012 from U.S. Appl. No. 12/208,846.
Notice of Allowance dated May 9, 2013 from U.S. Appl. No. 12/824,635.
Notice of Allowance dated May 22, 2013 from U.S. Appl. No. 12/703,313.
Notice of Allowance dated May 23, 2013 from U.S. Appl. No. 12/824,655.
Notice of Allowance dated Jun. 6, 2013 from U.S. Appl. No. 12/824,635.
Notice of Allowance dated Jun. 6, 2013 from U.S. Appl. No. 13/796,487.
Notice of Allowance dated Jun. 20, 2013 from U.S. Appl. No. 12/915,516.
Notice of Allowance dated Jun. 25, 2012 from U.S. Appl. No. 12/824,671.
Notice of Allowance dated Jul. 11, 2012 from U.S. Appl. No. 12/366,050.
Notice of Allowance dated Jul. 18, 2014 from U.S. Appl. No. 13/193,337.
Notice of Allowance dated Jul. 19, 2013 from U.S. Appl. No. 13/734,415.
Notice of Allowance dated Jul. 23, 2013 from U.S. Appl. No. 12/369,565.
Notice of Allowance dated Jul. 26, 2013 from U.S. Appl. No. 12/029,732.
Notice of Allowance dated Aug. 4, 2014 from U.S. Appl. No. 13/741,080.
Notice of Allowance dated Aug. 13, 2014 from U.S. Appl. No. 12/831,330.
Notice of Allowance dated Aug. 18, 2014 from U.S. Appl. No. 13/190,138.
Notice of Allowance dated Aug. 21, 2012 from U.S. Appl. No. 12/369,232.
Notice of Allowance dated Aug. 21, 2014 from U.S. Appl. No. 13/185,174.
Notice of Allowance dated Sep. 2, 2014 from U.S. Appl. No. 13/191,058.
Notice of Allowance dated Sep. 11, 2013 from U.S. Appl. No. 13/191,048.
Notice of Allowance dated Sep. 12, 2014 from U.S. Appl. No. 13/191,048.
Notice of Allowance dated Sep. 13, 2013 from U.S. Appl. No. 13/625,436.
Notice of Allowance dated Sep. 23, 2014 from U.S. Appl. No. 14/063,417.
Notice of Allowance dated Oct. 1, 2012 from U.S. Appl. No. 12/607,843.
Notice of Allowance dated Oct. 25, 2012 from U.S. Appl. No. 12/639,373.
Notice of Allowance dated Nov. 7, 2012 from U.S. Appl. No. 12/639,041.
Notice of Allowance dated Nov. 16, 2012 from U.S. Appl. No. 12/208,846.
Notice of Allowance dated Dec. 6, 2013 from U.S. Appl. No. 13/191,048.
Notice of Allowance dated Dec. 13, 2011 from U.S. Appl. No. 12/369,565.
Notice of Allowance dated Dec. 20, 2013 from U.S. Appl. No. 13/191,058.
Notice of Allowance dated Oct. 6, 2011 from Canadian Application No. 2,715,312.
NTDPC One-Call Mapping Notification Processes, http://www.ntdpc.com/ntdpc/faces/ntscf.jsp, (original publication date unknown), 12 pages.

(56) References Cited

OTHER PUBLICATIONS

Office Action dated Jan. 2, 2013 from U.S. Appl. No. 12/363,009.
Office Action dated Jan. 7, 2015 from U.S. Appl. No. 13/185,194.
Office Action dated Jan. 15, 2013 from U.S. Appl. No. 12/029,732.
Office Action dated Jan. 15, 2014 from U.S. Appl. No. 13/185,174.
Office Action dated Jan. 19, 2012 from U.S. Appl. No. 12/824,671.
Office Action dated Jan. 20, 2012 from U.S. Appl. No. 13/190,138.
Office Action dated Jan. 29, 2013 from U.S. Appl. No. 13/185,174.
Office Action dated Jan. 31, 2012 from U.S. Appl. No. 12/703,322.
Office Action dated Feb. 4, 2013 from Australian Application No. 2010270589.
Office Action dated Feb. 4, 2013 from Canadian Application No. 2,707,246.
Office Action dated Feb. 5, 2014 from U.S. Appl. No. 13/185,194.
Office Action dated Feb. 12, 2013 from U.S. Appl. No. 12/833,117.
Office Action dated Feb. 16, 2012 from U.S. Appl. No. 12/369,232.
Office Action dated Feb. 29, 2012 from U.S. Appl. No. 12/833,117.
Office Action dated Mar. 2, 2012 from U.S. Appl. No. 12/831,330.
Office Action dated Mar. 8, 2012 from U.S. Appl. No. 13/190,185.
Office Action dated Mar. 14, 2014 from U.S. Appl. No. 14/063,417.
Office Action dated Mar. 19, 2012 from U.S. Appl. No. 12/208,846.
Office Action dated Mar. 26, 2013 from U.S. Appl. No. 12/824,655.
Office Action dated Mar. 27, 2012 from U.S. Appl. No. 12/824,635.
Office Action dated Apr. 3, 2012 from U.S. Appl. No. 12/703,313.
Office Action dated Apr. 5, 2012 from U.S. Appl. No. 13/191,048.
Office Action dated Apr. 6, 2012 from U.S. Appl. No. 13/191,058.
Office Action dated Apr. 8, 2013 from Canadian Application No. 2,690,239.
Office Action dated Apr. 11, 2012 from U.S. Appl. No. 12/029,732.
Office Action dated Apr. 17, 2012 from U.S. Appl. No. 12/607,843.
Office Action dated Apr. 22, 2013 from U.S. Appl. No. 13/734,415.
Office Action dated Apr. 23, 2012 from U.S. Appl. No. 12/366,050.
Office Action dated Apr. 23, 2013 from U.S. Appl. No. 13/191,048.
Office Action dated Apr. 25, 2012 from U.S. Appl. No. 12/363,046.
Office Action dated May 1, 2012 from U.S. Appl. No. 12/363,009.
Office Action dated May 7, 2012 from U.S. Appl. No. 13/193,337.
Office Action dated May 7, 2013 from U.S. Appl. No. 13/191,058.
Office Action dated May 20, 2013 from U.S. Appl. No. 12/915,516.
Office Action dated May 20, 2013 from U.S. Appl. No. 13/741,080.
Office Action dated May 24, 2013 from U.S. Appl. No. 13/190,138.
Office Action dated May 24, 2012 from U.S. Appl. No. 13/194,121.
Office Action dated May 28, 2013 from U.S. Appl. No. 13/193,337.
Office Action dated Jun. 8, 2012 from U.S. Appl. No. 13/194,163.
Office Action dated Jun. 23, 2011 from U.S. Appl. No. 12/208,846.
Office Action dated Jun. 28, 2012 from U.S. Appl. No. 12/369,565.
Office Action dated Jul. 1, 2013 from U.S. Appl. No. 12/029,732.
Office Action dated Jul. 3, 2013 from Canadian Application No. 2,707,246.
Office Action dated Jul. 3, 2013 from U.S. Appl. No. 13/758,336.
Office Action dated Jul. 8, 2013 from U.S. Appl. No. 13/185,174.
Office Action dated Jul. 13, 2012 from Canadian Application No. 2,690,239.
Office Action dated Jul. 13, 2011 from U.S. Appl. No. 12/029,732, filed Feb. 12, 2008.
Office Action dated Jul. 15, 2010 from Canadian Application No. 2,690,239, filed Feb. 9, 2010.
Office Action dated Jul. 17, 2012 from U.S. Appl. No. 12/369,232.
Office Action dated Jul. 18, 2014 from U.S. Appl. No. 13/185,194.
Office Action dated Jul. 26, 2012 from Canadian Application No. 2,707,246.
Office Action dated Jul. 30, 2014 from U.S. Appl. No. 13/194,121.
Office Action dated Aug. 1, 2013 from U.S. Appl. No. 13/190,138.
Office Action dated Aug. 7, 2012 from U.S. Appl. No. 13/190,185.
Office Action dated Aug. 9, 2012 from U.S. Appl. No. 12/831,330.
Office Action dated Aug. 23, 2012 from U.S. Appl. No. 12/824,635.
Office Action dated Aug. 26, 2014 from Canadian Application No. 2,707,246.
Office Action dated Sep. 4, 2013 from U.S. Appl. No. 12/363,009.
Office Action dated Sep. 19, 2014 from U.S. Appl. No. 13/194,163.
Office Action dated Sep. 20, 2013 from Canadian Application No. 2,690,239.
Office Action dated Sep. 25, 2014 from Canadian Application No. 2,690,239.
Office Action dated Oct. 2, 2012 from Australian Patent Application No. 2010214044.
Office Action dated Oct. 4, 2011 from Canadian Application No. 2,707,246.
Office Action dated Oct. 9, 2012 from U.S. Appl. No. 13/190,138.
Office Action dated Oct. 10, 2012 from U.S. Appl. No. 13/191,048.
Office Action dated Oct. 10, 2012 from U.S. Appl. No. 13/191,058.
Office Action dated Oct. 10, 2014 from U.S. Appl. No. 13/190,185.
Office Action dated Oct. 11, 2011 from Canadian Application No. 2,690,239.
Office Action dated Oct. 12, 2012 from U.S. Appl. No. 12/824,612.
Office Action dated Oct. 15, 2012 from U.S. Appl. No. 12/703,322.
Office Action dated Oct. 26, 2012 from U.S. Appl. No. 12/703,313.
Office Action dated Oct. 31, 2013 from U.S. Appl. No. 13/953,998.
Office Action dated Nov. 4, 2013 from U.S. Appl. No. 13/193,337.
Office Action dated Nov. 4, 2013 from U.S. Appl. No. 13/758,336.
Office Action dated Nov. 4, 2014 from U.S. Appl. No. 12/703,322.
Office Action dated Nov. 6, 2013 from U.S. Appl. No. 13/741,080.
Office Action dated Nov. 21, 2012 from U.S. Appl. No. 13/194,121.
Office Action dated Nov. 23, 2012 from U.S. Appl. No. 12/208,846.
Office Action dated Nov. 23, 2011 from U.S. Appl. No. 12/363,009.
Office Action dated Nov. 27, 2012 from U.S. Appl. No. 13/194,163.
Office Action dated Nov. 28, 2013 from Canadian Application No. 2,759,932.
Office Action dated Dec. 12, 2014 from Canadian Application No. 2,707,246.
Office Action dated Dec. 19, 2012 from U.S. Appl. No. 12/915,516.
Office Action dated Dec. 28, 2012 from U.S. Appl. No. 13/193,337.
Office Action dated Dec. 30, 2013 from Canadian Application No. 2,707,246.
Office Action dated Nov. 26, 2010 from Australian Application No. 2009213151.
Office Action dated Nov. 29, 2011 from Australian Application No. 2009213151.
Office Action dated Oct. 6, 2011 from U.S. Appl. No. 12/366,050.
Olst, R. van, "Using I.T. to improve the efficiency and accuracy of Network Data Collection," IEEE AFRICON 2004, pp. 927-932.
One Call Concepts Locating Services, Inc., Point Positive Utility Mapping & GIS, http://www.occls.com/Default.aspx?content=pointpositive, original publication date unknown, retrieved Sep. 21, 2011, 1 page.
One Call Technology Pilot Project, 41 pages.
One Call Technology Pilot Project, Trimble Meeting, Aug. 25, 2006, 5 pages.
Opinion and Order Following Markman Hearing, May 16, 2014; Case 2:13-cv-00346-MSD-LRLVAED *CertusView Technologies, LLC v. S&N Locating Services*; (Eastern District of Virginia).
Opinion and Order Following Motion for Judgment on Pleadings, Jan. 21, 2015; Case 2:13-cv-00346-MSD-LRLVAED *CertusView Technologies, LLC v. S&N Locating Services*; (Eastern District of Virginia).
Patent Examination Report dated Sep. 5, 2013 from Australian Application No. 2010214044.
Patent Examination Report dated Dec. 16, 2013 from Australian Application No. 2010214044.
Patent Examination Report No. 1 dated Jan. 16, 2014 from Australian Application No. 2011282957.
Patent Examination Report No. 1 dated Jan. 21, 2014 from Australian Application No. 2012241082.
Patent Examination Report No. 5 dated Apr. 23, 2014 from Australian Application No. 2010214044.
Pevarski, R., Virginia Pilot Project: Technology Meets Damage Prevention, http://www.excavationsafetyonline.com/esg/guidePDFs/2009_2009_ESG_Page_9.pdf, printed on Nov. 3, 2009, 1 page.
Phase II of the Virginia Pilot Program, Electronic Manifests, VUPS Project Proposal, Jul. 31, 2007, 7 pages.
Pickering, D. et al., "Utility Mapping and Record Keeping for Infrastructure," Urban Management Programme, 1946, 84 pages.

(56) References Cited

OTHER PUBLICATIONS

Plaintiff CertusView Technologies, LLC's Claim Construction Reply Brief dated Mar. 21, 2014, *CertusView Technologies, LLC v. S&N Locating Services, LLC et al.*, Case No. 2:13-cv-346, USDC Eastern District of Virginia.
Preliminary Proposed Claim Constructions and Identification of Structure(s), Act(s), or Material(s) Corresponding to Claims Governed by 35 U.S.C. § 112(6), *CertusView Technologies, LLC v. S&N Locating Services, LLC et al.*, Case No. 2:13-cv-346, USDC Eastern District of Virginia.
Preliminary Proposed Constructions dated Feb. 14, 2014, *CertusView Technologies, LLC v. S&N Locating Services, LLC et al.*, Case No. 2:13-cv-346, USDC Eastern District of Virginia.
Prior Art Table; S&N Invalidity Contentions; Case 2:13-cv-00346-MSD-LRLVAED *CertusView Technologies, LLC v. S&N Locating Services*; Apr. 29, 2014 (Eastern District of Virginia).
Progress Energy Chooses MapFrame's FieldSmart Software for Mobile Mapping & Field Automation, IntelligentUtility, Jul. 17, 2003, 3 pages.
Project Plan, VA Pilot Project, Draft, Aug. 24, 2009, 15 pages.
Quiroga, C. et al., "A Data Platform for Managing Utilities Along Highway Corridors," Project No. 0-2110, Report 2110-1, Texas Transportation Institute, Feb. 2002, 88 pages.
R. Pevarski, Letter from the Virginia Utility Protection Service, Inc., dated Apr. 7, 2010.
Ross, C., "2d Tile Map Editor," Oct. 19, 2005, http://www.blitzbasic.com/Community/posts.php?topic=52152, pp. 1-3.
Ruggiero, K., "Using ArcGIS for Clearing Cable Locates," ESRI 2006.
S&N Location Services, LLC and S&N Communication, Inc.'s Opening Claim Construction Brief dated Mar. 18, 2014, *CertusView Technologies, LLC v. S&N Locating Services, LLC et al.*, Case No. 2:13-cv-346, USDC Eastern District of Virginia.
Stahovich, David M. et al., "Automated and Integrated Call Before You Dig," Proceedings of GITA 2005, GITA's 18th Annual Conference, Mar. 6-9, 2005, Denver, CO, online: GIS for Oil & Gas Conference 2002 <http://www.gisdevelopment.net/proceedings/gita/2005/papers/76.pdf>.
Supplemental Notice of Allowability dated May 20, 2013 from U.S. Appl. No. 12/824,612.
Supplemental Notice of Allowability dated Jul. 2, 2013 from U.S. Appl. No. 13/796,487.
Supplemental Notice of Allowability dated Aug. 20, 2013 from U.S. Appl. No. 12/703,313.
Supplemental Notice of Allowability dated Sep. 24, 2013 from U.S. Appl. No. 12/915,516.
Supplemental Notice of Allowability dated Dec. 4, 2014 from U.S. Appl. No. 14/063,417.
Supplemental Notice of Allowability from U.S. Appl. No. 12/824,612 dated Apr. 4, 2013.
Supplemental Notice of Allowance dated Jul. 27, 2012 from U.S. Appl. No. 12/366,050.
Tel-Dig Junior—The most advanced system on earth—and below Brochure (5 pages) (Exhibit 7); Case 2:13-cv-00346-MSD-LRLVAED *CertusView Technologies, LLC v. S&N Locating Services*; Apr. 29, 2014 (Eastern District of Virginia).
TelDig Mobile, Locate ticket-receiving software for remote users, p. 1.
TelDig Mobile, Locate ticket-receiving software for remote users, p. 2.
Tel-Dig One Call Brochure (1 page) (Exhibit 6); Case 2:13-cv-00346-MSD-LRLAED *CertusView Technologies, LLC v. S&N Locating Services*; Apr. 29, 2014 (Eastern District of Virginia).
Toyama, K. et al., "Geographic Location Tags on Digital Images," article by Toyama, Logan, Roseway, and Anandan, pp. 156-166.
Trimble Comprehensive Utilities, brochure, 2010, 1-6.
UGI Utilities Selects KEMA for FLAME Project Implementation, Burlington, Massachusetts, Electric Energy Publications, Inc., Feb. 10, 2004, http://www.eet-d.com/?p.=show_news&id=17641, 2 pages.
UGI Utilities, Inc., FLAME Project White Paper, (original publication date unknown), received Aug. 3, 2011, 12 pages.
Ultimate Utility Management System to be Unveiled at Planet Underground, The Planet Underground, 2 pages.
Underground Facility Damage Prevention, Virginia's Pilot Program for One-call Location Technology Business Case, Jun. 2006, 37 pages.
Underground Utility Damage Prevention, Virginia's Pilot Program, Jan. 2006, 15 pages.
Underground, pages from magazine, Jan./Feb. 2003 issue, 4 pages.
Utility Notification Center webpage, Mar. 4, 2008, 2 pages.
Utility Sciences Corporation to Attend Trade Show, SpatialNews.com Press Release, 2 pages.
Vanaartsen, S.J., GIS Automates Utility One Call Process, Proceeding ESRI, 1-15, http://proceedings.esri.com/library/useconf/proc06/papers/papers/pap_1148.pdf.
Vandeberg, G., "Introduction to ArcPad: Mobile GIS," ND GIS Users Conference, Oct. 26, 2006, 30 pages.
Virginia Damage Prevention Conference Agenda, Apr. 20-22, 2010, 6 pages.
Virginia Damage Prevention Conference Agenda, Apr. 21-23, 2009, 5 pages.
Virginia Damage Prevention Conference Agenda, Apr. 8-10, 2008, 5 pages.
Virginia Pilot Project Incorporating GPS Technology to Enhance One-Call Damage Prevention, Phase 2: Electronic Manifests, Project Plan (Business Case), Feb. 2009, 22 pages.
Virginia Pilot Project Phase II, Project Team Meeting report, Aug. 31, 2009, 12 pages.
Virginia Pilot Project, Incorporating GPS Technology to Enhance One-Call Damage Prevention, Phase I—Electronic White Lining Project Report, Nov. 2007, 41 pages.
Virginia Pilot Project, Incorporating GPS Technology to Enhance One-Call Damage Prevention, Phase I—Electronic White Lining Project Report, Nov. 2007, 50 pages.
Virginia State Damage Prevention Program Grants Progress Report, Phase 2, Dec. 23, 2008, 7 pages.
Virginia Utility Projection Service, Inc. (VUPS), Project Proposal to: U.S. Department of Transportation Pipeline & Hazardous Materials Safety Administration, Phase II of the Virginia Pilot Program Electronic Manifests, Jul. 31, 2007, 16 pages.
VUPS Pilot Program, One-Call Systems International (OCSI) Committee meeting on Nov. 13, 2007—retrieved Dec. 16, 2013 from http://www.commongroundalliance.com/Template.dfm?Section=By_Date&CONTENTID=4528&TEMPLATE=/ContentManagement/ContentDisplay.cfm.
Nielsen et al., co-pending U.S. Publication No. 2014, published Jan. 23, 2014.
Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit A to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-1 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-2 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).

(56) References Cited

OTHER PUBLICATIONS

Exhibit J-3 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-4 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-5 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-6 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-7 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.* (Eastern District of Virginia).
Exhibit J-8 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-9 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-10 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-11 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-12 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-13 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-14 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-15 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-16 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-17 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-18 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-19 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-20 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-21 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-22 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
Exhibit J-23 to Memorandum of Law in Support of Defendants' Motion for Exceptional Case Finding and Attorneys' Fees filed Feb. 4, 2015; Case 2:13-cv-00346-MSD-TEM; *CertusView Technologies, LLC v. S&N Locating Services, LLC et al.*, (Eastern District of Virginia).
CertusView's Response in Opposition to S&N's Motion for Exceptional Case Finding and Attorneys' Fees filed Feb. 27, 2015; Case 2:13-cv-00346-MSD-TEM; *CertusView Technologies, LLC v. S&N Locating Services, LLC et al.*, (Eastern District of Virginia).
Reply in Support of Defendants' Motion for Exceptional Case Finding and Attorneys' Fees filed Mar. 9, 2015; Case 2:13-cv-00346-MSD-TEM; *CertusView Technologies, LLC v. S&N Locating Services, LLC et al.*, (Eastern District of Virginia).
Memorandum Order regarding Functional Equivalency Objections and Sanctions Objections filed Mar. 11, 2015; Case 2:13-cv-00346-MSD-TEM; *CertusView Technologies, LLC v. S&N Locating Services, LLC et al.*, (Eastern District of Virginia).
Office Action dated Mar. 25, 2015 from U.S. Appl. No. 14/063,417.
S&N Locating Services, LLC's and S&N Communications, Inc.'s First Amended Answer, Affirmative Defenses, and Counterclaims to Plaintiff's First Amended Complaint filed Jan. 23, 2015; Case No. 2:13-cv-346 (MSD) (TEM); *CertusView Technologies, LLC v. S&N Locating Services, LLC et al.*, (Eastern District of Virginia).
CertusView's Objections to the Magistrate Judge's Order (Dkt. No. 248) Allowing S&N's Amended Answer and Counterclaims filed Feb. 2, 2015; Case No. 2:13-cv-346 (MSD) (TEM); *CertusView Technologies, LLC v. S&N Locating Services, LLC et al.*, (Eastern District of Virginia).
Responsive Expert Report of Dr. Randel Dymond, P.E. to the Expert Report of Mr. Ivan Zatkovich dated Sep. 30, 2014, filed Nov. 13, 2014; *CertusView Technologies, LLC v. S&N Locating Services, LLC et al.*, (Eastern District of Virginia).
CertusView's Reply in Support of its Motion to Strike and in the Alternative Dismiss S&N's First Amended Answer and Counterclaims (Dkt. No. 253) filed Mar. 2, 2015; *CertusView Technologies, LLC v. S&N Locating Services, LLC et al.*, (Eastern District of Virginia).

(56) References Cited

OTHER PUBLICATIONS

CertusView's Request for Leave to File a Sur-Reply in Support of its Opposition to Defendants' Motion for Attorney's Fees filed Mar. 18, 2015; *CertusView Technologies, LLC* v. *S&N Locating Services, LLC et al.*, (Eastern District of Virginia).

Defendants' Response to CertusView's Motion to Strike and in the Alternative Dismiss S&N's First Amended Answer and Counterclaims (Dkt. No. 253) filed Feb. 23, 2015; *CertusView Technologies, LLC* v. *S&N Locating Services, LLC et al.*, (Eastern District of Virginia).

Defendants' Response to CertusView's Objections to the Magistrate Judge's Order (Dkt. 248) Allowing S&N's Amended Answer and Counterclaims filed Feb. 17, 2015; Case 2:13-cv-00346-MSD-TEM; *CertusView Technologies, LLC* v. *S&N Locating Services, LLC et al.*, (Eastern District of Virginia).

Defendant's Response to CertusView's Objections to the Magistrate Judge's Order (Dkt. No. 254) Awarding Sanctions on S&N's Motion to Compel filed Feb. 23, 2015; *CertusView Technologies, LLC* v. *S&N Locating Services, LLC et al.*, (Eastern District of Virginia).

Opinion and Order to Plaintiff's Rule 72 Objections to the Magistrate Judge's Jan. 16, 2015 Order Granting Defendant's Leave to Amend their Answer and Counterclaims, and on Plaintiff's Motion to Strike and in the Alternative Dismiss S&N's First Amended Answer and Counterclaims, filed May 22, 2015; *CertusView Technologies, LLC* v. *S&N Locating Services, LLC et al.*, (Eastern District of Virginia).

U.S. Appl. No. 14/708,530, filed May 11, 2015, Nielsen et al.

Office Action dated May 12, 2015 from Canadian Application No. 2,690,239.

"KorTerra C/S Positive Response" (KorTerra, Aug. 28, 2008), archived online: KorTerra-KorTerra Automated Positive Response for One Call Locate Tickets <https://web.archive.org/web/20080828014227/http://www.korterra.com/damage_prevention/KorTerraCS/KorTerra_Positive_Response.htm>, 2 pages.

"TelDig OnceCall" (TelDig Systems, Nov. 10, 2006), archived online: TelDig Systems—Products and Services <https://web.archive.org/web/20061110055008/http://www.teldig.com/en/Text/2003_OneCallWeb.pdf [TelDig One Call], 1 page.

TelDig Systems, Press Releases, "2001-2004 News" (Aug. 2, 2001-Jul. 5, 2004), archived online: TelDig Systems <https://web.archive.org/web/20061110055824/http://teldig.com/en/Text/2001-2004_News.doc> [TelDig Press Releases], 12 pages.

Office Action dated Jan. 12, 2015 from Canadian Application No. 2,690,239.

Office Action dated Jul. 15, 2015 from U.S. Appl. No. 13/185,194.

Potts, A., "ArcInfo Version 8: Introducing the Next Generation," ArcUser Magazine (Apr.-Jun. 1999), 4 pages.

"Features and Functions of ArcInfo 8," ESRI. Redlands, California, Sep. 1999, 18 pages.

Notice of Allowance dated Jul. 8, 2015 from U.S. Appl. No. 14/708,530.

ESRI Press Release. Redlands, California. Jan. 2000, 3 pages.

Memorandum in Support of CertusView's Motion for Summary Judgment on S&N's Inequitable Conduct Counterclaims filed Jul. 22, 2015; Case 2:13-cv-00346-MSD-TEM; *CertusView Technologies, LLC* v. *S&N Locating Services, LLC et al.*, (Eastern District of Virginia) (Parts 1, 2, 3 and 4).

Memorandum in Support of S&N's Response to CertusView's Motion for Summary Judgment on S&N's Inequitable Conduct Counterclaims filed Jul. 29, 2015; Case 2:13-cv-00346-MSD-TEM; *CertusView Technologies, LLC* v. *S&N Locating Services, LLC et al.*, (Eastern District of Virginia).

CertusView's Reply in Support of its Motion for Summary Judgment on S&N's Inequitable Conduct Counterclaims filed Aug. 3, 2015; Case 2:13-cv-00346-MSD-TEM; *CertusView Technologies, LLC* v. *S&N Locating Services, LLC et al.*, (Eastern District of Virginia).

Memorandum Order filed Aug. 7, 2015; Case 2:13-cv-00346-MSD-TEM; *CertusView Technologies, LLC* v. *S&N Locating Services, LLC et al.*, (Eastern District of Virginia).

Examination Report dated Aug. 17, 2015 from Australian Application No. 2014203614.

Office Action dated Aug. 21, 2015 from U.S. Appl. No. 14/577,353.

| Notification type | Notification communication method |
|---|---|
| ☑ Technician on-site | ☐ email |
| ☐ Ticket marked | ☑ Text message |
| ☑ Ticket approved | ☐ Phone call |
| ⋮ | ⋮ |

☑ Submit locate request and/or generate VWL image?

*FIG. 6B*

METHODS, APPARATUS, AND SYSTEMS FOR ACQUIRING AN ENHANCED POSITIVE RESPONSE FOR UNDERGROUND FACILITY LOCATE AND MARKING OPERATIONS BASED ON AN ELECTRONIC MANIFEST DOCUMENTING PHYSICAL LOCATE MARKS ON GROUND, PAVEMENT, OR OTHER SURFACE

CROSS-REFERENCE TO RELATED APPLICATIONS

The present application claims a priority benefit, under 35 U.S.C. §120, as a continuation (CON) of U.S. non-provisional patent application Ser. No. 14/063,417, entitled "Methods, Apparatus, and Systems for Providing an Enhanced Positive Response for Underground Facility Locate and Marking Operations Based on an Electronic Manifest Documenting Physical Locate Marks on Ground, Pavement or Other Surface," filed on Oct. 25, 2013.

U.S. non-provisional patent application Ser. No. 14/063,417 claims a priority benefit, under 35 U.S.C. §120, as a continuation (CON) of U.S. non-provisional patent application Ser. No. 12/915,516, entitled "Methods, Apparatus, and Systems for Providing an Enhanced Positive Response in Underground Facility Locate and Marking Operations," filed on Oct. 29, 2010.

U.S. non-provisional patent application Ser. No. 12/915,516 claims a priority benefit, under 35 U.S.C. §120, as a continuation-in-part (CIP) of U.S. non-provisional patent application Ser. No. 12/703,313, entitled "Methods, Apparatus, and Systems for Exchanging Information Between Excavators and Other Entities Associated with Underground Facility Locate and Marking Operations," filed on Feb. 10, 2010.

U.S. non-provisional patent application Ser. No. 12/703,313 claims a priority benefit, under 35 U.S.C. §119(e), to U.S. provisional patent application Ser. No. 61/151,419, entitled "Methods and Apparatus for Excavator Notification of Underground Facility Locate Operation Status," filed on Feb. 10, 2009.

U.S. non-provisional patent application Ser. No. 12/703,313 also claims a priority benefit, under 35 U.S.C. §119(e), to U.S. provisional patent application Ser. No. 61/151,425, entitled "Methods and Apparatus for Exchanging Information Between Excavators and Other Entities Associated with Underground Facility Locate Operations," filed on Feb. 10, 2009.

U.S. non-provisional patent application Ser. No. 12/703,313 further claims a priority benefit, under 35 U.S.C. §119(a), to Canadian patent application Serial No. 2,690,239, entitled "Methods and Apparatus for Excavator Notification of Underground Facility Locate Operation Status," filed on Feb. 9, 2010.

Each of the above-identified applications is incorporated herein by reference.

BACKGROUND

Field service operations may be any operation in which companies dispatch technicians and/or other staff to perform certain activities, for example, installations, services and/or repairs. Field service operations may exist in various industries, examples of which include, but are not limited to, network installations, utility installations, security systems, construction, medical equipment, heating, ventilating and air conditioning (HVAC) and the like.

In the construction industry, for example, the process of locating and marking underground facilities is an example of a field service application, often referred to as a "locate and marking operation" (or more simply referred to as a "locate operation"). In locate operations, a locate technician may use one or more locate devices (e.g., a locate transmitter and a locate receiver) and a marking device in order to perform the locate operation. A locate receiver is an instrument for detecting the presence or absence of facilities that are concealed in some manner, such as cables and pipes that are located underground. A locate receiver is used to detect electromagnetic fields that are generated by a detection signal that is emitted from the facility (the detection signal typically is provided to the facility via a locate transmitter). A signal, or lack thereof, detected by the locate receiver indicates the presence or absence of the facility.

Once the presence or absence of the facility is detected, a marking material is dispensed on, for example, the surface of the ground at the location of the facility. Marking material may be any material, substance, compound, and/or element, used or which may be used separately or in combination to mark, signify, and/or indicate. Examples of marking materials may include, but are not limited to, paint, chalk, dye, and/or iron. Marking devices, such as paint marking wands and/or paint marking wheels, provide a convenient method of dispensing marking materials onto surfaces, such as onto the surface of the ground.

With respect to locate operations, there may be an associated work request (i.e., locate request, also referred to as locate request ticket or merely "ticket") that is originated by, for example, an excavator or other party who wishes to ascertain and/or mark the presence or absence of one or more underground facilities in a certain geographic region. A locate request may be any communication or instruction to perform a locate operation at a certain work site, or in some cases multiple work sites, at which one or more dig areas may be designated for planned excavation (or more generally, some disturbance of the ground). Today, excavators and other parties are required to notify one-call centers in advance of their excavation activities and identify through the locate request the work site(s)/dig area(s) where individual excavating activities/disturbances of the ground are planned. One-call centers may be any organizations, entities, and/or systems that receive, process, and/or transmit locate requests.

The information on the locate request may include, for example, the physical address or other location information about the dig area to which the locate technician is dispatched and the type of service that is requested, such as detecting and marking one or more types of facilities within a certain area of interest at a certain geographic site. Additionally, the locate request may specify a "must be complete by" date, a "must be performed on" date, and/or a "do not perform until" date.

In many instances, excavators and other parties who request a locate operation receive very limited or no notification as to whether or when the operation is complete. Once the locate request ticket is in a "closed" status, the one-call center may communicate to the excavator that the locate operation is complete. However, this communication may not be provided in a timely manner. Any delay between performing the locate operation and the planned excavation represents an inefficiency in the excavation process and, perhaps, lost profit by the excavation companies whose excavators may be unnecessarily idle. Additionally, because there is limited exchange of information between the excavators, other parties requesting locate operations, and locate service providers, there may be confusion as to the scope and status of the locate operation. In some instances, excavators arrive on site and find the locate/marking operation not done or done incorrectly; excavators often wait for the "complete by" date to pass, then arrive at the dig area under the assumption that the locate operation has been performed. Consequently, excavators may perform the planned excavation uncertain as to whether the locate operation is complete as requested or has been performed satisfactorily prior to beginning the excavation activities. As a result, there is a certain amount of risk of damage to underground facilities.

SUMMARY

Applicants have recognized and appreciated that a need exists for an information exchange process not just between excavators and other parties who may request locate and marking operations (hereafter a "requesting party," e.g., excavators, property owners, facilities owners, regulatory authorities, damage investigators, etc.) and locate service providers, but also among other key players involved in and relating to locate and/or marking operations. More specifically, a need exists for better ways of providing information to one or more requesting parties in a timely manner, for example, to reduce uncertainty and thereby reduce the risk of damage to underground facilities, and in some instances to also improve excavator efficiency.

In view of the foregoing, various inventive embodiments disclosed herein relate generally to providing information relating to a locate and/or marking operation to excavators, other parties requesting locate and/or marking operations (a requesting party), and/or any other party associated with locate and/or marking activities.

In one embodiment, one or more computing devices (e.g., having a processor, memory, communications interface, user interface/display, and/or input/output interface, etc.) may be configured so as to provide a graphical user interface (GUI) that may be accessed by a requesting party for a locate and/or marking operation, so as to facilitate submission of locate requests as well as selection and/or customization of "positive response" notifications. For purposes of the present disclosure, a "positive response" notification (also referred to herein simply as "positive response" and/or "notification") refers to one or more communications to one or more requesting parties for a locate and/or marking operation, which communications provide some indication of the status of the operation and/or information relating to one or more elements of performance of the operation (or a link/pointer to such an indication/information, such as a website address containing the indication/information). In some exemplary implementations, such computing devices/GUI may be provided by a one-call-center in a given jurisdiction, to both facilitate submission of locate requests in general, and to further provide for customization in the manner of receiving, and contents of, one or more positive response notifications that may be provided to the requesting party/parties. In other implementations, such computing devices/GUI may be provided by a third party that may be in communication both with one or more requesting parties and a one-call-center issuing locate request tickets.

In exemplary embodiments, in addition to submitting a locate request, in various aspects a requesting party may specify, via such a GUI, that they would like to receive one or more positive response notifications relating to the requested locate and/or marking operation. In addition to merely selecting an option to receive one or more positive response notifications, the requesting party may specify a particular communication mode in which they wish to receive notification(s) (e.g., text message; e-mail; voice message; etc.) and/or a particular format in which they wish to receive notification(s) (e.g., text based; HTML; images; text and images; tables with particular fields; flat files; etc.). Alternatively or additionally, the requesting party may specify one or more particular times/events during an operation at which they wish to receive notification(s) (e.g., when a locate ticket is dispatched by a one call center; when a ticket is received by a utility owner/locate contractor; when a locate technician is dispatched; when a locate technician arrives at a work site/dig area; when a locate technician begins an operation; when an operation is complete; if and when an operation is approved by a supervisor/quality control assessment; if and when there is some anomaly regarding the operation with respect to information in the ticket; etc.). Likewise, alternatively or additionally, the requesting party may specify particular content that they wish to receive in one or more notifications (e.g., upon arrival of technician to work site, send arrival time and geo-location data/GPS coordinates of technician location; upon completion of the operation send a simple notification indicating such; upon completion of the operation, send a complete electronic manifest of all work performed during the operation; upon completion of the operation, send one or more images of the work site/dig area illustrating dispensed markings; send a quality assessment report or other quality assessment-related information, etc.).

Once a locate request is submitted, along with selection of positive response notification and preferences for same, the computing device(s) may be configured to thereafter receive further information from a variety of sources (e.g., facility owners; locate contractors; various equipment, instrumentation, and/or vehicles associated with dispatched technicians to perform locate and/marking operations; etc.) relating to allocating tickets to available technicians and dispatching technicians, as well as various steps/events toward performance of the locate and marking operation. The computing device(s) acquire and process such information so as to appropriately provide positive response notification(s) to requesting parties pursuant to their selected preferences. In some embodiments, following receipt of a notification, a requesting party may optionally provide, or in some instances be mandated to provide (e.g., by contractual obligation, applicable statutes/regulations, etc.) an acknowledgement of receipt (e.g., a "return receipt") for one or more received notifications.

In yet another embodiment, one or more computing devices may be configured so as to provide a graphical user interface (GUI) that not only facilitates submission of locate requests and positive response notification preferences, but also allows for the requesting party to prepare and submit a "virtual white lines" (VWL) image as part of the locate request. As discussed in greater detail herein, a VWL image may contain a digital image of the work site (or some other suitable digital data representing the geographic location of the work site) along with electronic annotations delimiting one or more dig areas in which excavation or disturbances to the ground are planned. Such electronic annotations also are referred to as "dig area indicators," which may be any electronically generated markings indicating a point, line, path and/or area of the planned excavation. To facilitate generation of a VWL image, the computing device(s) may be configured to execute a VWL application which may be implemented, for example, as described in the following references: U.S. patent application Ser. No. 12/366,853 filed Feb. 6, 2009, entitled "Virtual white lines for delimiting planned excavation sites;" U.S. patent application Ser. No. 12/475,905 filed Jun. 1, 2009, entitled "Virtual white lines for delimiting planned excavation sites of staged excavation projects;" and U.S. patent application Ser. No. 12/422,364 filed Apr. 13, 2009, entitled "Virtual white lines (VWL) application for indicating a planned excavation or locate path," each of which patent applications is hereby incorporated by reference herein in its entirety.

In some implementations relating to VWL images, the digital image on which dig area indicators are drawn may be geotagged (i.e., associated with geospatial metadata), and the one or more computing devices may be configured to execute the VWL application so as to use the geospatial metadata associated with the digital image to convert location information regarding the dig area indicators and/or landmarks shown in the digital image into geographic coordinates such as Global Positioning System (GPS) coordinates. These geographic coordinates may be stored in a separate data set that may be attached to a locate request instead of, or in addition to, the VWL image. Accordingly, pursuant to this embodiment, via a suitably-implemented GUI and a VWL application, a party requesting a locate and/or marking information may: 1) submit a locate request; 2) generate a VWL image and attach the image and/or a data set relating to a VWL image; and/or 3) select to receive one or more positive response notifications, and preferences for receiving same.

In yet other embodiments, according to the methods, apparatus and systems described herein an enhanced positive response may be generated to inform one or more parties of locate and/or marking operation status. In one exemplary implementation, an enhanced positive response may include one or both of time-stamp information to provide proof of a time at which the locate and/or marking operation was completed by a locate technician, and place-stamp information to provide proof of a presence of the locate technician sufficiently proximate to or at a geographic location specified on the locate request ticket (and corresponding to the dig area). In one aspect, the enhanced positive response may include an electronic manifest (EM) image that itself includes such a time-stamp and/or place-stamp. As discussed in further detail below, an EM image is an electronic image depicting a work site/dig area and its surroundings (e.g., a digital photograph, an aerial photograph, an electronic map, etc.), on which is overlaid various information relating to work performed in the field at the work site/dig area by a locate technician. In one aspect, the inclusion of an EM image in an enhanced positive response provides comprehensive feedback regarding performance of the locate and/or marking operation. Examples of other information that may be included in such an enhanced positive response (and in some cases as part of an EM image) include, but are not limited to, a signature and/or a user identification that identifies the locate technician, one or more member codes for facility owners who may have facilities in or proximate to the dig area, one or more positive response codes representing a status of the locate and/or marking operation, and various textual information. In another aspect, the enhanced positive response may include a virtual white line (VWL) image, in addition to the EM image, that includes one or more dig area indicators to indicate the dig area on an image; alternatively, the EM image itself may include one or more such dig area indicators. As discussed in further detail below, one or both of an EM image and a VWL image may include geo-referenced information (e.g., GPS coordinates) in connection with dig area indicators, environmental landmarks present in and around the work site/dig area, and/or the locate and/or marking operation performed by the technician.

In another embodiment relating to an enhanced positive response, various environmental information may be provided in such a response regarding one or more environmental conditions present at or near the dig area/work site during a locate and/or marking operation. Examples of environmental conditions about which environmental information may be provided includes, but is not limited to, an ambient temperature, and ambient humidity, and an ambient light level. Various environmental sensors may be employed, alone or together with exemplary locate and marking devices discussed herein, to acquire such environmental information. Additionally, digital photographs and/or digital audio files may be acquired at or near the dig area/work site and included in an enhanced positive response to provide additional information.

In yet another embodiment relating to an enhanced positive response, according to the methods, apparatus and systems described herein an enhanced positive response may be generated in which an electronic manifest (EM) image and a virtual white line (VWL) image associated with the locate and/or marking operation are bundled together based on respective descriptor files (or descriptor metadata) for the EM image and the VWL image. In one aspect, the descriptor files or descriptor metadata associate the corresponding images with one or more particular tickets in response to which the locate and/or marking operation is performed so as to link the images and relevant information in the locate request ticket. In this manner, a comprehensive enhanced positive response may be generated so as to inform one or more parties of a completed status of the locate and/or marking operation. As noted above, in addition to the EM image and the VWL image, a variety of other information also may be included in an enhanced positive response resulting from bundling of images based on descriptor files/descriptor metadata.

In sum, one embodiment of the present invention is directed to an apparatus for providing information regarding a locate and/or marking operation. The locate and/or marking operation comprises detecting and/or marking by a locate technician, in response to at least one locate request ticket, a presence or an absence of at least one underground facility within a dig area, wherein at least a portion of the dig area is planned to be excavated or disturbed during excavation activities. The apparatus comprises: a communication interface; a memory to store processor-executable instructions; and a processing unit communicatively coupled to the communication interface and the memory. Upon execution of the processor-executable instructions by the processing unit, the processing unit: controls the communication interface to receive input indicating that the locate and/or marking operation is complete; and based on the input indicating that the locate and/or marking operation is complete, further controls the communication interface and/or the memory to electronically transmit and/or electronically store performance information concerning the locate and/or marking operation. The performance information includes at least one of the following: time-stamp information to provide proof of a time at which the locate and/or marking operation was completed by the locate technician; and place-stamp information to provide proof of a presence of the locate technician sufficiently proximate to or at a geographic location specified on the locate request ticket and corresponding to the dig area.

Another embodiment is directed to a computer-implemented method for providing information regarding a locate and/or marking operation. The locate and/or marking operation comprises detecting and/or marking by a locate technician, in response to at least one locate request ticket, a presence or an absence of at least one underground facility within a dig area, wherein at least a portion of the dig area is planned to be excavated or disturbed during excavation activities. The method comprises: A) receiving input indicating that the locate and/or marking operation is complete; and B) based on the input indicating that the locate and/or marking operation is complete, electronically transmitting and/or electronically storing performance information concerning the locate and/or marking operation. The performance information includes at least one of the following: time-stamp information to provide proof of a time at which the locate and/or marking operation was completed by the locate technician; and place-stamp information to provide proof of a presence of the locate technician sufficiently proximate to or at a geographic location specified on the locate request ticket and corresponding to the dig area.

Another embodiment is directed to at least one non-transitory computer readable medium encoded with instructions that, when executed on at least one processing unit, perform a method for providing information regarding a locate and/or marking operation comprising detecting and/or marking by a locate technician, in response to at least one locate request ticket, a presence or an absence of at least one underground facility within a dig area, wherein at least a portion of the dig area is planned to be excavated or disturbed during excavation activities, the method comprising: A) receiving input indicating that the locate and/or marking operation is complete; and B) based on the input indicating that the locate and/or marking operation is complete, electronically transmitting and/or electronically storing performance information concerning the locate and/or marking operation, the performance information including at least one of the following: time-stamp information to provide proof of a time at which the locate and/or marking operation was completed by the locate technician; and place-stamp information to provide proof of a presence of the locate technician sufficiently proximate to or at a geographic location specified on the locate request ticket and corresponding to the dig area.

Another embodiment is directed to an apparatus for providing information regarding a locate and/or marking operation. The locate and/or marking operation comprises detecting and/or marking by a locate technician, in response to at least one locate request ticket, a presence or an absence of at least one underground facility within a dig area, wherein at least a portion of the dig area is planned to be excavated or disturbed during excavation activities. The apparatus comprises: a communication interface; a memory to store processor-executable instructions; and a processing unit communicatively coupled to the communication interface and the memory. Upon execution of the processor-executable instructions by the processing unit, the processing unit: controls the communication interface to receive input indicating that the locate and/or marking operation is complete; and based on the input indicating that the locate and/or marking operation is complete, further controls the communication interface and/or the memory to electronically transmit and/or electronically store environmental information regarding at least one environmental condition present at or near the dig area during the locate and/or marking operation, so as to inform at least one party associated with providing at least one locate request relating to the locate and/or marking operation of the at least one environmental condition.

Another embodiment is directed to an apparatus for providing an enhanced positive response regarding a locate and/or marking operation. The locate and/or marking operation comprises detecting and/or marking by a locate technician, in response to at least one locate request ticket, a presence or an absence of at least one underground facility within a dig area, wherein at least a portion of the dig area is planned to be excavated or disturbed during excavation activities. The apparatus comprises: a communication interface; a memory to store processor-executable instructions; and a processing unit communicatively coupled to the communication interface and the memory. Upon execution of the processor-executable instructions by the processing unit, the processing unit implements an image assembly component, wherein the image assembly component: bundles together at least one at least one electronic manifest (EM) image and at least one virtual white line (VWL) image associated with the locate and/or marking operation, based on respective descriptor files for the at least one EM image and the at least one VWL image, so as to generate the enhanced positive response; and controls the communication interface and/or the memory to electronically transmit and/or electronically store the enhanced positive response so as to inform at least one party associated with providing at least one locate request relating to the locate and/or marking operation of a completed status of the locate and/or marking operation.

Another embodiment is directed to a computer-implemented method for generating a locate report that describes a completed underground facility locate operation. The method comprises: receiving, by a report application on a computing device, locate information from a locate request ticket, the locate information defining a requested locate operation in a dig area; receiving, by the report application, locate data acquired during the locate operation; receiving, by the report application, at least one image showing the dig area; generating, by the report application, a locate report identifying the locate request ticket and including information based on the locate data and the at least one image; and notifying, by the report application, at least one user that the locate report is available.

Another embodiment is directed to a computer-readable storage medium encoded with computer-readable instructions that, as a result of being executed by a computing device, controls the computing device to perform a method for generating a locate report that describes a completed underground facility locate operation. The method comprises: receiving locate information from a locate request ticket, the locate information defining a requested locate operation in a dig area; receiving locate data acquired during the locate operation; receiving at least one image showing the dig area; generating a locate report identifying the locate request ticket and including information based on the locate data and the at least one image; and notifying at least one user that the locate report is available.

Another embodiment is directed to a system for generating a locate report that describes a completed underground facility locate operation. The system comprises: a processing device; and a memory containing a report application, for execution by the processing device, to receive locate information from a locate request ticket, the locate information defining a requested locate operation in a dig area, to receive locate data acquired during the locate operation, to receive at least one image showing the dig area, to generate a locate report identifying the locate request ticket and including information based on the locate data and the at least one image, and to notify at least one user that the locate report is available.

Another embodiment is directed to an apparatus for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The apparatus comprises a communication interface; a memory to store processor-executable instructions; and a processing unit communicatively coupled to the communication interface and the memory. Upon execution of the processor-executable instructions by the processing unit, the processing unit controls the communication interface to receive user input regarding a preferred notification type and/or a preferred notification communication method for at least one notification indicating a status and/or providing information relating to the performance of the locate and/or marking operation; generates the at least one notification based at least in part on the preferred notification type and/or the preferred notification communication method; and further controls the communication interface and/or the memory to electronically transmit and/or electronically store the at least one notification so as to inform at least one party associated with providing at least one locate request relating to the locate and/or marking operation of the status and/or performance of the locate and/or marking operation.

Another embodiment of the present invention is directed to at least one computer readable medium encoded with instructions that, when executed on at least one processing unit, perform a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving user input regarding a preferred notification type and/or a preferred notification communication method for at least one notification indicating a status and/or providing information relating to the performance of the locate and/or marking operation; B) generating the at least one notification based at least in part on the preferred notification type and/or the preferred notification communication method; and C) electronically transmitting and/or electronically storing the at least one notification so as to inform at least one party associated with providing at least one locate request relating to the locate and/or marking operation of the status and/or performance of the locate and/or marking operation.

A further embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving user input regarding a preferred notification type and/or a preferred notification communication method for at least one notification indicating a status and/or providing information relating to the performance of the locate and/or marking operation; B) generating the at least one notification based at least in part on the preferred notification type and/or the preferred notification communication method; and C) electronically transmitting and/or electronically storing the at least one notification so as to inform at least one party associated with providing at least one locate request relating to the locate and/or marking operation of the status and/or performance of the locate and/or marking operation.

Another embodiment of the present invention is directed to an apparatus for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The apparatus comprises a communication interface; a memory to store processor-executable instructions; and a processing unit communicatively coupled to the communication interface and the memory. Upon execution of the processor-executable instructions by the processing unit, the processing unit controls the communication interface to receive an input indicating that the locate and/or marking operation is in progress or complete; generates at least one notification indicating that the locate and/or marking operation is in progress or complete; and further controls the communication interface and/or the memory to electronically transmit and/or electronically store the at least one notification so as to inform at least one party associated with providing at least one locate request relating to the locate and/or marking operation that the locate and/or marking operation is in progress or complete.

A further embodiment of the present invention is directed to at least one computer readable medium encoded with instructions that, when executed on at least one processing unit, perform a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving an input indicating that the locate and/or marking operation is in progress or complete; B) generating at least one notification indicating that the locate and/or marking operation is in progress or complete; and C) electronically transmitting and/or electronically storing the at least one notification so as to inform at least one party associated with providing at least one locate request relating to the locate and/or marking operation that the locate and/or marking operation is in progress or complete.

Another embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving an input indicating that the locate and/or marking operation is in progress or complete; B) generating at least one notification indicating that the locate and/or marking operation is in progress or complete; and C) electronically transmitting and/or electronically storing the at least one notification so as to inform at least one party associated with providing at least one locate request relating to the locate and/or marking operation that the locate and/or marking operation is in progress or complete.

A further embodiment of the present invention is directed to an apparatus for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The apparatus comprises a communication interface; a memory to store processor-executable instructions; and a processing unit communicatively coupled to the communication interface and the memory. Upon execution of the processor-executable instructions by the processing unit, the processing unit controls the communication interface to receive an input indicating that the locate and/or marking operation is complete; and based on the input indicating that the locate and/or marking operation is complete, further controls the communication interface and/or the memory to electronically transmit and/or electronically store at least one of the following so as to provide information concerning the locate and/or marking operation to at least one party associated with providing at least one locate request relating to the locate and/or marking operation: (a) a virtual white line image indicating the dig area; (b) an electronic copy of a completed locate request ticket; (c) an electronic manifest image showing details of the locate and/or marking operation; and (d) an electronic representation of the locate and/or marking operation.

Another embodiment of the present invention is directed to at least one computer readable medium encoded with instructions that, when executed on at least one processing unit, perform a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving an input indicating that the locate and/or marking operation is complete; and B) based on the input indicating that the locate and/or marking operation is complete, electronically transmitting and/or electronically storing at least one of the following so as to provide information concerning the locate and/or marking operation to at least one party associated with providing at least one locate request relating to the locate and/or marking operation: (a) a virtual white line image indicating the dig area; (b) an electronic copy of a completed locate request ticket; (c) an electronic manifest image showing details of the locate and/or marking operation; and (d) an electronic representation of the locate and/or marking operation.

A further embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving an input indicating that the locate and/or marking operation is complete; and B) based on the input indicating that the locate and/or marking operation is complete, electronically transmitting and/or electronically storing at least one of the following so as to provide information concerning the locate and/or marking operation to at least one party associated with providing at least one locate request relating to the locate and/or marking operation: (a) a virtual white line image indicating the dig area; (b) an electronic copy of a completed locate request ticket; (c) an electronic manifest image showing details of the locate and/or marking operation; and (d) an electronic representation of the locate and/or marking operation.

Another embodiment of the present invention is directed to an apparatus for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The apparatus comprises a communication interface; a memory to store processor-executable instructions; and a processing unit communicatively coupled to the communication interface and the memory. Upon execution of the processor-executable instructions by the processing unit, the processing unit electronically receives, via the communication interface, first user input relating to the dig area; based on the first user input, renders a digital virtual white line image including at least one dig area indicator to provide at least one indication of the dig area with respect to a geographic area; controls the communication interface and/or the memory to electronically transmit and/or electronically store information relating to the digital virtual white line image so as to facilitate the locate and/or marking operation; further controls the communication interface to electronically receive second user input regarding a preferred notification type and/or a preferred notification communication method for at least one notification indicating a status and/or providing information relating to the performance of the locate and/or marking operation; generates the at least one notification based at least in part on the preferred notification type and/or the preferred notification communication method; and further controls the communication interface and/or the memory to electronically transmit and/or electronically store the at least one notification so as to inform at least one party associated with providing at least one locate request relating to the locate and/or marking operation of the status and/or performance of the locate and/or marking operation.

Another embodiment of the present invention is directed to at least one computer readable medium encoded with instructions that, when executed on at least one processing unit, perform a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving first user input relating to the dig area; B) based on the first user input, rendering a digital virtual white line image including at least one dig area indicator to provide at least one indication of the dig area with respect to a geographic area; C) electronically transmitting and/or electronically storing information relating to the digital virtual white line image so as to facilitate the locate and/or marking operation; D) electronically receiving second user input regarding a preferred notification type and/or a preferred notification communication method for at least one notification indicating a status and/or providing information relating to the performance of the locate and/or marking operation; E) generating the at least one notification based at least in part on the preferred notification type and/or the preferred notification communication method; and F) electronically transmitting and/or electronically storing the at least one notification so as to inform at least one party associated with providing at least one locate request relating to the locate and/or marking operation of the status and/or performance of the locate and/or marking operation.

A further embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving first user input relating to the dig area; B) based on the first user input, rendering a digital virtual white line image including at least one dig area indicator to provide at least one indication of the dig area with respect to a geographic area; C) electronically transmitting and/or electronically storing information relating to the digital virtual white line image so as to facilitate the locate and/or marking operation; D) electronically receiving second user input regarding a preferred notification type and/or a preferred notification communication method for at least one notification indicating a status and/or providing information relating to the performance of the locate and/or marking operation; E) generating the at least one notification based at least in part on the preferred notification type and/or the preferred notification communication method; and F) electronically transmitting and/or electronically storing the at least one notification so as to inform at least one party associated with providing at least one locate request relating to the locate and/or marking operation of the status and/or performance of the locate and/or marking operation.

Another embodiment of the present invention is directed to an apparatus for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The apparatus comprises a communication interface; a memory to store processor-executable instructions; and a processing unit communicatively coupled to the communication interface and the memory. Upon execution of the processor-executable instructions by the processing unit, the processing unit electronically receives a locate request via the communication interface; based on the locate request, generates the at least one locate request ticket; controls the communication interface and/or the memory to electronically transmit and/or electronically store the locate request ticket so as to initiate the locate and/or marking operation; further controls the communication interface to electronically receive user input regarding a preferred notification type and/or a preferred notification communication method for at least one notification indicating a status and/or providing information relating to the performance of the locate and/or marking operation; generates the at least one notification based at least in part on the preferred notification type and/or the preferred notification communication method; and further controls the communication interface and/or the memory to electronically transmit and/or electronically store the at least one notification so as to inform at least one party associated with providing at least one locate request relating to the locate and/or marking operation of the status and/or performance of the locate and/or marking operation.

Another embodiment of the present invention is directed to at least one computer readable medium encoded with instructions that, when executed on at least one processing unit, perform a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving a locate request; B) based on the locate request, generating the at least one locate request ticket; C) electronically transmitting and/or electronically storing the locate request ticket so as to initiate the locate and/or marking operation; D) electronically receiving user input regarding a preferred notification type and/or a preferred notification communication method for at least one notification indicating a status and/or providing information relating to the performance of the locate and/or marking operation; E) generating the at least one notification based at least in part on the preferred notification type and/or the preferred notification communication method; and F) electronically transmitting and/or electronically storing the at least one notification so as to inform at least one party associated with providing at least one locate request relating to the locate and/or marking operation of the status and/or performance of the locate and/or marking operation.

A further embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving a locate request; B) based on the locate request, generating the at least one locate request ticket; C) electronically transmitting and/or electronically storing the locate request ticket so as to initiate the locate and/or marking operation; D) electronically receiving user input regarding a preferred notification type and/or a preferred notification communication method for at least one notification indicating a status and/or providing information relating to the performance of the locate and/or marking operation; E) generating the at least one notification based at least in part on the preferred notification type and/or the preferred notification communication method; and F) electronically transmitting and/or electronically storing the at least one notification so as to inform at least one party associated with providing at least one locate request relating to the locate and/or marking operation of the status and/or performance of the locate and/or marking operation.

Another embodiment of the present invention is directed to a method for providing information regarding a locate and/or marking operation comprising detecting and/or marking, in response to at least one locate request ticket, a presence or an absence of at least one underground facility within a dig area, wherein at least a portion of the dig area is planned to be excavated or disturbed during excavation activities. The method comprises A) electronically receiving user input regarding at least one notification type and/or at least one notification communication method for at least one notification indicating a status and/or providing information relating to the performance of the locate and/or marking operation; B) generating the at least one notification based at least in part on the at least one notification type and/or the at least one notification communication method; and C) electronically transmitting and/or electronically storing the at least one notification so as to inform at least one party associated with providing at least one locate request relating to the locate and/or marking operation of the status and/or performance of the locate and/or marking operation. According to some implementations, the at least one notification type and/or the at least one notification communication method may be mandated by at least one regulation and/or required by at least one contract.

For purposes of the present disclosure, the term "dig area" refers to a specified area of a work site within which there is a plan to disturb the ground (e.g., excavate, dig holes and/or trenches, bore, etc.), and beyond which there is no plan to excavate in the immediate surroundings. Thus, the metes and bounds of a dig area are intended to provide specificity as to where some disturbance to the ground is planned at a given work site. It should be appreciated that a given work site may include multiple dig areas.

The term "facility" refers to one or more lines, cables, fibers, conduits, transmitters, receivers, or other physical objects or structures capable of or used for carrying, transmitting, receiving, storing, and providing utilities, energy, data, substances, and/or services, and/or any combination thereof. The term "underground facility" means any facility beneath the surface of the ground. Examples of facilities include, but are not limited to, oil, gas, water, sewer, power, telephone, data transmission, cable television (TV), and/or internet services.

The term "locate device" refers to any apparatus and/or device for detecting and/or inferring the presence or absence of any facility, including without limitation, any underground facility. In various examples, a locate device may include both a locate transmitter and a locate receiver (which in some instances may also be referred to collectively as a "locate instrument set," or simply "locate set").

The term "marking device" refers to any apparatus, mechanism, or other device that employs a marking dispenser for causing a marking material and/or marking object to be dispensed, or any apparatus, mechanism, or other device for electronically indicating (e.g., logging in memory) a location, such as a location of an underground facility.

The term "locate mark" means any mark, sign, and/or object employed to indicate the presence or absence of any underground facility. Examples of locate marks may include, but are not limited to, marks made with marking materials, marking objects, global positioning or other information, and/or any other means. Locate marks may be represented in any form including, without limitation, physical, visible, electronic, and/or any combination thereof.

The terms "locate and marking operation," "locate operation," and "locate" generally are used interchangeably and refer to any activity to detect, infer, and/or mark the presence or absence of an underground facility. In some contexts, the term "locate operation" is used to more specifically refer to detection of one or more underground facilities, and the term "marking operation" is used to more specifically refer to using a marking material and/or one or more marking objects to mark a presence or an absence of one or more underground facilities. The term "locate technician" refers to an individual performing a locate operation. A locate and marking operation often is specified in connection with a dig area, at least a portion of which may be excavated or otherwise disturbed during excavation activities.

The term "user" refers to an individual utilizing a locate device and/or a marking device and may include, but is not limited to, land surveyors, locate technicians, and support personnel.

The terms "locate request," "excavation notice," and "work order" are used herein interchangeably to refer to any communication to request a locate and marking operation. The term "locate request ticket" (or simply "ticket") refers to any communication or instruction to perform a locate operation. A ticket might specify, for example, the address or description of a dig area to be marked, the day and/or time that the dig area is to be marked, and/or whether the user is to mark the excavation area for certain gas, water, sewer, power, telephone, cable television, and/or some other underground facility.

The following U.S. published applications are hereby incorporated herein by reference:

U.S. Pat. No. 7,640,105, issued Dec. 29, 2009, filed Mar. 13, 2007, and entitled "Marking System and Method With Location and/or Time Tracking;"

U.S. publication no. 2010-0094553-A1, published Apr. 15, 2010, filed Dec. 16, 2009, and entitled "Systems and Methods for Using Location Data and/or Time Data to Electronically Display Dispensing of Markers by A Marking System or Marking Tool;"

U.S. publication no. 2008-0245299-A1, published Oct. 9, 2008, filed Apr. 4, 2007, and entitled "Marking System and Method;"

U.S. publication no. 2009-0013928-A1, published Jan. 15, 2009, filed Sep. 24, 2008, and entitled "Marking System and Method;"

U.S. publication no. 2010-0090858-A1, published Apr. 15, 2010, filed Dec. 16, 2009, and entitled "Systems and Methods for Using Marking Information to Electronically Display Dispensing of Markers by a Marking System or Marking Tool;"

U.S. publication no. 2009-0238414-A1, published Sep. 24, 2009, filed Mar. 18, 2008, and entitled "Virtual White Lines for Delimiting Planned Excavation Sites;"

U.S. publication no. 2009-0241045-A1, published Sep. 24, 2009, filed Sep. 26, 2008, and entitled "Virtual White Lines for Delimiting Planned Excavation Sites;"

U.S. publication no. 2009-0238415-A1, published Sep. 24, 2009, filed Sep. 26, 2008, and entitled "Virtual White Lines for Delimiting Planned Excavation Sites;"

U.S. publication no. 2009-0241046-A1, published Sep. 24, 2009, filed Jan. 16, 2009, and entitled "Virtual White Lines for Delimiting Planned Excavation Sites;"

U.S. publication no. 2009-0238416-A1, published Sep. 24, 2009, filed Jan. 16, 2009, and entitled "Virtual White Lines for Delimiting Planned Excavation Sites;"

U.S. publication no. 2009-0237408-A1, published Sep. 24, 2009, filed Jan. 16, 2009, and entitled "Virtual White Lines for Delimiting Planned Excavation Sites;"

U.S. publication no. 2009-0202101-A1, published Aug. 13, 2009, filed Feb. 12, 2008, and entitled "Electronic Manifest of Underground Facility Locate Marks;"

U.S. publication no. 2009-0202110-A1, published Aug. 13, 2009, filed Sep. 11, 2008, and entitled "Electronic Manifest of Underground Facility Locate Marks;"

U.S. publication no. 2009-0201311-A1, published Aug. 13, 2009, filed Jan. 30, 2009, and entitled "Electronic Manifest of Underground Facility Locate Marks;"

U.S. publication no. 2009-0202111-A1, published Aug. 13, 2009, filed Jan. 30, 2009, and entitled "Electronic Manifest of Underground Facility Locate Marks;"

U.S. publication no. 2009-0204625-A1, published Aug. 13, 2009, filed Feb. 5, 2009, and entitled "Electronic Manifest of Underground Facility Locate Operation;"

U.S. publication no. 2009-0204466-A1, published Aug. 13, 2009, filed Sep. 4, 2008, and entitled "Ticket Approval System For and Method of Performing Quality Control In Field Service Applications;"

U.S. publication no. 2009-0207019-A1, published Aug. 20, 2009, filed Apr. 30, 2009, and entitled "Ticket Approval System For and Method of Performing Quality Control In Field Service Applications;"

U.S. publication no. 2009-0210284-A1, published Aug. 20, 2009, filed Apr. 30, 2009, and entitled "Ticket Approval System For and Method of Performing Quality Control In Field Service Applications;"

U.S. publication no. 2009-0210297-A1, published Aug. 20, 2009, filed Apr. 30, 2009, and entitled "Ticket Approval System For and Method of Performing Quality Control In Field Service Applications;"

U.S. publication no. 2009-0210298-A1, published Aug. 20, 2009, filed Apr. 30, 2009, and entitled "Ticket Approval System For and Method of Performing Quality Control In Field Service Applications;"

U.S. publication no. 2009-0210285-A1, published Aug. 20, 2009, filed Apr. 30, 2009, and entitled "Ticket Approval System For and Method of Performing Quality Control In Field Service Applications;"

U.S. publication no. 2009-0324815-A1, published Dec. 31, 2009, filed Apr. 24, 2009, and entitled "Marking Apparatus and Marking Methods Using Marking Dispenser with Machine-Readable ID Mechanism;"

U.S. publication no. 2010-0006667-A1, published Jan. 14, 2010, filed Apr. 24, 2009, and entitled, "Marker Detection Mechanisms for use in Marking Devices And Methods of Using Same;"

U.S. publication no. 2010-0085694 A1, published Apr. 8, 2010, filed Sep. 30, 2009, and entitled, "Marking Device Docking Stations and Methods of Using Same;"

U.S. publication no. 2010-0085701 A1, published Apr. 8, 2010, filed Sep. 30, 2009, and entitled, "Marking Device Docking Stations Having Security Features and Methods of Using Same;"

U.S. publication no. 2010-0084532 A1, published Apr. 8, 2010, filed Sep. 30, 2009, and entitled, "Marking Device Docking Stations Having Mechanical Docking and Methods of Using Same;"

U.S. publication no. 2010-0088032-A1, published Apr. 8, 2010, filed Sep. 29, 2009, and entitled, "Methods, Apparatus and Systems for Generating Electronic Records of Locate And Marking Operations, and Combined Locate and Marking Apparatus for Same;"

U.S. publication no. 2010-0117654 A1, published May 13, 2010, filed Dec. 30, 2009, and entitled, "Methods and Apparatus for Displaying an Electronic Rendering of a Locate and/or Marking Operation Using Display Layers;"

U.S. publication no. 2010-0086677 A1, published Apr. 8, 2010, filed Aug. 11, 2009, and entitled, "Methods and Apparatus for Generating an Electronic Record of a Marking Operation Including Service-Related Information and Ticket Information;"

U.S. publication no. 2010-0086671 A1, published Apr. 8, 2010, filed Nov. 20, 2009, and entitled, "Methods and Apparatus for Generating an Electronic Record of A Marking Operation Including Service-Related Information and Ticket Information;"

U.S. publication no. 2010-0085376 A1, published Apr. 8, 2010, filed Oct. 28, 2009, and entitled, "Methods and Apparatus for Displaying an Electronic Rendering of a Marking Operation Based on an Electronic Record of Marking Information;"

U.S. publication no. 2010-0088164-A1, published Apr. 8, 2010, filed Sep. 30, 2009, and entitled, "Methods and Apparatus for Analyzing Locate and Marking Operations with Respect to Facilities Maps;"

U.S. publication no. 2010-0088134 A1, published Apr. 8, 2010, filed Oct. 1, 2009, and entitled, "Methods and Apparatus for Analyzing Locate and Marking Operations with Respect to Historical Information;"

U.S. publication no. 2010-0088031 A1, published Apr. 8, 2010, filed Sep. 28, 2009, and entitled, "Methods and Apparatus for Generating an Electronic Record of Environmental Landmarks Based on Marking Device Actuations;"

U.S. publication no. 2010-0188407 A1, published Jul. 29, 2010, filed Feb. 5, 2010, and entitled "Methods and Apparatus for Displaying and Processing Facilities Map Information and/or Other Image Information on a Marking Device;"

U.S. publication no. 2010-0198663 A1, published Aug. 5, 2010, filed Feb. 5, 2010, and entitled "Methods and Apparatus for Overlaying Electronic Marking Information on Facilities Map Information and/or Other Image Information Displayed on a Marking Device;"

U.S. publication no. 2010-0188215 A1, published Jul. 29, 2010, filed Feb. 5, 2010, and entitled "Methods and Apparatus for Generating Alerts on a Marking Device, Based on Comparing Electronic Marking Information to Facilities Map Information and/or Other Image Information;"

U.S. publication no. 2010-0188088 A1, published Jul. 29, 2010, filed Feb. 5, 2010, and entitled "Methods and Apparatus for Displaying and Processing Facilities Map Information and/or Other Image Information on a Locate Device;"

U.S. publication no. 2010-0189312 A1, published Jul. 29, 2010, filed Feb. 5, 2010, and entitled "Methods and Apparatus for Overlaying Electronic Locate Information on Facilities Map Information and/or Other Image Information Displayed on a Locate Device;"

U.S. publication no. 2010-0188216 A1, published Jul. 29, 2010, filed Feb. 5, 2010, and entitled "Methods and Apparatus for Generating Alerts on a Locate Device, Based ON Comparing Electronic Locate Information TO Facilities Map Information and/or Other Image Information;"

U.S. publication no. 2010-0189887 A1, published Jul. 29, 2010, filed Feb. 11, 2010, and entitled "Marking Apparatus Having Enhanced Features for Underground Facility Marking Operations, and Associated Methods and Systems;"

U.S. publication no. 2010-0188245 A1, published Jul. 29, 2010, filed Feb. 11, 2010, and entitled "Locate Apparatus Having Enhanced Features for Underground Facility Locate Operations, and Associated Methods and Systems;"

U.S. publication no. 2009-0204238-A1, published Aug. 13, 2009, filed Feb. 2, 2009, and entitled "Electronically Controlled Marking Apparatus and Methods;"

U.S. publication no. 2009-0208642-A1, published Aug. 20, 2009, filed Feb. 2, 2009, and entitled "Marking Apparatus and Methods For Creating an Electronic Record of Marking Operations;"

U.S. publication no. 2009-0210098-A1, published Aug. 20, 2009, filed Feb. 2, 2009, and entitled "Marking Apparatus and Methods For Creating an Electronic Record of Marking Apparatus Operations;"

U.S. publication no. 2009-0201178-A1, published Aug. 13, 2009, filed Feb. 2, 2009, and entitled "Methods For Evaluating Operation of Marking Apparatus;"

U.S. publication no. 2009-0238417-A1, published Sep. 24, 2009, filed Feb. 6, 2009, and entitled "Virtual White Lines for Indicating Planned Excavation Sites on Electronic Images;"

U.S. publication no. 2010-0205264-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0205031-A1, published Aug. 12, 2010, filed Feb. 10, 2010, and entitled "Methods, Apparatus, and Systems for Exchanging Information Between Excavators and Other Entities Associated with Underground Facility Locate and Marking Operations;"

U.S. publication no. 2010-0201706-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205555-A1, published Aug. 12, 2010, filed Jun. 1, 2009, and entitled "Virtual White Lines (VWL) for Delimiting Planned Excavation Sites of Staged Excavation Projects;"

U.S. publication no. 2010-0205195-A1, published Aug. 12, 2010, filed Jun. 1, 2009, and entitled "Methods and Apparatus for Associating a Virtual White Line (VWL) Image with Corresponding Ticket Information for an Excavation Project;"

U.S. publication no. 2010-0205536-A1, published Aug. 12, 2010, filed Jun. 1, 2009, and entitled "Methods and Apparatus for Controlling Access to a Virtual White Line (VWL) Image for an Excavation Project;"

U.S. publication no. 2010-0228588-A1, published Sep. 9, 2010, filed Feb. 11, 2010, and entitled "Management System, and Associated Methods and Apparatus, for Providing Improved Visibility, Quality Control and Audit Capability for Underground Facility Locate and/or Marking Operations;"

U.S. publication no. 2010-0201690-A1, published Aug. 12, 2010, filed Apr. 13, 2009, and entitled "Virtual White Lines (VWL) Application for Indicating a Planned Excavation or Locate Path;"

U.S. publication no. 2010-0205554-A1, published Aug. 12, 2010, filed Apr. 13, 2009, and entitled "Virtual White Lines (VWL) Application for Indicating an Area of Planned Excavation;"

U.S. publication no. 2009-0202112-A1, published Aug. 13, 2009, filed Feb. 11, 2009, and entitled "Searchable Electronic Records of Underground Facility Locate Marking Operations;"

U.S. publication no. 2009-0204614-A1, published Aug. 13, 2009, filed Feb. 11, 2009, and entitled "Searchable Electronic Records of Underground Facility Locate Marking Operations;"

U.S. publication no. 2010-0205032-A1, published Aug. 12, 2010, filed Feb. 11, 2010, and entitled "Marking Apparatus Equipped with Ticket Processing Software for Facilitating Marking Operations, and Associated Methods;"

U.S. publication no. 2009-0327024-A1, published Dec. 31, 2009, filed Jun. 26, 2009, and entitled "Methods and Apparatus for Quality Assessment of a Field Service Operation;"

U.S. publication no. 2010-0010862-A1, published Jan. 14, 2010, filed Aug. 7, 2009, and entitled, "Methods and Apparatus for Quality Assessment of a Field Service Operation Based on Geographic Information;"

U.S. publication No. 2010-0010863-A1, published Jan. 14, 2010, filed Aug. 7, 2009, and entitled, "Methods and Apparatus for Quality Assessment of a Field Service Operation Based on Multiple Scoring Categories;"

U.S. publication no. 2010-0010882-A1, published Jan. 14, 2010, filed Aug. 7, 2009, and entitled, "Methods and Apparatus for Quality Assessment of a Field Service Operation Based on Dynamic Assessment Parameters;"

U.S. publication no. 2010-0010883-A1, published Jan. 14, 2010, filed Aug. 7, 2009, and entitled, "Methods and Apparatus for Quality Assessment of a Field Service Operation Based on Multiple Quality Assessment Criteria;"

U.S. publication no. 2010-0088135 A1, published Apr. 8, 2010, filed Oct. 1, 2009, and entitled, "Methods and Apparatus for Analyzing Locate and Marking Operations with Respect to Environmental Landmarks;"

U.S. publication no. 2010-0085185 A1, published Apr. 8, 2010, filed Sep. 30, 2009, and entitled, "Methods and Apparatus for Generating Electronic Records of Locate Operations;"

U.S. publication no. 2010-0090700-A1, published Apr. 15, 2010, filed Oct. 30, 2009, and entitled "Methods and Apparatus for Displaying an Electronic Rendering of a Locate Operation Based on an Electronic Record of Locate Information;" and U.S. publication no. 2010-0085054 A1, published Apr. 8, 2010, filed Sep. 30, 2009, and entitled, "Systems and Methods for Generating Electronic Records of Locate And Marking Operations."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

FIG. 6B illustrates an exemplary graphical user interface that may be used in connection with providing inputs to the informed excavator application, according to one embodiment of the present invention;

DETAILED DESCRIPTION

Figure 1:
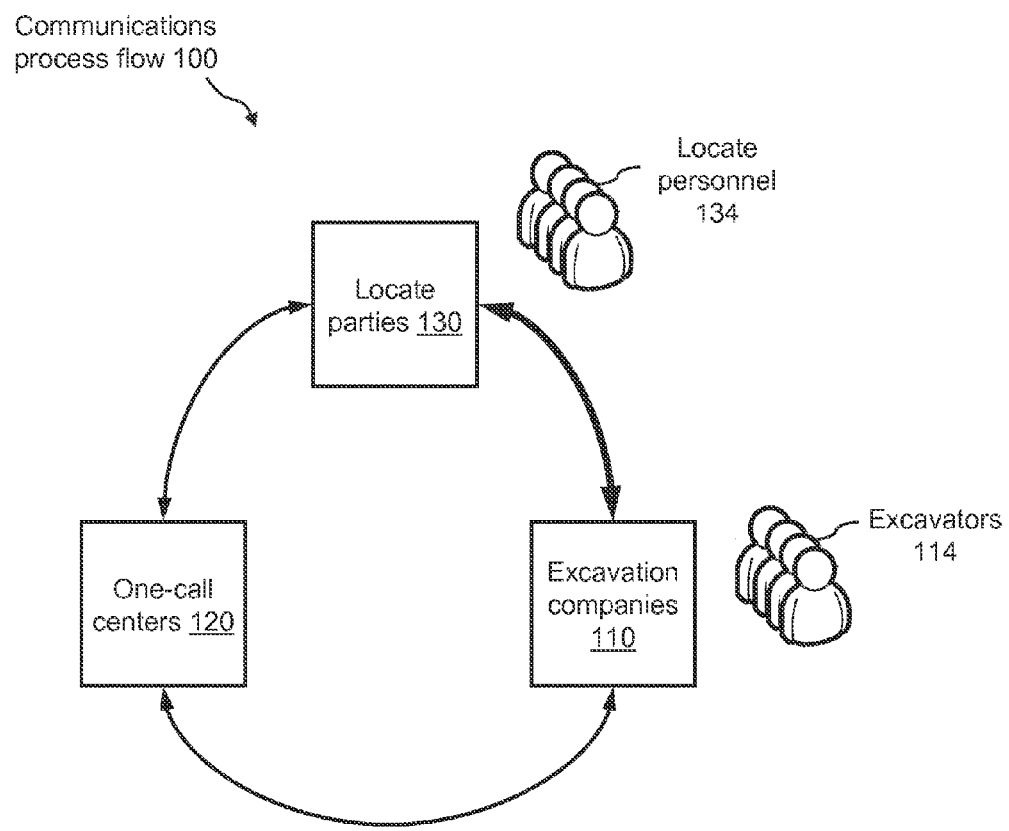
FIG. 1 illustrates an example of an information exchange process flow that includes a link between excavators and locate personnel, according to one embodiment of the present invention.

Following below are more detailed descriptions of various concepts related to, and embodiments of, inventive systems, methods and apparatus for providing an information exchange process between excavators and other entities associated with underground facility locate operations and, in particular, providing enhanced positive response notifications (also referred to herein simply as an "enhanced positive response" or "locate report") in connection with such operations. In various aspects, these methods, apparatus, and systems provide communication infrastructure and mechanisms by which information exchange regarding locate and/or marking operations, such as status information, may be reported in real-time and/or other times to excavators or other parties who originate locate requests.

For purposes of illustrating exemplary embodiments, in the more detailed discussion below an exemplary requesting party is taken to be an excavator, and the systems, methods and apparatus discussed herein are sometimes referred to as "informed excavator" systems, methods and apparatus or "positive response" systems, methods and apparatus. However, it should be appreciated that any reference to an "excavator" or "informed excavator" is merely exemplary, as the concepts discussed herein are contemplated as applying more generally to various parties who may request a locate and/or marking operation, examples of which parties may include, but are not limited to, property owners (e.g., home owners, business owners), facility owners, regulatory authorities, damage investigators, and the like. More generally, it should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

While currently a simple conventional communication process may exist between requesting parties and one-call centers and, likewise, a communication process may exist between one-call centers and locate parties, an aspect of the informed excavator systems, methods and apparatus disclosed herein is that they provide an information exchange process among requesting parties, one-call centers and locate parties (independent locate service providers, and/or facility owners who perform their own locate and/or marking operations) which is otherwise not present in current processes with respect to locate operations. Another aspect of the informed excavator system and associated methods of the present disclosure is that it provides improved information exchange between excavators and locate service providers.

Yet another aspect of the informed excavator system and associated methods of the present disclosure is that it provides better ways of communicating the status of locate operations to excavators in a timely manner, which may significantly reduce, and preferably entirely eliminate, the uncertainty as to whether the locate operation is complete.

Still another aspect of the informed excavator system and associated methods of the present disclosure is that it provides information to the excavator about the locate operation prior to beginning the excavation activities. This substantially improves the confidence of the excavator that the locate operation has been performed satisfactorily, which may significantly reduce, and preferably entirely eliminate, the risk of damage to underground facilities.

Still another aspect of the informed excavator system and associated methods of the present disclosure is that it provides improved project planning, decision making, management, and/or tracking with respect to locate operations.

Referring to FIG. 1, an example of information exchange process flow 100 that includes a link between excavators and locate personnel is presented. For example, information exchange process flow 100 may include a communications loop among one or more excavation companies 110 and their associated excavators 114, one or more one-call centers 120, and one or more locate parties 130 and their associated locate personnel 134.

Excavation companies, such as excavation companies 110, may be any companies that provide excavation services for any purpose, such as, but not limited to, excavation services related to the construction industry and excavation services related to the installation and/or maintenance of underground facilities. Excavators 114 may be any personnel associated with excavation companies 110, such as, but not limited to, individuals who are requesting and/or performing the excavation operations. In particular, excavators 114 generate locate requests (i.e., tickets), which may be processed via a certain one-call center 120. A ticket may be any communication or instruction to perform a locate operation at a certain dig area, which is any specified geographic area within which excavation may occur.

One-call centers, such as one-call centers 120, may be any organizations, entities, and/or systems that receive, process, and/or transmit locate requests. The locate request (or ticket) may be any communication or instruction to perform a locate operation. One-call centers are generally owned, controlled, or funded by underground facility owners, such as telephone companies, cable television multiple system operators, electric utilities, gas utilities, or others. One-call center operations may be managed by a non-profit entity or outsourced to a for-profit firm. Excavators, such as excavators 114, are required to notify one-call centers in advance of their excavation activities and identify through the locate request the dig area where individual excavating activities will be performed. Locate requests may include information supplied by the excavator to the one-call center regarding the specific geographic location of the dig area, date, time, purpose of excavation, and so on. The locate request, in turn, requires activity from an underground facility owner to perform a locate operation in the specified dig area.

Locate parties/entities, such as locate parties 130, may be any parties that provide locate services. Multiple locate personnel 134 may be associated with each locate party 130. Locate personnel 134 may be, for example, locate technicians and/or quality control technicians that, for example, perform locate operations.

While a communication process may exist between excavation companies and one-call centers and also may exist between one-call centers and locate parties in current processes, an aspect of the information exchange process flow 100 of the present disclosure is that it further includes a communications link between excavation companies and locate parties, which is otherwise not present in current processes for generating and processing locate requests. In this way, the communications loop among, for example, excavation companies 110, one-call centers 120, and locate parties 130 is closed. As a result, a free flow of information with respect to information about locate operations may occur.

More details of an example of a system for facilitating a closed loop communications flow, such as information exchange process flow 100, with respect to locate operations are described with reference to FIGS. 2 through 7.

Figure 2:
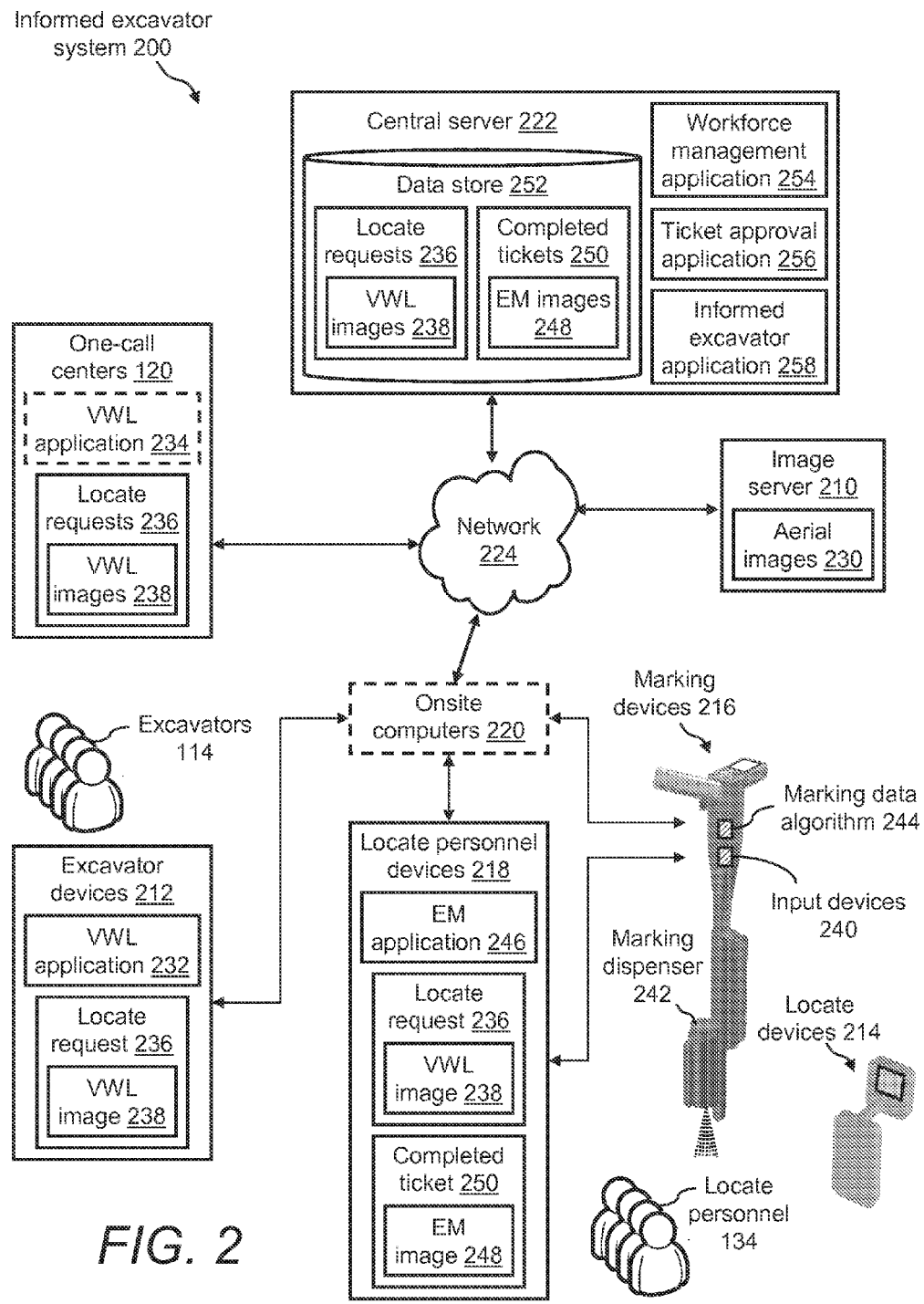
FIG. 2 illustrates a functional block diagram of an example of an informed excavator system for exchanging information between excavators and other entities associated with locate operations, according to one embodiment of the present invention.

Referring to FIG. 2, a functional block diagram of an example of an informed excavator system 200 for exchanging information between excavators and other entities associated with locate operations is presented. In particular, informed excavator system 200 is suitable for facilitating a flow of information among excavation companies, one-call centers, and locate parties in order to provide to the originating excavators notification of the status of locate operations and any other useful information about locate operations.

Informed excavator system 200 may include, but is not limited to, the one or more one-call centers 120 of FIG. 1, an image server 210 that may be used by the one or more excavators 114, one or more onsite computers 220 that may be used by locate personnel 134 and/or excavators 114, excavator devices 212, locate personnel devices 218, and a central server 222. A network 224 provides the communication link between any and/or among all entities of informed excavator system 200. For example, network 224 provides the communication network by which information may be exchanged among one-call centers 120, image server 210, central server 222, onsite computers 220, excavator devices 212 and locate personnel devices 218. Network 224 may be, for example, any local area network (LAN) and/or wide area network (WAN) for connecting to the Internet.

In order to connect to network 224, each entity of informed excavator system 200 includes a communication interface (not shown). For example, the respective communication interfaces of one-call centers 120, image server 210, central server 222, and onsite computers 220, as well as excavator and locate personnel devices, may be any wired and/or wireless communication interface by which information may be exchanged between any entities of informed excavator system 200. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

In exemplary implementations, each entity of the informed excavator system 200 shown in FIG. 2 also generally includes a memory (e.g., one or more computer-readable media) to store processor-executable instructions as well as other data. Each entity also includes one or more processing units coupled to the communication interface and the memory, wherein upon execution of the processor-executable instructions by the processing unit, the processing unit performs a variety of functions as set forth in greater detail below. Generally speaking, many of the various functionalities described herein and attributed to various entities of the informed excavator system 200 shown in FIG. 2 may be encoded as processor-executable instructions stored in/on one or more computer readable media.

Informed excavator system 200 is not limited to the types and numbers of entities that are shown in FIG. 2. Any types and numbers of entities that may be useful in underground facilities locate applications may be included in informed excavator system 200.

Image server 210 may be any application server, such as a web application server and/or web portal, by which excavators 114, one-call center 120, and locate parties and their personnel may access certain tools with respect to submitting and/or processing locate requests (or tickets) and/or for processing notifications about locate operations, including access to various images relating to the locate operations and excavation activities. Application server 210 may be accessed by excavators 114 via any networked computing device (not shown).

Central server 222 may be a centralized computer, such as a central server of, for example, a certain locate party 130 of FIG. 1, which is the underground facility locate service provider. Central server 222 may be utilized for managing the overall operations of informed excavator system 200. When authorized, applications and/or information that reside on central server 222 may be accessible by any other entities of informed excavator system 200 via network 224. For example, residing on central server 222 may be a workforce management application 254, a ticket approval application 256, and a notification application ("informed excavator application) 258.

Each onsite computer 220 may be any computer, such as, but not limited to, a computer that is present in the vehicle that is being used by the field service personnel. Each onsite computer 220 may be, for example, any computing device, such as portable computer, a personal computer, a tablet device, a PDA, a cellular radiotelephone, a mobile computing device, a touch-screen device, a touchpad device, or generally any device including, or connected to, a processor and a user interface. Preferably, onsite computer 220 is a portable computing device, such as laptop computer or tablet device. Residing on onsite computer 220 may be certain tools, such as, but not limited to, a VWL viewer, an electronic manifest (EM) application, and a workforce management client.

Figure 3:
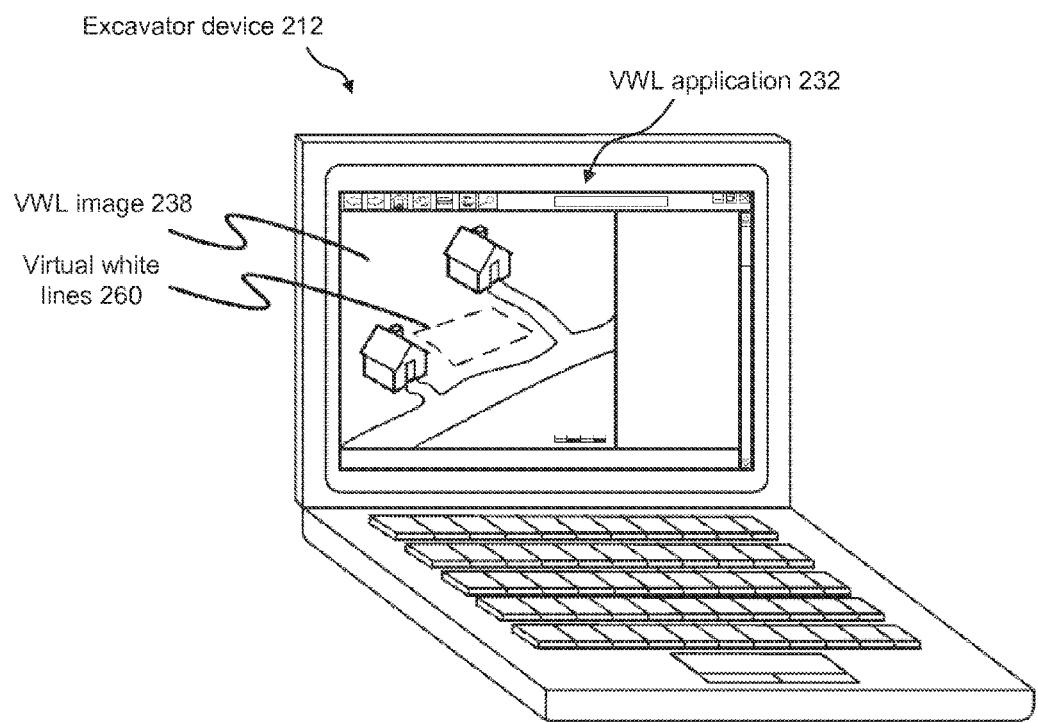
FIG. 3 illustrates an exemplary excavator device according to one aspect of the present invention, which supports a "virtual white line" (VWL) application to display an image of a geographic area including a dig area and facilitate adding virtual white lines to the displayed image to indicate the dig area.

VWL applications 232 and 234, which may be accessed via the image server 210 and downloaded for use on an onsite computer 220, an excavator device 212 and/or a one-call center 120, is a tool for electronically delimiting the particular geographic location of the proposed excavation in order to provide a substantially permanent and reproducible record of the planned excavation. For example, VWL application 232 (and similarly VWL application 234) may be a drawing application, which, in excavation applications, may be used by the excavator 114 as a dig area marking tool. More specifically, VWL application 232 may be used by the excavator 114 to add markings to an input image to graphically delimit a dig area. For example, VWL application 232 may be used to superimpose over or otherwise display "virtual white lines" on an input image (e.g., an aerial image) that may be received from, for example, the image server 210. As used herein, the virtual white lines may include lines, drawing shapes, shades, points, symbols, coordinates, data sets, or other indicators to delimit on an input image the dig area in which excavation is to occur. FIG. 3 illustrates an exemplary excavator device 212 according to one aspect of the present invention, which supports VWL application 232 to display an image of a geographic area including a dig area and facilitate adding virtual white lines 260 to the displayed image to provide a marked-up VWL image 238 on which is indicated the dig area.

Additionally, VWL application 232 may be the application by which excavators 114 may submit locate requests 236 to one-call centers 120, wherein the locate requests 236 may include the VWL image(s) 238 that are generated by excavators 114. Alternatively, excavators 114 may submit locate requests without virtual white line marked-up images to one-call centers 120, and in turn the one-call centers 120 may use the information in the locate request submitted by the excavator to in turn generate a virtual white line marked-up image 238, via VWL application 234, that is then forwarded to one or more locate parties 130 as locate request 236.

A project component of VWL applications 232 or 234 allows excavators 114 or a one-call center 120 to generate a series of VWL images that may be associated with multiple phases of a "project ticket," meaning a locate request for an ongoing project that requires multiple locate operations over, for example, a span of several days. An example of such a project may be excavation to lay fiber optics along a 20 mile stretch of a highway. With respect to locate operations, the project ticket may be generated that specifies certain subsections to be located and a timetable. Further to the example, the project component of the VWL application may allow the excavator 114 or the one-call center 120 to generate a first VWL image for mile 1 of 20, a second VWL image for mile 2 of 20, a third VWL image for mile 3 of 20, a fourth VWL image for mile 4 of 20, and so on. Each image of the series may be named and/or labeled in a manner that allows the VWL application to read in the series of VWL images in the correct order and geographic position and then overlay all of the VWL images to show the full scope of the locate operation with respect to the project ticket.

Hereafter, the term "VWL image" means a single VWL image of a locate request (or ticket) and/or a series of VWL images of a project ticket.

In one embodiment of the informed excavator system 200 shown in FIG. 2, an informed excavator application 258, which may reside on the central server 222, provides for the communication of information relating to the status of one or more locate operations. As discussed in greater detail below, such status information may be communicated in real time during various phases of a given locate operation, or at some point after the completion of a locate operation, to excavators, one-call centers, or other parties associated with the locate operation. In some exemplary implementations, an excavator may provide profile information regarding preferences in receiving notifications of the status information, in response to which one or more notifications may be automatically provided to the excavator.

For example, an excavator 114 may login to the informed excavator application 258 and specify (e.g., via a menu) the types of notifications that he/she wishes to receive and the methods by which notifications may be automatically received. For each excavator 114, the selected types and methods of notification may be saved in a respective "excavator profile" of informed excavator application 258. In this case, the specified preferences may be applied, by default, to all locate requests originated by that excavator. However, notification preferences may also be established in connection with individual locate operations or the like. For example, the excavator may be prompted to separately specify his or her preferences for notifications in connection with each requested locate operation. An excavator may override globally established notification preferences by specifying notification preferences for a particular locate operation without affecting the preferences set forth in the excavator profile.

Examples of types of notifications may include, but are not limited to, the following:

"Locate technician dispatched to dig area," which means that the locate technician is in route to the dig area. For example, the notification that is transmitted to the originating excavator 114 may be—"For Ticket No. 2645134, the locate technician Jack Stewart, telephone no. 622-222-2222, has been dispatched to dig area on Friday, Dec. 5, 2008 at 9:30 AM." Such a notification may include a map or a link to a map that shows the locate technician's current location. The locate technician's location may be based on location information derived from a global positioning system (GPS) device or other positioning system device associated with the locate technician. For example, the locate technician's location may be based on coordinates received from a GPS-enabled vehicle, computer, or personal digital assistant (PDA) in proximity to the locate technician while traveling between dig areas and/or during locate operations. The workforce management application 254 described in connection with FIG. 2 may receive and manage such location information.

"Locate technician on site at dig area," which means that locate technician has arrived at the dig area. For example, the notification that is transmitted to the originating excavator 114 may be—"For Ticket No. 2645134, the locate technician is on site at dig area on Friday, Dec. 5, 2008 at 10:05 AM."

"Ticket marked," which means that locate technician has completed the locate operation. However, a ticket approval process may be pending. For example, the notification that is transmitted to the originating excavator 114 may be—be "Ticket No. 2645134 is marked on Friday, Dec. 5, 2008 at 11:46 AM and is pending approval."

"Ticket approved," which means that the locate operation associated with the ticket has been certified by supervisors and/or quality control personnel of locate parties 130 to meet a certain quality standard. The certification process may be via ticket approval application 224 of central server 212. For example, the notification that is transmitted to the originating excavator 114 may be—"Ticket No. 2645134 is approved on Friday, Dec. 5, 2008 at 12:35 PM." Since approval of the ticket may be the last step of the locate process, such a notification may also include a positive indication that the locate operation is complete and/or that the excavator may proceed with excavation activities.

"Locate details," which means that detailed information about the locate operation may be transmitted to excavators 114, such as information generated by locate personnel 134 using EM application 232 of onsite computers 214.

"Locate operation delayed," which means that the locate operation has been delayed for some reason (e.g., rain).

"Ticket expired" or "Ticket about to expire," which means that the specified time frame for the locate operation has or is about to expire without the locate operation having been completed.

"Locate Request Submitted," which means that the locate request has been submitted to the one-call center. This notification may include, for example, the name of the person who originated the locate request and/or the locate party or parties who will be responsible for performing the locate operation.

The types of notifications listed above are merely exemplary, and it should be appreciated that many additional types of notifications are possible. For example, notifications may have a high degree of specificity. Rather than simply electing to be notified when a locate technician is on-site, a user may elect to be notified when the locate technician has turned on his marking device, begun marking, changed paint colors, etc. A notification can also relate to a planned event so that, for example, an excavator may be informed when the locate technician plans to be on-site so that the excavator can meet with the locate technician at the specified time.

Examples of methods by which notifications may be automatically received by excavators 114 may include, but are not limited to, email, SMS text message, instant message, phone call (such as from an interactive voice response (IVR) system), pager message, and rich site summary (RSS) feed, which is a family of Web feed formats used to publish frequently updated works, such as blog entries, news headlines, audio, and video, in a standardized format. The notifications may optionally include image(s) or video. For example, an image showing details of the completed locate and/or marking activities may be transmitted to an excavator 114 as an attachment to an email or text message.

Alternatively, an authorized excavator 114 may query the status of certain locate requests by, for example, accessing a secure web site. For example, text-based notifications (e.g., emails or SMS text messages) received by excavators 114 may include a link or reference to a web site, such as one maintained by a locate service provider, that includes information on the status of a locate request and/or locate operation. By accessing the web site, such as by clicking on the hyperlink in an email, the excavator 114 may view periodically updated, recent, and/or real-time information on the status of a locate request and/or locate operation.

Such a web site may display an image showing details of a locate operation and/or a corresponding electronic representation of the locate operation. Further, such a web site may display aggregate information, such that an excavator 114 can view information supplied by multiple locate technicians or parties and/or information relating to a multiple submitted locate requests or multiple dig areas. According to one illustrative example, an excavator 114 may receive an email with a notification that a locate party has completed its locate activities, along with a link to a web site that includes an image and/or electronic representation showing details of the locate activities completed by that locate party as well as the locate activities previously completed by other locate parties.

In some instances, it may be desirable for a single entity or a limited number of entities to retain control over the status or other information relating to a locate operation. For example, it may be desirable for the entity that provides access to an electronic manifest (EM) creation application (e.g., the EM application 246) and has initial control of one or more created EM images (e.g., EM images 248) to retain control of such images. One potential benefit of retaining control of the EM image(s) once created is avoiding unauthorized edits to or unauthorized use of the image(s).

According to one example, a "controlling" entity that provides access to an EM creation application (e.g., the EM application 246) retains control of one or more created images, but allows other entities to access the images in some instances in a limited manner. For example, the controlling entity may provide a link (e.g., a hyperlink) to one or more EM images (e.g., via an e-mail) or otherwise provide an interface allowing the EM image(s) to be accessed (e.g., via a customized or proprietary image viewing application). Such a link may have a pre-established expiration date, such that clicking on the link will not access the EM image(s)/web page after the specified expiration date. To maintain the integrity of the EM image(s), the application providing access to the EM image(s) may prohibit copying of, saving of, or writing to the images. For example, the EM image may be viewable only using a corresponding image file viewer that allows limited access to the EM image. In particular, copy, save and/or write access to the EM image may be prohibited. In these and other respects discussed below, one or more EM image files may be stored and/or transmitted as "limited access files."

The EM image may, for example, be transmitted to a party associated with the at least one underground facility with the corresponding image file viewer so that the party may view the EM image. For example, an executable file comprising the EM image and image file viewer may be transmitted (e.g., a customized image viewer may be transmitted to one or more onsite computers). Alternatively, the image file viewer may be downloaded/installed separately, e.g., from a web site of the controlling entity, or the EM image may be viewed using an image file viewer stored and executed on a server of the controlling entity.

In one implementation, the controlling entity may allow access to the EM image(s) only when a certain condition or conditions are met. For example, the controlling entity may require a password protected log-in procedure for access to the EM image(s). In particular, the image file viewer may require a password to permit access to the EM image. As another example, the controlling entity may require acceptance of certain terms and/or conditions to permit access to the EM image. According to one implementation, the image file viewer may be programmed to require an indication of acceptance of terms and/or conditions prior to permitting access to the EM image. According to yet another example, the controlling entity may charge a fee for permitting a third party to access one or more EM images, such as a per-transaction fee or a subscription fee.

To prevent access to the EM image unless or until a condition or conditions are met, the EM image may be encrypted and require decryption to be readable. A corresponding image file viewer may be required to decrypt the EM image. The EM image and/or the corresponding image file viewer may also or alternatively be proprietary, and may have a format specific to the controlling entity. The image file viewer may optionally be programmed to determine whether an updated version of the image file viewer is available. For example, the image file viewer may interrogate information associated with the EM image to determine a corresponding version of the image file viewer. If an updated version is found, the viewer may prompt the user to upgrade the application or otherwise facilitate an update.

The EM image may be transmitted in a variety of different formats. For example, the EM image may be transmitted as an image including locate mark indicators thereon. Alternatively, the EM image may be transmitted as a base image with associated metadata and/or a separate file (e.g., an XML file) including information that allows the locate mark indicators to be rendered on or in connection with the base image. Such information may comprise geographic coordinates specifying the locate mark indicators to be displayed on the base image. The information included in the metadata and/or separate file may also specify access permissions for the locate mark indicators. For example, in the case where the information that allows locate mark indicators to be rendered relates to a plurality of dig sites, locate mark information for one or more dig sites may have restricted access such that the corresponding locate mark indicators are not rendered unless certain access conditions are met.

While the status information described above as being stored and/or transmitted as a "limited access file" corresponds to one or more EM images, the same principles may be applied to other types of image-based or non-image files to limit the access to the status information.

In some implementations, an acknowledgement is required from the recipient of a positive response notification that he or she has received and/or reviewed the information included in the notification. Thus, a return receipt may be solicited from the recipient of an notification in the form of an automatic confirmation that the notification was opened or received, for example by an automatic return email or text message. A notification may also be automatically generated when the notification recipient logs in to a web site or otherwise accesses information via a web site. Alternatively, a recipient-generated confirmation may be solicited. For example, the recipient may be requested to reply to a text or email with a certain word or code when a notification is received, accessed and/or reviewed.

Turning again to FIG. 2, one-call centers 120 may process locate requests that may be submitted by excavators 114. More specifically, a certain one-call center 120 may pass locate requests to central server 222 of a certain locate party 130. The locate requests may include corresponding VWL images that are generated by excavators 114, who originate the locate requests. Subsequently, workforce management application 254 of central server 222 may be used to process the locate requests that are received from one-call centers 120 and dispatch the locate requests to locate personnel 134 that are in the field. Locate personnel 134 are able to receive locate requests (along with any VWL images) that are dispatched by workforce management application 222 via their respective onsite computers 220 or locate personnel devices 218.

Figure 4:
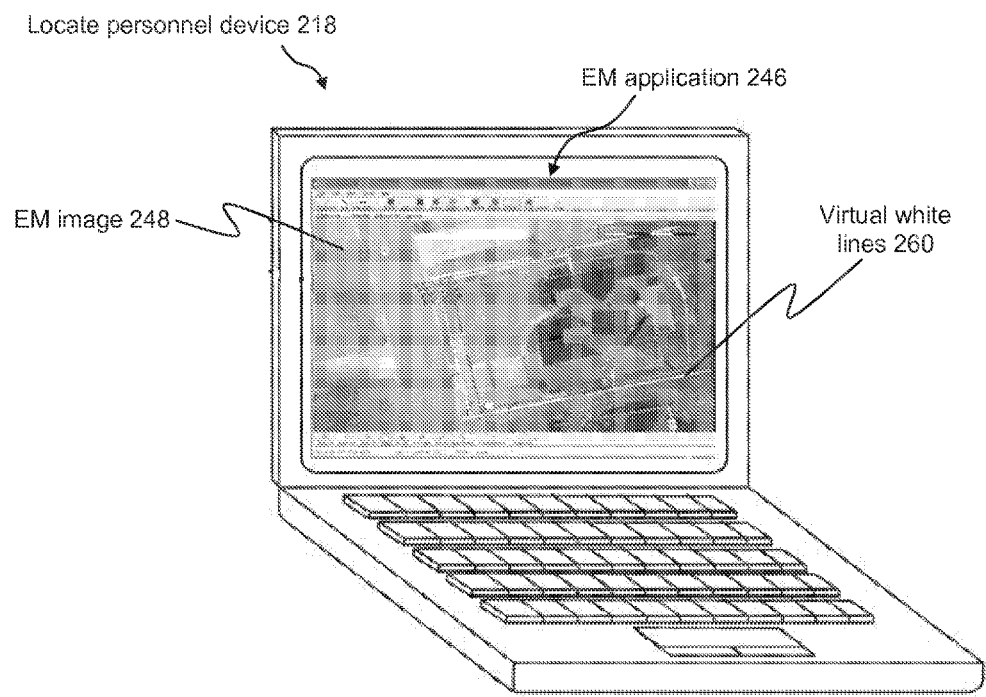
FIG. 4 illustrates an exemplary locate personnel device according to one aspect of the present invention, which supports an "electronic manifest" (EM) application to display an image of a geographic area including a dig area and facilitate adding one or more indicators to the displayed image representing one or more physical locate marks applied to the dig area to indicate a presence or an absence of one or more underground facilities.

Once received at a certain onsite computer or device, a certain locate personnel 134 may view the locate request and may view the corresponding VWL image via the VWL viewer 230. VWL viewer 230 may be any graphical viewer application that is capable of reading and displaying the VWL images. Alternatively, VWL images may be read into and viewed by an "electronic manifest" (EM) application 246. EM application 246 may be a drawing application, which, in underground facility locate applications, may be used by locate personnel 134 as a marking tool for documenting the locate operation. FIG. 4 illustrates an exemplary locate personnel device 218 according to one aspect of the present invention, which supports an EM application 246 to display an image of a geographic area including a dig area and facilitate adding one or more indicators to the displayed image representing one or more physical locate marks applied to the dig area to indicate a presence or an absence of one or more underground facilities, thereby forming EM image 248.

More specifically, EM application 246 may be used by locate personnel 134 to add markings (one or more "locate mark indicators") to an input image of a geographic area including the dig area, so as to graphically indicate (digitally represent in an electronic image) the work performed in the locate operation. The input image may be received from, for example, the image server 210 that may be associated with a party that provides images for a fee. In some implementations, the input image may be an aerial image 230. EM application 246 may superimpose over or otherwise display these markings on the displayed input image and save them as, for example, an EM image 248. The markings may include lines, drawing shapes, shades, points, symbols, coordinates, data sets, or other indicators to graphically depict the work performing in the locate operation. The EM image may then be associated with a marked ticket that may be transmitted to central server 222.

The resulting EM image generated by EM application 246 may show, for example, the original virtual white lines 260 from the original VWL image; a mark-up of one or more types of facilities, the presence or absence of which have been determined during the locate operation, and a mark-up of one or more environmental landmarks. An environmental landmark may be any location specified by any means that is used or can be used as a reference point for measurement or orientation. Examples of environmental landmarks may include, but are not limited to, a tree, a curb, a driveway, a utility pole, a fire hydrant, a storm drain, a pedestal, a water meter box, a manhole lid, a building structure, a light post, or a set of global positioning system coordinates.

Alternatively, EM application 246 may read in information about the locate operation from a data-enabled electronic marking device 216 that is used during the locate operation. The data-enabled electronic marking device may, for example, be based on the marking devices that are described with reference to U.S. Patent Application publication no. 2008-0245299-A1, filed Apr. 4, 2007, entitled "Marking system and method," and U.S. Patent Application publication no. 2008-0228294-A1, filed Mar. 13, 2007, entitled "Marking system and method with location and/or time tracking," which publications are incorporated by reference herein in their entirety.

By way of example, the marking device 216 may include certain software components and/or applications, such as, but not limited to, a device health component, a marking data algorithm 244, a map viewer application, ticket processing software, a speech synthesis component, and an operating mode controller that allows the marking device to operate in multiple modes, such as, but not limited to, marking mode, landmark identification mode, solo mode, and group mode. Additionally, the marking device 216 may include certain input devices 240, such as, but not limited to, a marking material detection mechanism, a location tracking system, a temperature sensor, a humidity sensor, a light sensor, a compass, an inclinometer, an accelerometer, a digital camera, and an audio recorder.

Subsequently, the information from the data-enabled electronic marking device 216 may then be rendered into the graphical depiction of the work performed in the locate operation. More specifically, the information from the data-enabled electronic marking device may be processed by EM application 246 and a graphical depiction of the locate operation may be superimposed over or otherwise displayed on the input image and saved as the EM image 248. Again, the EM image 248 may then be associated with a marked or completed ticket 250 that may be transmitted to central server 222. When excavators 114 select "Locate information" as one type of notification in their excavator profiles, the source of this information may be, for example, the marked up EM images 248.

In some locate operations, no underground facilities are determined to be present in a designated dig area. Such locate operations are sometimes referred to as "clears." In some implementations of the inventive concepts discussed herein, the EM application 246 may nonetheless be employed to provide an electronic record of a "clear;" more specifically, although no locate mark indicators may be added to an input image (because there are no physical locate marks to digitally represent), the EM application may be employed to provide other information associated with the "clear" locate operation (e.g., a timestamp of when the locate operation was performed, an identifier for a technician or locate party performing the locate operation, a text address or other geographical identifier for the dig area, etc.) and this other information may be associated with the input image (e.g., as a separate data set linked to the input image, as metadata, a combined file of image and non-image data, etc.) to create a searchable electronic record that may be consulted (e.g., forward to an excavator or other party as part of a notification) to verify that the locate operation was indeed completed, even though no underground facilities were found.

Workforce management client of onsite computers 220 and/or locate personnel devices 218 may be a counterpart to workforce management application 254 of central server 222. That is, workforce management client may be used to transmit the current status of locate operations from onsite computers/locate personnel devices to workforce management application 254. During locate operations, workforce management application 254 monitors status and other information returned from workforce management client and/or ticket approval application 256 of central server 222. Workforce management client exposes this information to the informed excavator application 258. As discussed above, certain status conditions may include, but are not limited to, "ticket received" by locate party 130, "ticket dispatched," "locate operation in progress," "ticket marked," "ticket approved," "ticket closed," and the like.

Ticket approval application 256 of central server 222 may be used for collecting data associated with locate operations that are performed in the field and by which quality control functions may be performed. In one example, one or more approvers (not shown) are associated with ticket approval application 224. The approvers may be, for example, any personnel associated with the underground facility locate service provider, such as, but not limited to, the supervisors of locate technicians that are dispatched into the field, quality control supervisors, and/or any management personnel.

Ticket approval application 256 may use the information found in the of EM images 248 of marked or completed tickets 250 that are returned from onsite computers 220/ locate personnel devices 218 in order to rapidly assess the quality of the work performed in the field. This assessment may be by visual inspection of each marked ticket by one or more approvers and/or by analyzing the information of each marked ticket against one or more facilities maps (not shown) that correspond to the geographic location associated with marked ticket. Ticket approval application 256 may be a source of locate operation status information that may be monitored by informed excavator application 258.

Figure 5:
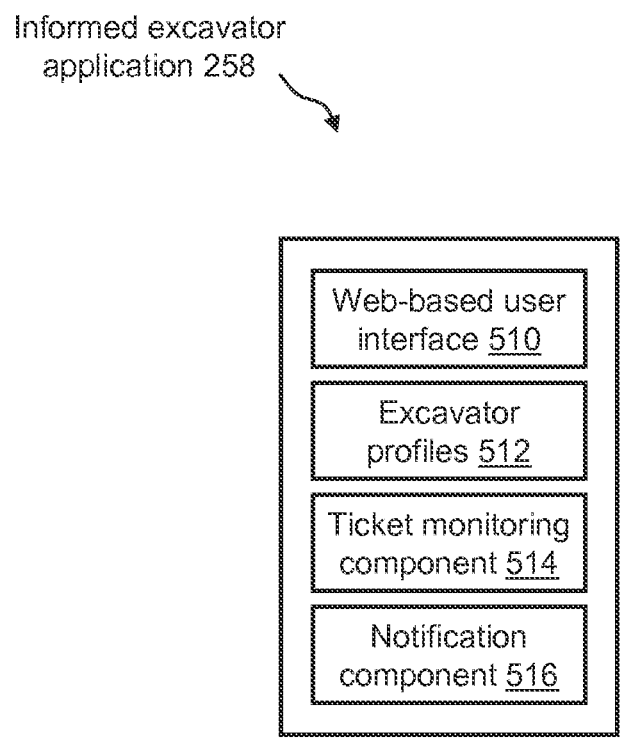
FIG. 5 illustrates various elements of an informed excavator application for providing information regarding the status of locate operations, according to one embodiment of the present invention.

FIG. 5 illustrates various elements of an informed excavator application 258 for providing information regarding the status of locate operations, according to one aspect of the present invention. According to various aspects, for each locate request received at central server 222, informed excavator application 258 reads in information from excavator profiles 512 in order to determine the preferred types and methods of notification entered by the originating excavator 114. During locate operations, informed excavator application 258 monitors status and other information about locate operations that may be provided by workforce management application 254 and/or ticket approval application 256 via ticket monitoring component 514. In so doing, informed excavator application 258 automatically generates notifications, via notification component 516, according to information in the excavator profiles 512 that are associated with the originating excavators 114.

Figure 6A:
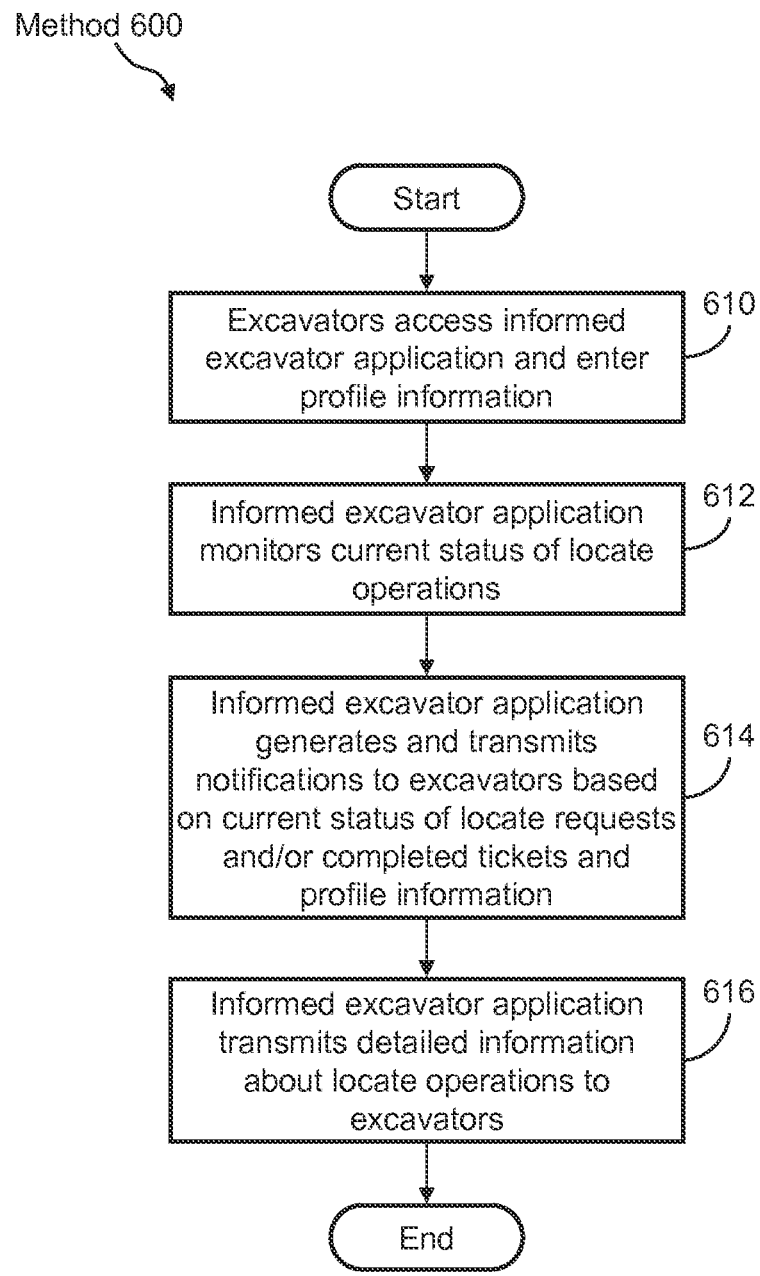
FIG. 6A illustrates a flow diagram of an exemplary method of providing information regarding the status of locate operations, according to one embodiment of the present invention.

Referring to FIG. 6A, a flow diagram of an example of a method 600 of operation of informed excavator system 200, and more particularly the informed excavator application 256, is presented. Method 600 may include, but is not limited to, the following steps, which are not limited to any order.

At step 610, excavators 114 access informed excavator application 256 and enter profile information. More specifically, excavators 114 may log into the informed excavator application 256 and enter profile information, such as information about their identity and the preferred types of notifications (e.g., Locate technician dispatched to dig area, Locate technician on site at dig area, Ticket marked, Ticket approved, Locate details) and preferred methods of notifications (e.g., email, SMS text message, phone call, pager message).

FIG. 6B illustrates an exemplary graphical user interface (GUI) 1000 that may be used in connection with providing inputs to the informed excavator application 258 shown in FIG. 5, and in particular the excavator profiles 512, according to one embodiment of the present invention. The GUI 1000 may comprise, for example, a liquid crystal display or other display screen to display information, and may have a touch-sensitive screen and/or be associated with one or more other user input devices to receive user inputs. In the exemplary interface shown in FIG. 6B, a checklist of notification types 1002 and a checklist of notification communication methods 1004 are displayed. To establish a user profile, a user may check one or more desired notification types 1002 and one or more desired notification communication methods 1004 in the displayed checklists. The selected notification type(s) and/or notification communication method(s) may be saved as a user profile, which may include default preferences for the user.

At the bottom of the screen, the user is prompted to indicate, via check box and prompt 1006, whether the user would like to submit a locate request and/or generate a VWL image. If the user indicates such interest by selecting the check box, the GUI 1000 will display an interface such as the VWL application interface shown in FIG. 3 so that the user may generate a VWL image and/or submit a locate request as discussed in connection with that application. The locate request may include a VWL image and/or a data set relating to a VWL image, although such information may not be necessary. The foregoing is discussed in greater detail below in connection with FIG. 8.

In the example described above, the user who establishes a user profile using the GUI 1000 of FIG. 6B may be an excavator or other party associated with providing a locate request. However, a user profile may be established by other parties, such as a facility owner, a locate party, a party informed by regulatory requirements, contract requirements, or other requirements for such notifications, and/or some combination of the foregoing. In this way, a facility owner, locate party, and/or regulatory body may dictate the positive response notifications received by a party associated with providing a locate request (e.g., an excavator) and/or how such positive notifications are received by the party. For example, a particular facility owner may specify preferred notification type(s) and notification communication method(s) for all locate and/or marking operations that involve their facility, per agreement with a locate party. Further, a user profile may be established without using the GUI described in connection with FIG. 6B. For example, the excavator information application may receive inputs from a file that includes information (e.g., contract and/or regulatory requirements) that may be used to generate the user profile.

Returning now to FIG. 6A, at step 612, the current status of locate requests is monitored. For example, status and/or other information is returned from onsite computers/locate personnel devices to workforce management application 254 and/or ticket approval application 256 of central server 222. Informed excavator application 258 queries workforce management application 254 and/or ticket approval application 256 for the status and/or other information. Certain status conditions may include, but are not limited to, ticket received, ticket dispatched, locate operation in progress, ticket marked, ticket approved, ticket closed, and the like.

At step 614, notification component 516 of informed excavator application 258 generates notifications to excavators 114 based on the current status of locate requests and then transits the notifications based on the types and methods of notifications that are selected in the respective excavator profiles 512 of excavators 114.

In one example, when the types of notifications selected in the profile information is "All types of notifications," the preferred method of notification is "SMS text message," and the current status is "ticket dispatched," a "Locate technician dispatched to dig area" notification may be automatically transmitted to the excavator 114. For example, a text message may be generated and transmitted to the cell phone of the excavator 114 as follows—"For Ticket No. 2645134, locate technician has been dispatched to dig area on Friday, Dec. 5, 2008 at 9:30 AM." Continuing the example, when the current status changes to "ticket marked," a "Ticket marked" notification may be automatically transmitted to the excavator 114. For example, a text message may be generated and transmitted to the cell phone of the excavator 114 as follows—"Ticket No. 2645134 is marked on Friday, Dec. 5, 2008 at 11:46 AM."

In another example, when the types of notifications selected in the profile information is "Ticket closed" only and the preferred method of notification is a phone call, only when the current status is "ticket closed" will the excavator 114 receive a phone call notification. For example, when the current status is "ticket closed," the excavator 114 may receive a phone call directly from the locate technician who performed the locate operation to inform the excavator 114 that the ticket of interest has been closed on a certain date and time. Alternatively, the excavator 114 may receive a phone call from a certain locate party 130 and/or one-call center 120 in order to inform the excavator 114 that the ticket of interest has been closed. The phone call may be a manually generated phone call from personnel of a certain locate party 130 and/or one-call center 120. Alternatively, the phone call is automatically initiated via an IVR system.

At step 616, notification component 516 of informed excavator application 258 transmits detailed information about locate operations to the excavators. More specifically, when "Locate information" is selected in the excavator profile, detailed information about the locate operation of a certain ticket may be transmitted by notification application 226 to the excavator 114 who originated the locate request. For example, the excavator 114 may receive the following information about a certain locate operation: (1) the original VWL image and/or series of VWL images; (2) an electronic copy of the completed ticket, which may include a status code indicating whether or not the locate operation was completed; (3) the corresponding EM image 248 that was generated by locate personnel 134 via EM application 246 and that shows various details of the locate operation; (4) the corresponding electronic representation of the locate operation, which may include, e.g., the locate technician's name, the locate equipment used, the diagnosis software used on the locate equipment, the locate technician's history at the site, and a description of the conditions in and/or around the dig area (e.g., whether there is a fence and the number of houses or other structures present); (5) an assessment of the risk of excavation in the dig area (e.g., a descriptive or numeric risk assigned based on such factors as whether there is a buried line, a high pressure gas line, or other high risk condition within or near the dig area); and (6) any combinations thereof Referring to FIG. 7, a flow diagram of an example of a method 700 of using informed excavator system 200 is presented. Method 700 may include, but is not limited to, the following steps, which are not limited to any order.

At step 710, a locate request that includes a VWL image and/or a project ticket that includes a series of VWL images of the proposed dig area is submitted to a one-call center.

More specifically, a certain excavator 114 may use VWL application to generate a VWL image and/or series of VWL images and then submit a locate request and/or project ticket, respectively, to a certain one-call center 120.

At step 712, the locate request that includes a VWL image and/or a project ticket that includes a series of VWL images is passed from a certain one-call center 120 to a certain locate party 130. More specifically, the locate request that is generated in step 710 is transmitted from the one-call center 120 to central server 212 of a certain locate party 130 that is to perform the locate operation.

In various exemplary implementations, a locate request ticket provided to a locate party 130 may include one or both of image data and non-image data associated with the dig area. As discussed above, the image data may include at least one marked-up image of a geographic area including the dig area, wherein the marked-up image(s) includes at least one dig area indicator (e.g., virtual white lines) to provide an indication of the dig area. Again, the dig area indicator(s) (e.g., virtual white lines) typically are placed on the image (e.g., by the excavator or one-call center) before the ticket is received by the locate party. In some implementations, the dig indicator(s)/virtual white lines may be added to the image at a first user location remote from the dig area and/or without acquiring geographic coordinates for the dig area indicator(s). Examples of non-image data that may be included in or otherwise associated with the locate request ticket may include, but are not limited to, one or more of the following: a text description of the dig area; a plurality of geographic coordinates associated with the at least one dig area indicator; an address or a lot number of at least one property within which the dig area is located; a street intersection in a vicinity of the dig area; a date and/or time of day for an excavation of the dig area; a first identifier associated with an excavator to perform the excavation activities; a second identifier associated with at least one environmental landmark in the vicinity of the dig area; and a ticket identifier for the locate request ticket. Any of the image data or non-image data associated with the locate request ticket may be provided to one or more parties in connection with one or more notifications regarding the status of locate operations, as discussed in greater detail below.

At step 714, workforce management application 254 assigns the locate request that is generated in step 712 to a certain locate personnel 134, such as a locate technician, and the locate technician is dispatched to dig area.

At step 716, the originating excavator 114 may be notified by informed excavator application 258, which is monitoring the status of the locate request, that the locate technician is in route to the dig area. For example, notification component 516 may generate a "Locate technician dispatched to dig area" notification, which may be received by the excavator 114 by the notification method selected in his/her excavator profile. Receiving this notification allows the excavator 114 the opportunity to proceed to the dig area in the event that he/she wishes to discuss any details of the planned excavation with locate personnel 134, in order to avoid any misunderstanding and/or miscommunications about the locate operation and, thereby, reduce the risk of damage to underground facilities during excavation.

At step 718, the locate technician that was dispatched in step 714 arrives at dig area.

At step 720, the originating excavator 114 may be notified by informed excavator application 258, which is monitoring the status of the locate request, that the locate technician has arrived at the dig area. For example, notification component 516 may generate a "Locate technician on site at dig area" notification, which may be received by the excavator 114 by the notification method selected in his/her excavator profile. Again, receiving this notification allows the excavator 114 the opportunity to proceed to the dig area in the event that the excavator 114 wishes to discuss any details of the planned excavation with the locate personnel.

At step 722, the locate technician performs the locate operation at the dig area according to the instructions of the locate request to which he/she has been assigned. As noted earlier, it should be appreciated that during a given locate operation, underground facilities may or may not be found at the dig area, but that given either a presence or absence of facilities, the performance of the locate operation, including an inspection of the dig area, may be verified as completed by the locate technician.

In particular, at step 724, the locate technician completes the locate operation and the ticket status is updated accordingly. For example, a "ticket marked" status may be communicated by workforce management client of onsite computer/locate personnel device to workforce management application 254.

At step 726, the excavator 114 may be notified by informed excavator application 258, which is monitoring the status of the locate request, that the ticket is marked, which means that the locate operation has been completed by the locate technician, but may be pending approval. More specifically, notification component 516 may generate a "Ticket marked (but pending approval)" notification. This notification may be received by the excavator 114 by the notification method selected in his/her excavator profile.

At decision step 728, it is determined whether the ticket of the current locate operation is to be subjected to a quality control process. If yes, method 700 may proceed to step 730. If no, method 700 may proceed to step 732.

At step 730, the ticket of the current locate operation is processed by ticket approval application 256. If the ticket passes the quality control process satisfactorily, method 700 may proceed directly to step 732 with no further action. If the ticket does not pass the quality control process satisfactorily, quality control action is taken until the ticket passes the quality control process satisfactorily, method 700 may then proceed to step 732.

At step 732, the ticket of the current locate operation is classified as ticket approved. In this way, the quality of the locate operation is certified.

At step 734, the originating excavator 114 may be notified by informed excavator application 258, which is monitoring the status of the locate request, that the ticket is approved. For example, notification component 516 may generate a "Ticket approved" notification, which may be received by the excavator 114 by the notification method selected in his/her excavator profile. Receiving this notification allows the excavator 114 the opportunity to proceed to the dig area to perform the planned excavation with little or no delay from the date and time at which the locate operation was completed.

At step 736, the originating excavator 114 may receive the original VWL image plus other information about the locate operation. More specifically, when "Locate information" is selected in the excavator profile, detailed information about the locate operation of a certain ticket (e.g., one or both of image data and non-image data, some examples of which were discussed above) may be transmitted by informed excavator application 258 to the originating excavator 114. For example, the excavator 114 may receive (1) the original VWL image and/or series of VWL images; (2) an electronic copy of the completed ticket (including image and/or non-image data); (3) the corresponding EM image that was generated via EM application 246 and that shows details of the locate operation (including "clears" in which an image is not necessarily marked-up with locate mark indicators, but other important non-image data is associated with the EM image), including an EM image that may also show the original virtual white lines; (4) the corresponding electronic representation of the locate operation (e.g., non-image data or information without a marked-up image component); (5) an assessment of the risk of excavation in the dig area (e.g., a descriptive or numeric risk assigned based on such factors as whether there is a buried line, a high pressure gas line, or other high risk condition within or near the dig area); and (6) any combinations thereof.

At step 738, having detailed knowledge of the locate operation from the information provided in step 736, the excavator 114 may perform the planned excavation of the dig area with increased confidence, which has the result of reducing the risk of damage to underground facilities during excavation.

Referring again to FIGS. 1 through 7, informed excavator system 200 and the associated methods 600 and 700 of the present disclosure are not limited to providing status notifications and/or information about locate operations to personnel (e.g., excavators 114) of excavation companies only. Status notifications and/or information about locate operations may be provided to any entity associated with locate operations, such as, but not limited to, those included in informed excavator system 200.

Referring again to FIG. 2, the functionality of the informed excavator application 258 may be combined with the functionality of VWL application 232 or 234 so that a single interface can be used not only to manage the communication of status notifications and/or information about locate operations, but also to submit one or more VWL images and/or locate requests, as described herein. More particularly, an excavator may use a single interface to manage the communication of status notifications and/or information about locate operations and submit VWL images and/or locate requests, and efficiently perform these tasks during a single login session or the like.

Figure 8:
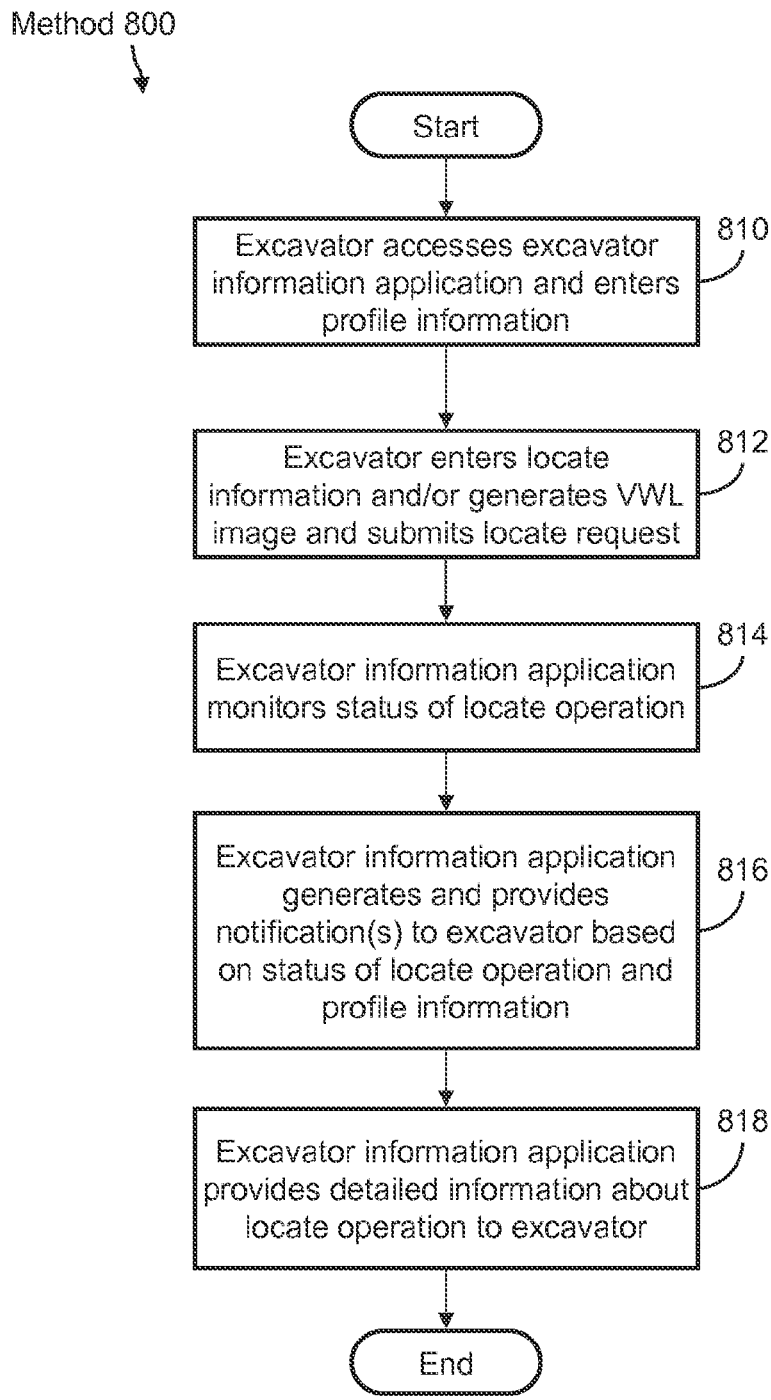
FIG. 8 illustrates a flow diagram of an exemplary method of providing information regarding the status of locate operations and generating a virtual white lines image as part of a locate request submission, according to one embodiment of the present invention.

FIG. 8 shows an exemplary method 800 of using an excavator information application that combines the functionality of the informed excavator application 258 and VWL application 232 or 234. The excavator information application may be stored on central server 222 as discussed in connection with the informed excavator application 258, on excavator devices 212 as discussed in connection with VWL application 232, on a computing system associated with one-call center 120 as discussed in connection with VWL application 234, or some other suitable location(s). Method 800 may include, but is not limited to, the following steps, which need not be performed in the order shown.

At step 810, an excavator accesses the excavator information application and enters profile information. This step is analogous to step 610 of FIG. 6A and may involve the same actions described in connection therewith. An exemplary GUI for facilitating entry of relevant information also was discussed above in connection with FIG. 6B.

At step 812, the excavator enters locate information and/or generates a VWL image. The excavator information application may include the functionality of VWL application 232 or 234, such that the locate information may be entered and the VWL image may be generated in the manner described in connection with those applications. For example, a VWL image 238 may be created using the VWL application 232 shown in FIG. 3. Locate information, such as information specifying a dig area, may be input by an excavator using a marking tool such as the dig area marking tool of VWL application 232, a form with data fields, or another means of data input. The locate information and/or VWL image may be submitted to a one-call center as part of a locate request. For example, the excavator may submit a locate request without a VWL image. If a VWL image is required, the one-call center may use the information in the locate request submitted by the excavator to generate a VWL image. Alternatively, the excavator may submit the locate information and/or VWL image to a one-call center pursuant to an already submitted locate request, or in advance of a locate request not yet submitted.

Steps 814, 816 and 818 may proceed as discussed in connection with analogous steps 612, 614 and 616 of FIG. 6A. In particular, the excavator information application may monitor the status of a locate operation, generate and provides notification(s) to an excavator based on the status of the locate operation and profile information entered in step 810, and optionally provide detailed information about the locate operation to the excavator in the same manner as the informed excavator application 258 discussed herein.

"Enhanced" Positive Response Notifications

In yet other embodiments, according to the methods, apparatus and systems described herein an enhanced positive response notification (also referred to as an "enhanced positive response" or a "locate report") may be generated to inform one or more parties of locate and/or marking operation status. In exemplary implementations, an enhanced positive response may be an electronic communication, alert or document that may include (or have a link/pointer to) textual information and/or graphical information, including image information, relating to performance of a locate and/or marking operation.

In one example, an enhanced positive response may include one or both of time-stamp information to provide proof of a time at which the locate and/or marking operation was completed by a locate technician, and place-stamp information to provide proof of a presence of the locate technician sufficiently proximate to or at a geographic location specified on the locate request ticket (and corresponding to the dig area). In another example, the enhanced positive response may include an electronic manifest (EM) image that itself includes such a time-stamp and/or place-stamp to provide comprehensive feedback regarding performance of the locate and/or marking operation. Examples of other information that may be included in such an enhanced positive response (and in some cases as part of an EM image) include, but are not limited to, a signature and/or a user identification that identifies the locate technician, one or more member codes for facility owners who may have facilities in or proximate to the dig area, one or more positive response codes representing a status of the locate and/or marking operation, and various textual information.

In another embodiment, an enhanced positive response may include a virtual white line (VWL) image, in addition to the EM image, that includes one or more dig area indicators to indicate the dig area on an image; alternatively, the EM image itself may include one or more such dig area indicators. As discussed above, one or both of an EM image and a VWL image constituting an enhanced positive response may include geo-referenced information (e.g., GPS coordinates) in connection with dig area indicators, environmental landmarks present in and around the work site/dig area, and/or the locate and/or marking operation performed by the technician.

In another embodiment relating to an enhanced positive response, various environmental information may be provided in such a response regarding one or more environmental conditions present at or near the dig area/work site during a locate and/or marking operation. Examples of environmental conditions about which environmental information may be provided include, but are not limited to, an ambient temperature, and ambient humidity, and an ambient light level. Various environmental sensors may be employed, alone or together with exemplary locate and/or marking devices discussed herein, to acquire such environmental information. Digital photographs and/or digital audio files also may be acquired at or near the dig area/work site and included in an enhanced positive response to provide additional information.

In yet another embodiment relating to an enhanced positive response, according to the methods, apparatus and systems described herein an enhanced positive response may be generated in which an electronic manifest (EM) image and a virtual white line (VWL) image associated with the locate and/or marking operation are bundled together based on respective descriptor files (or descriptor metadata) for the EM image and the VWL image. In one aspect, the descriptor files or descriptor metadata associate the corresponding images with one or more particular tickets in response to which the locate and/or marking operation is performed, so as to link the images and relevant information in the locate request ticket. In this manner, a comprehensive enhanced positive response may be generated so as to inform one or more parties of a completed status of the locate and/or marking operation. As noted above, in addition to the EM image and the VWL image, a variety of other information also may be included in an enhanced positive response resulting from bundling of images based on descriptor files/descriptor metadata.

Figure 9:
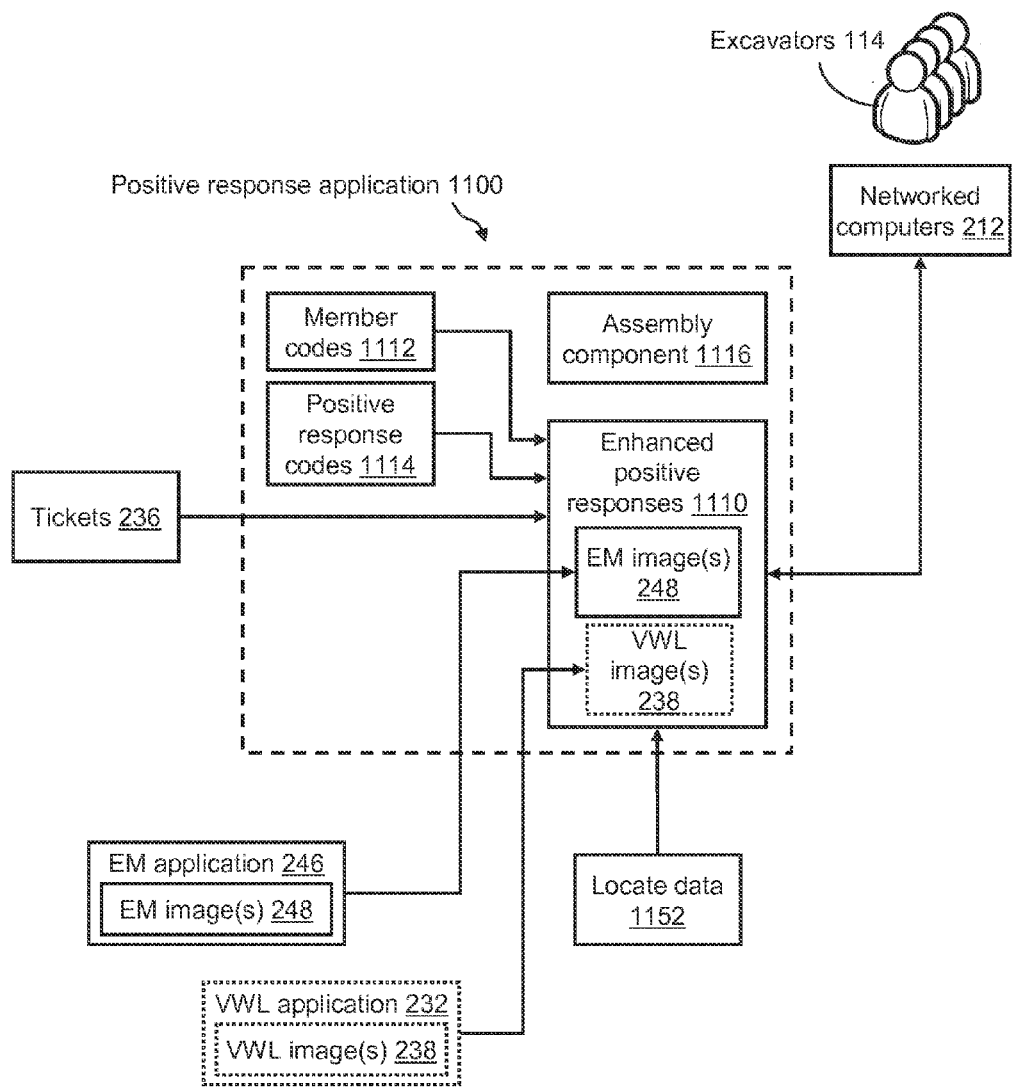
FIG. 9 is a block diagram of a positive response application for processing enhanced positive responses for underground facility locate and/or marking operations, according to another embodiment of the present invention.

FIG. 9 is a functional block diagram of an exemplary positive response application 1100 for generating one or more enhanced positive responses 1110, according to one embodiment of the present invention. In various aspects, the positive response application 1100 may be implemented by one or more processing units executing processor-executable instructions, and may share one or more features similar to those described above in connection with the informed excavator application 258 for providing positive response notifications to various parties. With reference again to FIG. 2, it should be appreciated that the positive response application 1100 shown in FIG. 9 and described in greater detail below, and/or other applications implementing similar functionality, may reside in memory and/or execute on one or more of a one-call center 120, a central server 222, an onsite computer 220, an excavator device 212 or a locate personnel device 218. Furthermore, it should be appreciated that in some exemplary implementations, at least some or all of the functionality provided by the positive response application 1100 may be realized in a distributed fashion, e.g., one portion of the positive response application may reside and/or execute at the one-call center 120, another portion may reside and/or execute at the central server 222, another portion may reside and/or execute at the onsite computer 220, etc.

As shown in FIG. 9, member codes 1112 and positive response codes 1114 may provide sources of information to the positive response application 1100 and may constitute some of the content in an enhanced positive response 1110 generated by the application 1100. Member codes 1112 may be unique identification codes that are assigned to facility owners by a certain controlling entity with respect to underground facility locate operations (Sunshine State One Call of Florida, Inc.—SSOCOF—is one example of a such a controlling entity). By way of example, a sample of member codes 112 of the SSOCOF is shown in Table 1 below.

TABLE 1

Example member codes 1112 of, for example, the SSOCOF

| Member Code | Facility Owner |
|---|---|
| ATT | AT&T |
| FPL | Florida Power & Light |
| COM | Comcast |
| ADEL | Adelphia |
| TWC | Time Warner Cable |

TABLE 1-continued

Example member codes 1112 of, for example, the SSOCOF

| Member Code | Facility Owner |
| --- | --- |
| VZ | Verizon |
| PGS | TECO Peoples Gas |

Positive response codes 1114 may be unique codes that have particular meaning with respect to locate and/or marking operations. The unique positive response codes may be determined by a certain controlling entity with respect to underground facility locate operations (again, SSOCOF is one example of a such a controlling entity). By way of example, a sample of positive response codes 1114 of the SSOCOF and their meanings are shown in Table 2 below.

TABLE 2

Example positive response codes 1114 of, for example, the SSOCOF

| Positive Response Code | Positive Response Code Meaning |
| --- | --- |
| 1 Marked | A locate technician has been to your excavation site and marked the approximate horizontal location of underground facilities within the boundaries described on the ticket. |
| 2A Marked with Exceptions | High profile utility in conflict. An underground facility that delivers services to a large number of people or that could cause major problems if hit is within your excavation site (i.e., fiber optic line, gas line, etc.). While the locate technician has marked the approximate horizontal location of the facility, the utility or its locate technician want to be present during any excavation near that facility. |
| 2B Marked with Exceptions | A utility or its locate technician has located and marked its underground facility, but other facilities of that same type are in the area and were not marked because the utility claims no responsibility for locating them. |
| 3A Unmarked | Locate technician could not gain access to property; call utility to schedule access. |
| 3B Unmarked | Excavation site is unmarked because the address could not be found. |
| 3C Unmarked | Excavation site is unmarked. The locate technician and excavator negotiated an alternate time to meet at the excavation site. |
| 3D Unmarked | Excavation site is unmarked. An underground facility that delivers services to a large number of people or that could cause major problems if hit is located near your excavation site (i.e., fiber optic, gas or electric line, etc.). The utility or locate technician want to be present during any excavation near that facility and will mark as necessary. |
| 3F Unmarked | Excavation site is unmarked. The locate technician cannot mark within two full business days. The excavator was contacted and a new deadline was scheduled. |
| 3H Unmarked | A locate technician went to the excavation site and found none of the facility owner's lines there; however, there are lines of a similar facility located in that area which are considered privately owned. |
| 3M Unmarked | Excavation site is unmarked. The marking instructions on the locate ticket are not clear. The description may not make sense or the description may not match what the locate technician sees at the excavation site. Contact the utility to provide clarification. |
| 3N Unmarked | Excavation site is unmarked. Based on the written description on the ticket, the locate technician could not determine the exact area that needed locating. |
| 3P Unmarked | Excavation site is unmarked. A utility does not have accurate information about the location of those underground facilities. The utility is required, however, to give the excavator the best available information. |
| 3R Unmarked | Excavation site is unmarked. A locate technician went to the excavation site, but the excavation work had already been completed. |
| 3T Unmarked | Excavation site is unmarked. The utility has declared extraordinary circumstances through SSOCOF that render them unable to respond to your locate request. Extraordinary circumstances indicate situations other than normal operating conditions such as a natural or manmade disaster. |
| 3U Unmarked | Excavation site is unmarked. Another company provides the services at this location. |
| 3W Unmarked | Work is being performed by the utility and the excavator will mark the underground lines per agreement. |
| 4 Clear | The utility has no underground facilities at the specified excavation site. |
| 5 No conflict | The utility has a facility near the excavation site, but it is not within the area that was either described on the ticket or white lined. |
| 6a Active facilities are present | The member has active facilities within the area described by the noticed demolition. Do not demolish until the member notifies you the site is clear. |

TABLE 2-continued

Example positive response codes 1114 of, for example, the SSOCOF

| Positive Response Code | Positive Response Code Meaning |
| --- | --- |
| 8 Ongoing job | The locate technician and excavator have established an agreement on scheduled marking. |

As also shown in FIG. 9, locate request tickets 236 also may be an input to positive response application 1100 and provide another source of information which may be used at least in part to generate enhanced positive responses 1110. As discussed above, tickets 236 may include textual ticket information (e.g., a ticket and/or work order number, ticket submission date, requested completion date, geographic location information or address information, excavation information, excavator information, site information, locate operations instructions information, caller information, remarks information, task information), any portion or all of which may be included in an enhanced positive response 1110.

An EM application 246 may provide yet another input to positive response application 1100 as shown in FIG. 9. For example, the EM application 246 generates one or more electronic manifest (EM) images 248 that may themselves be included as part of the contents of an enhanced positive response 1110. As discussed above in connection with FIG. 4, EM application 246 is a computer software application that, when executed, provides an electronic drawing tool that may be used by locate technicians for electronically marking up, for example, a digital aerial image of the dig area for indicating locate marks that have been dispensed at the site, thereby indicating the geo-locations and types of facilities present. The marked-up digital images may be saved as, for example, EM images 248, which may be associated with tickets 236 and may be used by locate companies to support proof of work compliance.

Figure 10:
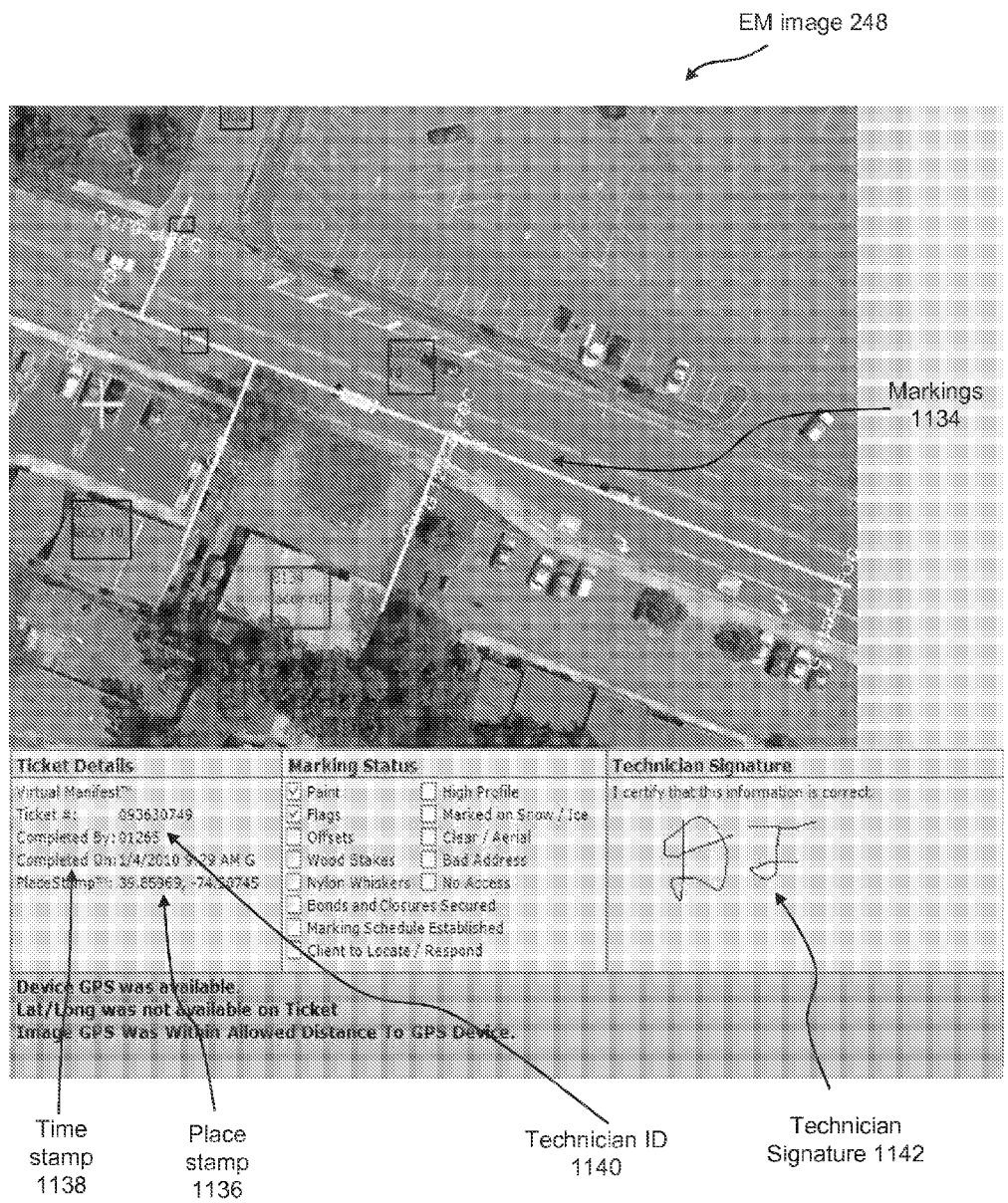
FIG. 10 illustrates an exemplary electronic manifest (EM) image including a time-stamp, a place-stamp, and a technician signature/ID, that may be used in an enhanced positive response according to one embodiment of the present invention.

FIG. 10 provides an example of an EM image 248 that may be generated by an EM application 246 and employed, all or in part, in an enhanced positive response 1110 according to one embodiment of the present invention. As illustrated in FIG. 10, an aerial image of a work site/dig area of interest may provide a basis upon which markings 1134 are made to indicate the geographic locations of one or more underground facilities detected and/or marked during a locate and/or marking operation. The EM image 248 also may include various textual information relating to ticket details, marking status, and the technician performing the locate and/or marking information. For example, FIG. 10 shows that the EM image 248 may include a time-stamp 1138 indicating the date and time that an operation was completed (and/or the EM image created), a place-stamp 1136 indicating geographic coordinates corresponding to where the operation was completed (and/or the EM image was created), a technician ID 1140, and a technician signature 1142. Again, any or all information contained in the EM image 248 shown in FIG. 10 may be included in an enhanced positive response 1110, including some or all of the textual information without the image portion of the information (or vice versa).

With respect to the place-stamp 1136 shown in FIG. 10, in one aspect as noted above the place-stamp provides proof of a presence of the locate technician sufficiently proximate to, or at, a geographic location specified on the locate request ticket and corresponding to the work site/dig area. Accordingly, the place-stamp helps to mitigate potential damage to an underground facility that could occur in instances in which the locate technician did not go to the work site/dig area indicated on the ticket and did not perform a locate and/or marking operation at that site (e.g., because the locate technician unintentionally performed the locate operation at the wrong address or location; because the locate technician chose not to perform the locate operation believing that there are no underground facilities at the site, perhaps based on past experiences at the site; etc.).

In view of the foregoing, in some embodiments the EM application 246 employed to generate the EM image 248 shown in FIG. 10 may be configured to analyze and compare various geographic information so as to provide the place-stamp 1136 with sufficient accuracy. Examples of geographic information that may be analyzed by the EM application to facilitate generation of the place-stamp 1136 includes, but is not limited to, geographic location data (e.g. GPS coordinates) corresponding to: 1) address information or other location information, if available, about the work site/dig area derived from or specified on a locate request ticket; 2) a locate technician's whereabouts, based on use of locate device 214 and/or marking device 216, a locate personnel device 218, onsite computer 220, or other tracking device on the person of the locate technician; and/or 3) one or more points on a digital image serving as a basis for the EM image 248 (e.g., a centroid of the digital image). In exemplary implementations, the place-stamp 1136 generally corresponds to the locate technician's whereabouts when actually performing the locate and/or marking operation, or when using the EM application to enter in various information to facilitate generation of the EM image 248.

To ensure that the place-stamp 1136 provides reasonable proof that the locate technician was sufficiently proximate to or at the work site/dig area, in one embodiment the EM application 246 may determine whether two or more of the geographic locations indicated above (i.e., work site/dig area specified on ticket, technician whereabouts, and image coordinates) are within some predetermined distance (i.e., a "threshold distance") of each other. A variety of values for the threshold distance may be used as a metric for sufficient proximity to the work site/dig area; in some cases these metrics may be based at least in part on recommended best practices for a particular jurisdiction, operating procedures for a given locate company/contractor, and/or contractual obligations imposed by one or more facility owners and/or one-call centers. In one exemplary implementation, the threshold distance for sufficient proximity may be on the order of tens of feet, while in other implementations the threshold distance may be greater depending on various circumstances (e.g., hundreds or thousands of feet).

Additional details relating to the place-stamp 1136 and a quality assessment analysis regarding same are discussed in U.S. application publication US2009-0327024-A1, entitled "Methods and Apparatus for Quality Assessment of a Field Service Operation," published Dec. 31, 2009, which publication is hereby incorporated herein by reference.

With reference again to FIG. 9, a VWL application 232, as discussed above in connection with FIG. 3, may provide yet another input to positive response application 1100 in the form of one or more VWL images 238 that may be included as part of the contents of enhanced positive responses 1110. Similarly, locate data 1152 may provide another input to positive response application 1100. Locate data 1152 may include various information provided by marking devices 216 or locate devices 214, and also may include data from, but not limited to, one or more of the following sources: environmental sensors that are onsite of the locate operation, which may provide information about the environmental conditions; digital photographs that are taken onsite; and digital audio files that are recorded onsite. With respect to environmental information regarding one or more environmental conditions, advanced knowledge of environmental conditions at a work site may play a role in the excavator's planning process. For example, if the excavator is aware that the work site/dig area was marked while it was raining, the excavator may make special effort to perform the excavation before the markings wash away. Additionally, digital photographs and/or digital audio files that capture information about the work site may be useful to locate companies with respect to providing proof of presence and proof of the work performed.

In FIG. 9, an assembly component 1116 of positive response application 1100 is a software component configured to facilitate collecting and assembling information including or derived from member codes 1112, positive response codes 1114, tickets 236, EM images 248 and/or VWL images 238 into enhanced positive responses 1110. In one example, assembly component 116 queries and/or processes descriptor files and/or descriptor metadata, respectively associated with EM images 248 and VWL images 238, which descriptor files/metadata reference the corresponding images to a particular locate request ticket 236. By querying/processing the descriptor files/metadata, assembly component 1116 can effectively assemble an appropriate EM image 248 and VWL image 238 corresponding to the locate request ticket and resulting locate and/or marking operation in question. In some instances, the assembly component 1116 further combines image files with other information such as corresponding member codes 1112, positive response codes 1114, and/or information from ticket 236. Assembly component 1116 then bundles all image files and information in order to generate enhanced positive responses 1110.

Figure 11A:
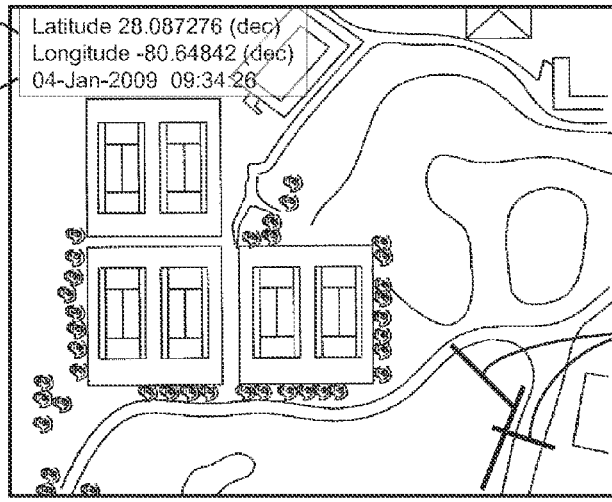
FIG. 11A illustrates an example of an enhanced positive response, according to one embodiment of the present invention.
Figure 11A:
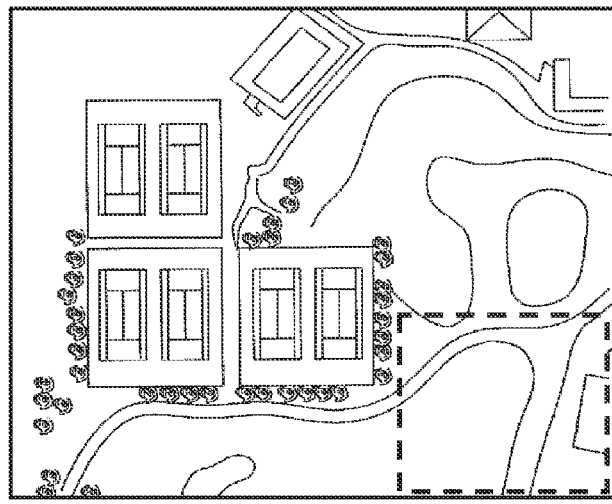

FIG. 11A is a front view of an example of an enhanced positive response 1110 according to one embodiment of the present invention. In this example, enhanced positive response 1110 may include textual information 1118, which in turn may include any information contained in or derived from ticket 236 (e.g., the ticket number, date information, geographic location information or address information, excavation information, excavator information, site information, locate operations instructions information, caller information, remarks information, task information, etc.). Further, textual information 1118 may includes a status code 1120, which may be standard status code information that is formed by the combination of member codes 1112 and positive response codes 1114 for each facility type.

In one example and referring to Tables 1 and 2, status code 1120 is "VZ-1 Marked; TWC-5 No conflict; FPL-4 Clear." In this example, "VZ-1 Marked" means that with respect to facilities owned by Verizon—a locate technician has been to your excavation site and marked the approximate horizontal location of underground facilities within the boundaries described on the ticket. "TWC-5 No conflict" means that with respect to facilities owned by Time Warner Cable—the utility has a facility near the excavation site, but it is not within the area that was either described on the ticket or white lined. "FPL-4 Clear" means that with respect to facilities owned by Florida Power & Light—the utility has no underground facilities at the specified excavation site.

The enhanced positive response 1110 shown in FIG. 11A also includes an EM image 248 and a VWL image 238. In one example, the EM image 248 and VWL image 238 are digital geo-referenced aerial images that correspond to the address information in textual information 1118 (e.g., 1333 Gateway Dr, Melbourne, Fla. 32901). With respect to EM image 248, the digital image has been marked up electronically using EM application 246 to show markings 1134 of a certain color that indicate the location and type of facilities present at the work site/dig area. Further, in one exemplary implementation as discussed above in connection with FIG. 10, when creating the EM image 248 using EM application 246, EM application 246 automatically superimposes a place-stamp 1136 and a time-stamp 1138 upon the saved EM image 248. Place-stamp 1136 may include, for example, the latitude and longitude coordinates of the actual geographic location at which the locate operation is performed (which may be acquired from the geo-referenced input image used as a basis for EM image 248). In one example, time-stamp 1138 may be the date and time that EM image 248 is created. In another example, time-stamp 1138 may be the date and time that the certain enhanced positive response is saved. In yet another example, time-stamp 1138 may be the date and time that the certain enhanced positive response is transmitted to an interested party. By use of place-stamp 1136 and time-stamp 1138, proof of presence at the work site and proof of the time the work is performed is automatically provided in enhanced positive response 1110.

With respect to the optional VWL image 238, the digital image has been marked up electronically using VWL application 232 to show a dig area indicator 260 that indicates the extent of the dig area in which locate operations are performed. Additionally, enhanced positive response 1110 shown in FIG. 11A may include other information 1170, which may be information extracted from locate data 152. In one example, other information 1170 may include the environmental conditions at the job site, such as the ambient temperature, ambient humidity, and/or ambient lighting conditions.

Figure 11B:
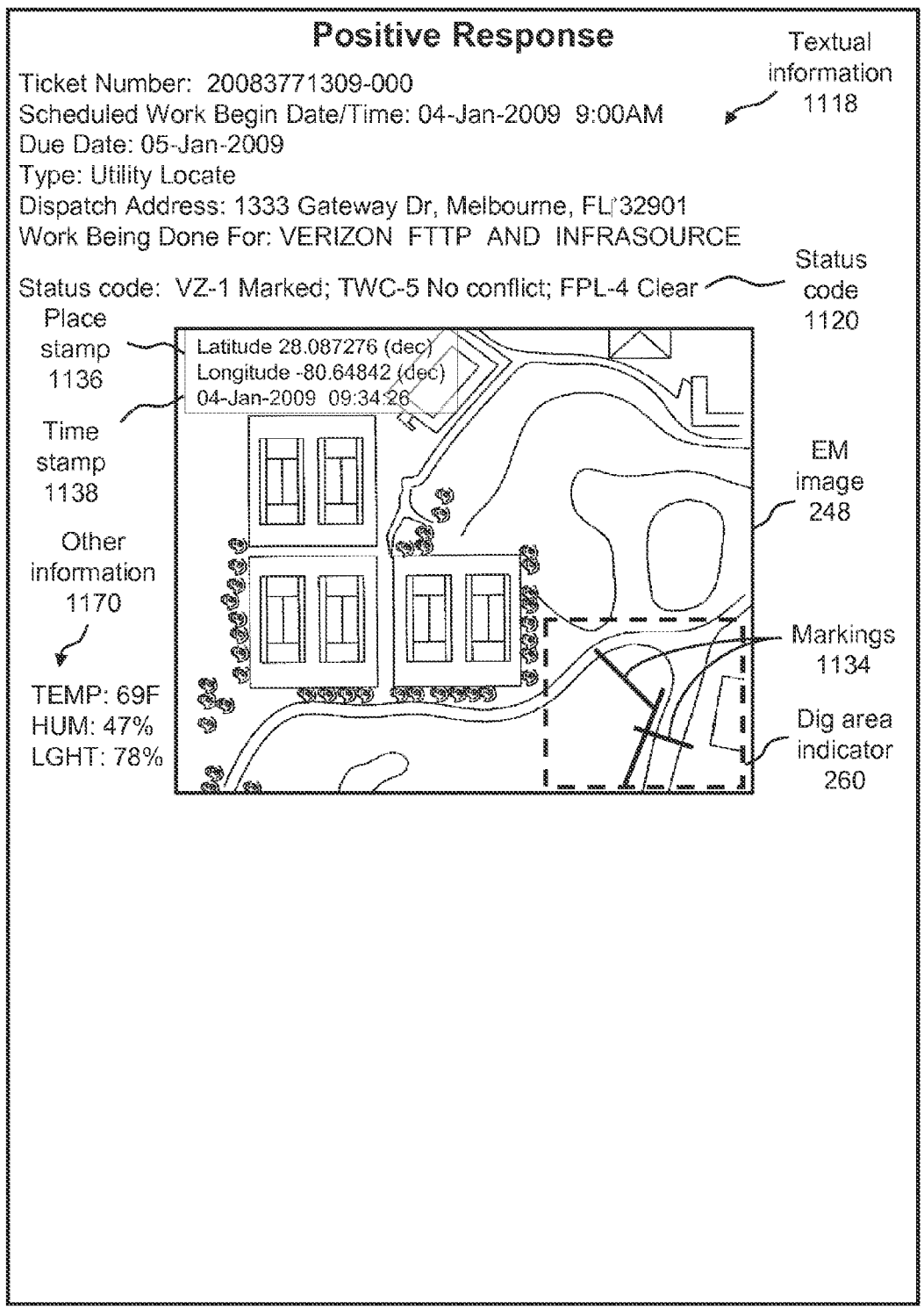
FIG. 11B illustrates another example of an enhanced positive response, according to another embodiment of the present invention.

FIG. 11B provides another example of an enhanced positive response 1110 according to one embodiment of the present invention. In this example, enhanced positive response 1110 includes EM image 248 only, with no VWL image 238. However, in one aspect of this embodiment, the dig area indicator 260, which is geo-encoded in the VWL image, is overlaid on the markings 1134 of the EM image 248.

With reference again to FIG. 9, an additional feature of positive response application 1100 according to one embodiment of the present invention relates to a "time-of-life" limitation, or expiration period, for EM images 248. As would be appreciated by those of skill in the art, in certain jurisdictions physical locate marks applied to the ground or surface during a marking operation may be valid only for a limited amount of time (e.g., two days, two weeks, etc.), after which the marks are considered to be expired—and if excavation does not occur within this designated periods, a re-marking request may be required. Accordingly, in one embodiment, a similar type of expiration period may be ascribed to an EM image 248, i.e., the EM image 248 may be valid only for a limited time period following the locate and/or marking operation (or the creation of the EM image). In one example, the EM image includes an expiration code, or "time-bomb code," that allows viewing of the EM image only for a predetermined time period (a "time-bomb code" refers to a computer program that is written so that it will stop functioning after a predetermined date or time is reached). Alternatively, when past the time period, EM images may be viewable, but a disclaimer may be displayed with the EM images that the information depicted thereon is expired/no longer valid.

Figure 7:
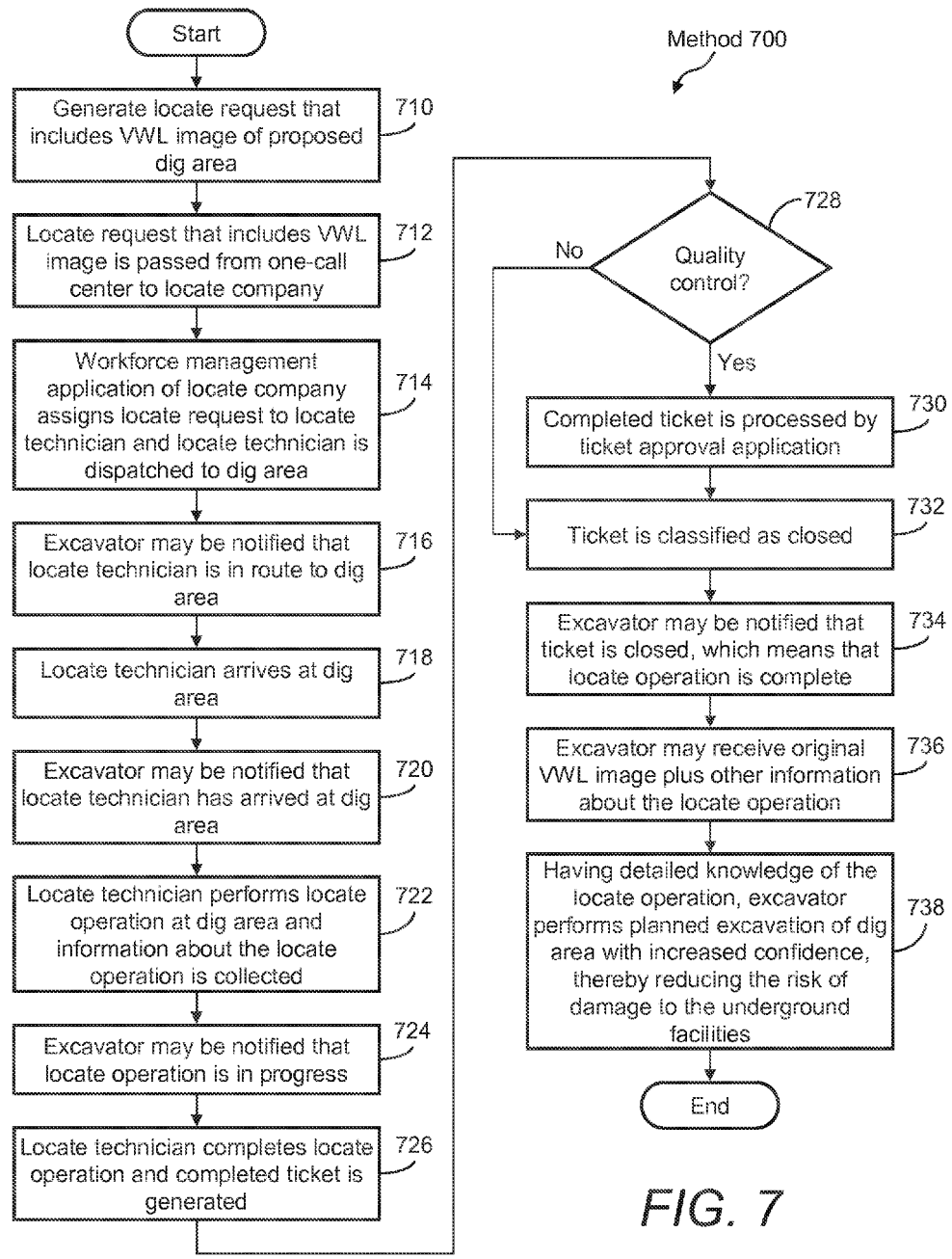
FIG. 7 illustrates a flow diagram of an exemplary method of generating locate request tickets and performing locate operations in response to such tickets, which method employs aspects of the method illustrated in FIG. 6A for providing information regarding the status of locate operations, according to one embodiment of the present invention.

In yet another aspect, as discussed in part above in connection with FIG. 7, an enhanced positive response 1110 may be generated and transmitted before or after completion of a quality assurance process to assess the accuracy/completeness of a locate and/or marking operation. In instances in which an enhanced positive response is generated prior to a quality assurance process, an enhanced positive response 1110 may include a flag, such as a "Work complete, but pending approval" flag. The latter may be useful in certain time-sensitive instances in which it may be detrimental to delay an enhanced positive response 1110 until the quality assurance process is complete.

Enhanced positive responses 1110, such as those shown in FIGS. 11A and 11B, may be saved in an electronic form that is easily transmitted using standard network computing systems. In one example, enhanced positive responses 1110 may be provided in the form of an electronic document (e.g., a Microsoft® Word document) that includes textual information 1118, EM image 248, and, optionally, VWL image 238. In another example, enhanced positive response 1110 may be provided in the form of an email; for example, textual information 1118 may be provided in the body of the email and EM image 248, and optionally VWL image 238, may be provided as attachments to the email. In yet another example, a website address may be provided by email to an interested party, and the contents of the enhanced positive response may be available via the website address (e.g., by clicking on the link to the website as contained in the email).

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Figure 12:
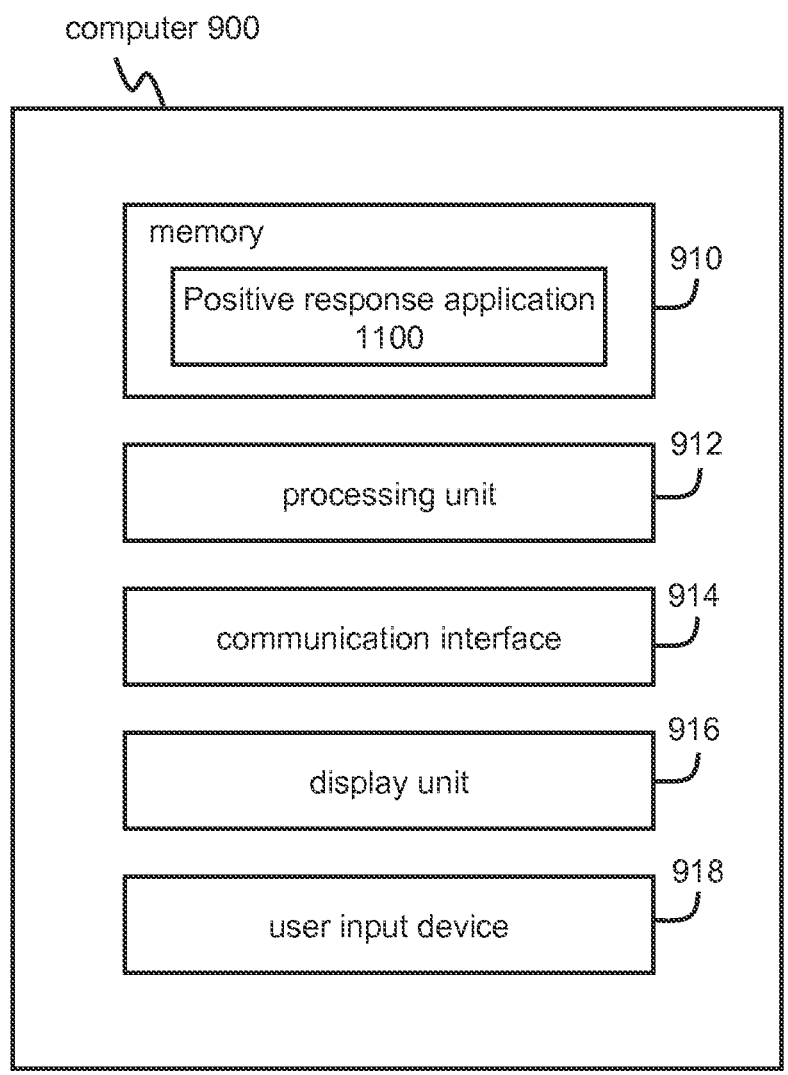
FIG. 12 illustrates an exemplary computing device (e.g., a computer) that is configured to execute various applications, according to embodiments of the present invention.

FIG. 12 shows an illustrative computing device, e.g., computer 900, that may be used at least in part to implement any one or more of the applications described herein. In the example shown, the illustrative computer 900 is used to implement the positive response application 1100 described in connection with FIG. 9; however, it should be appreciated that the computer 900 may be employed to implement any of the applications discussed herein (e.g., the informed excavator application 258, the excavator information application discussed in connection with FIG. 8, VWL application 232, EM application 246, workforce management application 254, ticket approval application 256, etc.). The computer 900 comprises a memory 910, one or more processing units 912, one or more communication interfaces 914, one or more display units 916, and one or more user input devices 918. The memory 910 may comprise any computer-readable media, and may store computer instructions for implementing the excavator information application 902. The processing unit(s) 912 may be used to execute the instructions. The communication interface(s) 914 may be coupled to a wired or wireless network, bus, or other communication means and may therefore allow the computer 900 to transmit communications to and/or receive communications from other devices. The display unit(s) 916 may be provided, for example, to allow a user to view various information in connection with execution of the instructions. The user input device(s) 918 may be provided, for example, to allow the user to make manual adjustments, make selections, enter data or various other information, and/or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the United States Patent Office Manual of Patent Examining Procedures, Section 2111.03.

What is claimed is:

1. An apparatus for integrating multiple elements of information relating to a locate and marking operation so as to provide an enhanced positive response to at least one first entity associated with requesting the locate and marking operation, the locate and marking operation performed by a locate technician in response to at least one locate request ticket and comprising applying, by the locate technician, at least one physical locate mark on ground, pavement, or other surface to indicate a presence or an absence of at least one underground facility within a dig area, wherein at least a portion of the dig area is planned to be excavated or disturbed by an excavator during excavation activities, the apparatus comprising:

a communication interface;

a memory to store processor-executable instructions; and at least one processor communicatively coupled to the communication interface and the memory, wherein upon execution of the processor-executable instructions by the at least one processor, the at least one processor:

A) generates the at least one locate request ticket, the at least one locate request ticket comprising at least one digital image of a geographic area proximate to and including the dig area and at least one of:

at least one electronic dig area indicator to delimit the dig area on the at least one digital image; and geographic coordinates for the at least one electronic dig area indicator;

B) controls the communication interface to electronically transmit the at least one locate request ticket to at least one second entity associated with performing the locate and marking operation;

C) controls the communication interface to electronically receive from the at least one second entity associated with performing the locate and marking operation, in response to the at least one locate request ticket, at least one of:

the enhanced positive response for the locate and marking operation; and an electronic link to the enhanced positive response, wherein the enhanced positive response includes at least one of:

an electronic manifest of the locate and marking operation, the electronic manifest including the at least one digital image, the at least one electronic dig area indicator on the at least one digital image, and at least one electronic marking electronically drawn on the at least one digital image by the locate technician via an onsite computer and/or locate personnel device and corresponding to the at least one physical locate mark applied by the locate technician to the ground, pavement, or other surface during the locate and marking operation, so as to graphically depict the locate and marking operation performed by the locate technician; and geographic coordinates for the at least one electronic dig area indicator and the at least one electronic marking corresponding to the at least one physical locate mark applied by the locate technician to the ground, pavement, or other surface; and D) controls the communication interface to electronically transmit to the at least one first entity associated with requesting the locate and marking operation at least one of:

the enhanced positive response for the locate and marking operation; and the electronic link to the enhanced positive response, so as to reduce uncertainty relating to a completeness and/or a quality of performance of the locate and marking operation and reduce a risk of damage to underground facilities during the excavation activities.

2. A one-call center locate request management system, comprising the apparatus of claim 1.

3. The apparatus of claim 1, wherein the at least one first entity associated with requesting the locate and marking operation includes the excavator.

4. The apparatus of claim 1, wherein:

prior to D), the at least one processor processes at least one of the at least one locate request ticket and the enhanced positive response to:

generate a descriptive and/or numeric risk assessment associated with the excavation activities in the dig area; and integrate the descriptive and/or numeric risk assessment with the enhanced positive response.

5. The apparatus of claim 4, wherein the at least one processor generates the descriptive and/or numeric risk assessment based on at least one of a buried line, a high pressure gas line, and a high risk condition within or near the dig area.

6. A one-call center locate request management system, comprising the apparatus of claim 4.

7. The apparatus of claim 1, wherein the electronic manifest is formatted as a limited access file to prevent unauthorized use of the electronic manifest included in the enhanced positive response.

8. The apparatus of claim 1, wherein the enhanced positive response further includes at least one of:

a user identification identifying the locate technician;

status information regarding a status of the locate technician;

a description of a history of the locate technician at the dig area;

at least one member code assigned to a facility owner of the at least one underground facility;

at least one positive response code representing a status of the locate and marking operation;

the at least one locate request ticket;

a completed locate request ticket;

time-stamp information to provide proof of a time at which the locate and marking operation is performed by the locate technician;

place-stamp information to provide proof of a presence of the locate technician sufficiently proximate to or at a geographic location specified on the at least one locate request ticket and corresponding to the dig area;

environmental information regarding at least one environmental condition present at or near the dig area during the locate and marking operation;

at least one of a digital photograph, a digital video, and a digital audio file representing proof of presence and work performed at the dig area;

at least one virtual white line image comprising a second digital image of the geographic area proximate to and including the dig area, and the at least one electronic dig area indicator to delimit the dig area on the second digital image;

at least one facilities map corresponding to the geographic location specified on the at least one locate request ticket and/or the dig area a quality assessment of the locate and marking operation as at least partially performed by the locate technician; and a descriptive and/or numeric assessment of a risk of excavation in the dig area based at least in part on a risk condition within or near the dig area.

9. The apparatus of claim 1, wherein the electronic link to the enhanced positive response provides access to a menu of notification preferences to facilitate selection of contents for the enhanced positive response.

10. The apparatus of claim 9, wherein the menu of notification preferences to facilitate selection of the contents for the enhanced positive response includes a checklist for:
at least one of:
the electronic manifest of the locate and marking operation; and
the geographic coordinates for the at least one dig area indicator and the at least one electronic marking corresponding to the at least one physical locate mark applied by the locate technician to the ground, pavement or other surface; and
at least one of:
a user identification identifying the locate technician;
status information regarding a status of the locate technician;
a description of a history of the locate technician at the dig area;
at least one member code assigned to a facility owner of the at least one underground facility;
at least one positive response code representing a status of the locate and marking operation;
the at least one locate request ticket;
a completed locate request ticket;
time-stamp information to provide proof of a time at which the locate and marking operation is performed by the locate technician;
place-stamp information to provide proof of a presence of the locate technician sufficiently proximate to or at a geographic location specified on the at least one locate request ticket and corresponding to the dig area;
environmental information regarding at least one environmental condition present at or near the dig area during the locate and marking operation;
at least one of a digital photograph, a digital video, and a digital audio file representing proof of presence and work performed at the dig area;
at least one virtual white line image comprising a second digital image of the geographic area proximate to and including the dig area, and the at least one electronic dig area indicator to delimit the dig area on the second digital image;
at least one facilities map corresponding to the geographic location specified on the at least one locate request ticket and/or the dig area
a quality assessment of the locate and marking operation as at least partially performed by the locate technician; and
a descriptive and/or numeric assessment of a risk of excavation in the dig area based at least in part on a risk condition within or near the dig area.

11. A method for integrating multiple elements of information relating to a locate and marking operation so as to provide an enhanced positive response to at least one first entity associated with requesting the locate and marking operation, the locate and marking operation performed by a locate technician in response to at least one locate request ticket, the locate and marking operation comprising applying, by the locate technician, at least one physical locate mark on ground, pavement, or other surface to indicate a presence or an absence of at least one underground facility within a dig area, wherein at least a portion of the dig area is planned to be excavated or disturbed by an excavator during excavation activities, the method facilitated by an apparatus including at least one processor, the method comprising:

A) generating, by the at least one processor, the at least one locate request ticket including at least one digital image of a geographic area proximate to and including the dig area and at least one of:
at least one electronic dig area indicator to delimit the dig area on the at least one digital image; and
geographic coordinates for the at least one electronic dig area indicator;
B) electronically transmitting, by the at least one processor via at least one communication interface, the at least one locate request ticket to at least one second entity associated with performing the locate and marking operation;
C) electronically receiving, by the at least one processor via the at least one communication interface, from the at least one second entity associated with performing the locate and marking operation, in response to the at least one locate request ticket, at least one of:
the enhanced positive response for the locate and marking operation; and
an electronic link to the enhanced positive response,
wherein the enhanced positive response includes at least one of:
an electronic manifest of the locate and marking operation, the electronic manifest including the at least one digital image, the at least one electronic dig area indicator on the at least one digital image, and at least one electronic marking electronically drawn on the at least one digital image by the locate technician via an onsite computer and/or locate personnel device and corresponding to the at least one physical locate mark applied by the locate technician to the ground, pavement, or other surface during the locate and marking operation, so as to graphically depict the locate and marking operation performed by the locate technician; and
geographic coordinates for the at least one electronic dig area indicator and the at least one electronic marking corresponding to the at least one physical locate mark applied by the locate technician to the ground, pavement, or other surface; and
D) electronically transmitting, by the at least one processor via the at least one communication interface, to the at least one first entity associated with requesting the locate and marking operation at least one of:
the enhanced positive response for the locate and marking operation; and
the electronic link to the enhanced positive response, so as to reduce uncertainty relating to a completeness and/or a quality of performance of the locate and marking operation and reduce a risk of damage to underground facilities during the excavation activities.

12. The method of claim 11, wherein the facilitating apparatus is a one-call center locate request management system comprising the at least one processor and the at least one communication interface.

13. The method of claim 11, wherein the at least one first entity associated with requesting the locate and marking operation includes the excavator.

14. The method of claim 11, further including, prior to D), processing, by the at least one processor, at least one of the at least one locate request ticket and the enhanced positive response to:
generate a descriptive and/or numeric risk assessment associated with the excavation activities in the dig area; and integrate the descriptive and/or numeric risk assessment with at least one of the at least one locate request ticket and the enhanced positive response.

15. The method of claim 14, wherein the descriptive and/or numeric risk assessment is generated based on at least one of a buried line, a high pressure gas line, and a high risk condition within or near the dig area.

16. The method of claim 14, wherein the facilitating apparatus is a one-call center locate request management system comprising the at least one processor and the at least one communication interface.

17. The method of claim 11, wherein the enhanced positive response further includes at least one of:
 a user identification identifying the locate technician;
 status information regarding a status of the locate technician;
 a description of a history of the locate technician at the dig area;
 at least one member code assigned to a facility owner of the at least one underground facility;
 at least one positive response code representing a status of the locate and marking operation;
 the locate request ticket;
 a completed locate request ticket;
 time-stamp information to provide proof of a time at which the locate and marking operation is performed by the locate technician;
 place-stamp information to provide proof of a presence of the locate technician sufficiently proximate to or at a geographic location specified on the locate request ticket and corresponding to the dig area;
 environmental information regarding at least one environmental condition present at or near the dig area during the locate and marking operation;
 at least one of a digital photograph, a digital video, and a digital audio file representing proof of presence and work performed at the dig area;
 at least one virtual white line image comprising a second digital image of the geographic area proximate to and including the dig area, and the at least one electronic dig area indicator to delimit the dig area on the second digital image;
 at least one facilities map corresponding to the geographic location specified on the at least one locate request ticket and/or the dig area;
 a quality assessment of the locate and marking operation as at least partially performed by the locate technician; and
 a descriptive and/or numeric assessment of a risk of excavation in the dig area based at least in part on a risk condition within or near the dig area.

18. The method of claim 11, wherein the electronic link to the enhanced positive response provides access to a menu of notification preferences to facilitate selection of contents for the enhanced positive response.

19. The method of claim 18, wherein the menu of notification preferences to facilitate selection of the contents for the enhanced positive response includes a checklist for:
 at least one of:
  the electronic manifest of the locate and marking operation; and
  the geographic coordinates for the at least one dig area indicator and the at least one electronic marking corresponding to the at least one physical locate mark applied by the locate technician to the ground, pavement or other surface; and
 at least one of:
  a user identification identifying the locate technician;
  status information regarding a status of the locate technician;
  a description of a history of the locate technician at the dig area;
  at least one member code assigned to a facility owner of the at least one underground facility;
  at least one positive response code representing a status of the locate and marking operation;
  the locate request ticket;
  a completed locate request ticket;
  time-stamp information to provide proof of a time at which the locate and marking operation is performed by the locate technician;
  place-stamp information to provide proof of a presence of the locate technician sufficiently proximate to or at a geographic location specified on the locate request ticket and corresponding to the dig area;
  environmental information regarding at least one environmental condition present at or near the dig area during the locate and marking operation;
  at least one of a digital photograph, a digital video, and a digital audio file representing proof of presence and work performed at the dig area;
  at least one virtual white line image comprising a second digital image of the geographic area proximate to and including the dig area, and the at least one electronic dig area indicator to delimit the dig area on the second digital image;
  at least one facilities map corresponding to the geographic location specified on the at least one locate request ticket and/or the dig area;
  a quality assessment of the locate and marking operation as at least partially performed by the locate technician; and
  a descriptive and/or numeric assessment of a risk of excavation in the dig area based at least in part on a risk condition within or near the dig area.

20. At least one non-transitory computer readable storage medium encoded with instructions that, when executed by at least one processor, perform a method for integrating multiple elements of information relating to a locate and marking operation so as to provide an enhanced positive response to at least one first entity associated with requesting the locate and marking operation, the locate and marking operation performed by a locate technician in response to at least one locate request ticket, the locate and marking operation comprising applying, by the locate technician, at least one physical locate mark on ground, pavement, or other surface to indicate a presence or an absence of at least one underground facility within a dig area, wherein at least a portion of the dig area is planned to be excavated or disturbed by an excavator during excavation activities, the method comprising:
 A) generating the at least one locate request ticket including at least one digital image of a geographic area proximate to and including the dig area and at least one of:
  at least one electronic dig area indicator to delimit the dig area on the at least one digital image; and
  geographic coordinates for the at least one electronic dig area indicator;
 B) electronically transmitting, via at least one communication interface, the at least one locate request ticket to at least one second entity associated with performing the locate and marking operation;
 C) electronically receiving, via the at least one communication interface, from the at least one second entity associated with performing the locate and marking operation, in response to the at least one locate request ticket, at least one of:
  the enhanced positive response for the locate and marking operation; and
  an electronic link to the enhanced positive response, wherein the enhanced positive response includes at least one of:
- an electronic manifest of the locate and marking operation, the electronic manifest including the at least one digital image, the at least one electronic dig area indicator on the at least one digital image, and at least one electronic marking electronically drawn on the at least one digital image by the locate technician via an onsite computer and/or locate personnel device and corresponding to the at least one physical locate mark applied by the locate technician to the ground, pavement, or other surface during the locate and marking operation, so as to graphically depict the locate and marking operation performed by the locate technician; and
- geographic coordinates for the at least one electronic dig area indicator and the at least one electronic marking corresponding to the at least one physical locate mark applied by the locate technician to the ground, pavement, or other surface; and D) electronically transmitting, via the at least one communication interface, to the at least one first entity associated with requesting the locate and marking operation at least one of:
- the enhanced positive response for the locate and marking operation; and
- the electronic link to the enhanced positive response, so as to reduce uncertainty relating to a completeness and/or a quality of performance of the locate and marking operation and reduce a risk of damage to underground facilities during the planned excavation activities.

* * * * *